United States Patent
Jang

(10) Patent No.: US 11,936,916 B2
(45) Date of Patent: Mar. 19, 2024

(54) IMAGE DECODING METHOD USING LOSSLESS CODING IN IMAGE CODING SYSTEM AND APPARATUS THEREFOR

(71) Applicant: LG ELECTRONICS INC., Seoul (KR)

(72) Inventor: Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 17/611,098

(22) PCT Filed: Jun. 25, 2020

(86) PCT No.: PCT/KR2020/008291
§ 371 (c)(1),
(2) Date: Nov. 12, 2021

(87) PCT Pub. No.: WO2020/262988
PCT Pub. Date: Dec. 30, 2020

(65) Prior Publication Data
US 2022/0272388 A1  Aug. 25, 2022

Related U.S. Application Data

(60) Provisional application No. 62/871,748, filed on Jul. 9, 2019, provisional application No. 62/867,893, filed (Continued)

(51) Int. Cl.
*H04N 19/82* (2014.01)
*H04N 19/124* (2014.01)
(Continued)

(52) U.S. Cl.
CPC ......... *H04N 19/82* (2014.11); *H04N 19/124* (2014.11); *H04N 19/176* (2014.11); *H04N 19/70* (2014.11)

(58) Field of Classification Search
None
See application file for complete search history.

(56) References Cited

U.S. PATENT DOCUMENTS

2010/0020866 A1*  1/2010  Marpe ............... H04N 19/184
                                                    375/E7.126
2016/0050426 A1*  2/2016  Piao ..................... H04N 19/44
                                                    382/233
(Continued)

FOREIGN PATENT DOCUMENTS

KR  10-2015-0135410 A  12/2015
KR  10-2016-0135262 A  11/2016

OTHER PUBLICATIONS

Hannuksela et al., "MV-HEVC/SHVC HLS: On inter-layer sample and syntax prediction indications (combining aspects of JCTVC-M0205 and JCTVC-M0046)," Joint Collaborative Team on Video Coding (JCT-VC) of ITU-T SG 16 WP 3, 13th Meeting: Incheon, Korea, Apr. 18-26, 2013, Document: JCTVC-M04 (Year: 2013).*

(Continued)

*Primary Examiner* — Reza Aghevli
(74) *Attorney, Agent, or Firm* — Bryan Cave Leighton Paisner LLP

(57) ABSTRACT

According to a disclosure of the present document, coding efficiency and complexity of residual coding may be improved on the basis of a determination regarding whether or not lossless coding is used.

15 Claims, 15 Drawing Sheets

Related U.S. Application Data on Jun. 28, 2019, provisional application No. 62/866,600, filed on Jun. 25, 2019.

(51) Int. Cl.
*H04N 19/176* (2014.01)
*H04N 19/70* (2014.01)

(56) References Cited

U.S. PATENT DOCUMENTS

| | | | | |
|---|---|---|---|---|
| 2017/0180737 A1* | 6/2017 | Ye | ................. | H04N 19/82 |
| 2017/0230667 A1* | 8/2017 | Gisquet | ............... | H04N 19/147 |
| 2019/0037226 A1* | 1/2019 | Yang | .................. | H04N 19/59 |
| 2020/0389644 A1* | 12/2020 | Wang | .................. | H04N 19/11 |
| 2020/0404257 A1* | 12/2020 | Filippov | ............. | H04N 19/467 |
| 2020/0404258 A1* | 12/2020 | Wang | .................. | H04N 19/86 |
| 2020/0404286 A1* | 12/2020 | Karczewicz | ......... | H04N 19/14 |
| 2020/0404308 A1* | 12/2020 | Filippov | ............. | H04N 19/107 |
| 2020/0404311 A1* | 12/2020 | Filippov | ............. | H04N 19/463 |
| 2020/0404323 A1* | 12/2020 | Esenlik | ............... | H04N 19/57 |
| 2020/0404339 A1* | 12/2020 | Chernyak | ............. | H04N 19/61 |
| 2020/0404342 A1* | 12/2020 | Kotra | ................. | H04N 19/172 |
| 2020/0413050 A1* | 12/2020 | Wang | .................. | H04N 19/46 |
| 2020/0413053 A1* | 12/2020 | Esenlik | ............... | H04N 19/157 |
| 2020/0413054 A1* | 12/2020 | Esenlik | ............... | H04N 19/132 |
| 2020/0413072 A1* | 12/2020 | Filippov | ............. | H04N 19/157 |

OTHER PUBLICATIONS

Benjamin Bross et al., "Versatile Video Coding (Draft 5)", Joint Video Experts Team (JVET) of ITU-T SG 16 WP 3 and ISO/IEC JTC 1/SC 29/WG 11, Document : JVET-N1001-v7, 14th Meeting: Geneva, CH, pp. 1-371, Mar. 19-27, 2019, Retrieved on Sep. 1, 2020, Retrieved from <http://phenix.int-evry.fr/jvet>, see pp. 62, 109, 126, 235, 246 and 278.

Miska M. Hannuksela et al., "MV-HEVC/SHVC HLS: On inter-layer sample and syntax prediction indications", Joint Collaborative Team on Video Coding (JCT-VC) of ITU-T SG 16 WP 3 and ISO/IEC JTC 1/SC 29/WG 11, Document: JCTVC-M0457-v2, 13th Meeting: Incheon, KR, pp. 1-8, Apr. 18-26, 2013, Retrieved on Sep. 1, 2020, Retrieved from <http://phenix.it-sudparis.eu/jct>, See p. 7.

* cited by examiner (a)

(b)

IMAGE DECODING METHOD USING LOSSLESS CODING IN IMAGE CODING SYSTEM AND APPARATUS THEREFOR

This application is a National Stage Application of International Application No. PCT/KR2020/008291, filed on Jun. 25, 2020, which claims the benefit of U.S. Provisional Application No. 62/866,600, filed on Jun. 25, 2019, U.S. Provisional Application No. 62/867,893, filed on Jun. 28, 2019 and U.S. Provisional Application No. 62/871,748, filed on Jul. 9, 2019, which are hereby incorporated by reference in their entirety for all purposes as if fully set forth herein.

BACKGROUND OF DISCLOSURE

Field of the Disclosure

The present technology relates to an image decoding method of applying lossless coding in an image coding system, and apparatus therefor.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

This document is to provide a method and apparatus for improving image coding efficiency.

This document is also to provide a method and apparatus for improving efficiency of residual coding.

According to an embodiment of this document, an image decoding method performed by a decoding apparatus is provided. The method includes receiving image information including residual information through a bitstream; determining whether or not lossless coding is used, from the image information; generating residual samples for the current block, based on the determination result and the residual information; and generating reconstructed samples for the current block, based on the residual samples.

According to another embodiment of this document, a video encoding method performed by an encoding apparatus is provided. The method includes determining whether or not lossless coding is used for a current block; generating residual information on the current block, based on the determination result; and encoding image information including at least one of the residual information and information on whether or not the lossless coding is used.

According to still another embodiment of this document, there is provided a computer-readable digital storage medium which stores a bitstream including image information that causes a decoding apparatus to perform an image decoding method. The image decoding method includes obtaining image information including residual information through a bitstream; determining whether or not lossless coding is used, from the image information; generating residual samples for the current block, based on the determination result and the residual information; and generating reconstructed samples for the current block, based on the residual samples.

According to this document, it is possible to improve overall image/video compression efficiency.

According to this document, it is possible to improve efficiency of residual coding.

According to this document, it is possible to improve the coding efficiency of the residual coding and reduce complexity thereof based on a determination as to whether or not lossless coding is applied to the residual information.

DESCRIPTION OF EMBODIMENTS

Figure 1:
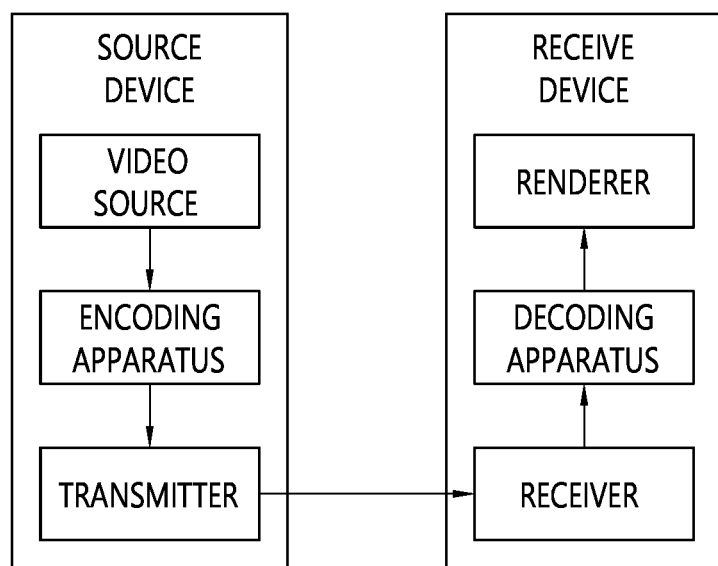
FIG. 1 briefly illustrates an example of a video/image coding device to which embodiments of the present disclosure are applicable.

The present disclosure may be modified in various forms, and specific embodiments thereof will be described and illustrated in the drawings. However, the present disclosure are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

In the present disclosure, "A or B" may mean "only A", "only B" or "both A and B". In other words, in the present disclosure, "A or B" may be interpreted as "A and/or B". For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "prediction (intra prediction)" is indicated, "intra prediction" may be proposed as an example of "prediction". In other words, "prediction" in the present disclosure may be not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present disclosure may be implemented individually or may be implemented at the same time.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles.

A tile is a rectangular region of CTUs within a particular tile column and a particular tile row in a picture. The tile column is a rectangular region of CTUs having a height equal to the height of the picture and a width specified by syntax elements in the picture parameter set). The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include multiple consecutive CTU rows within multiple complete tiles or one tile of a picture which may be included in one NAL unit. Tile groups and slices may be used interchangeably in the present disclosure. For example, in the present disclosure, a tile group/tile group header may be called a slice/slice header.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Figure 2:
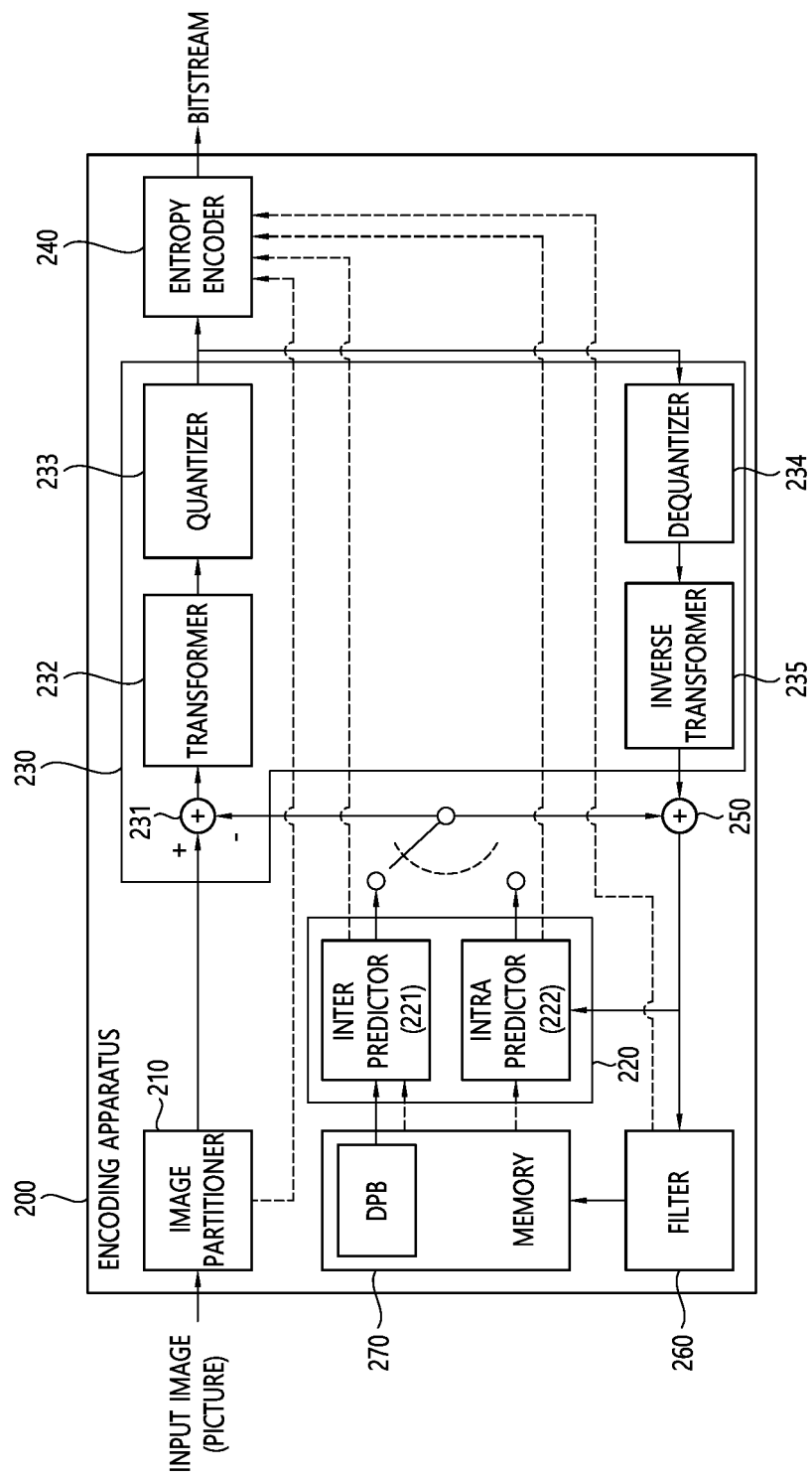
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary free structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoding apparatus 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Meanwhile, in this document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be referred to as a coefficient or a residual coefficient, or may still be referred to as the transform coefficient for consistency of expression. When quantization/dequantization and transform/inverse transform are omitted in this document, the transform coefficient may be referred to as a residual coefficient.

Also, in this document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. The same may be applied/expressed in other parts of this document as well.

Figure 3:
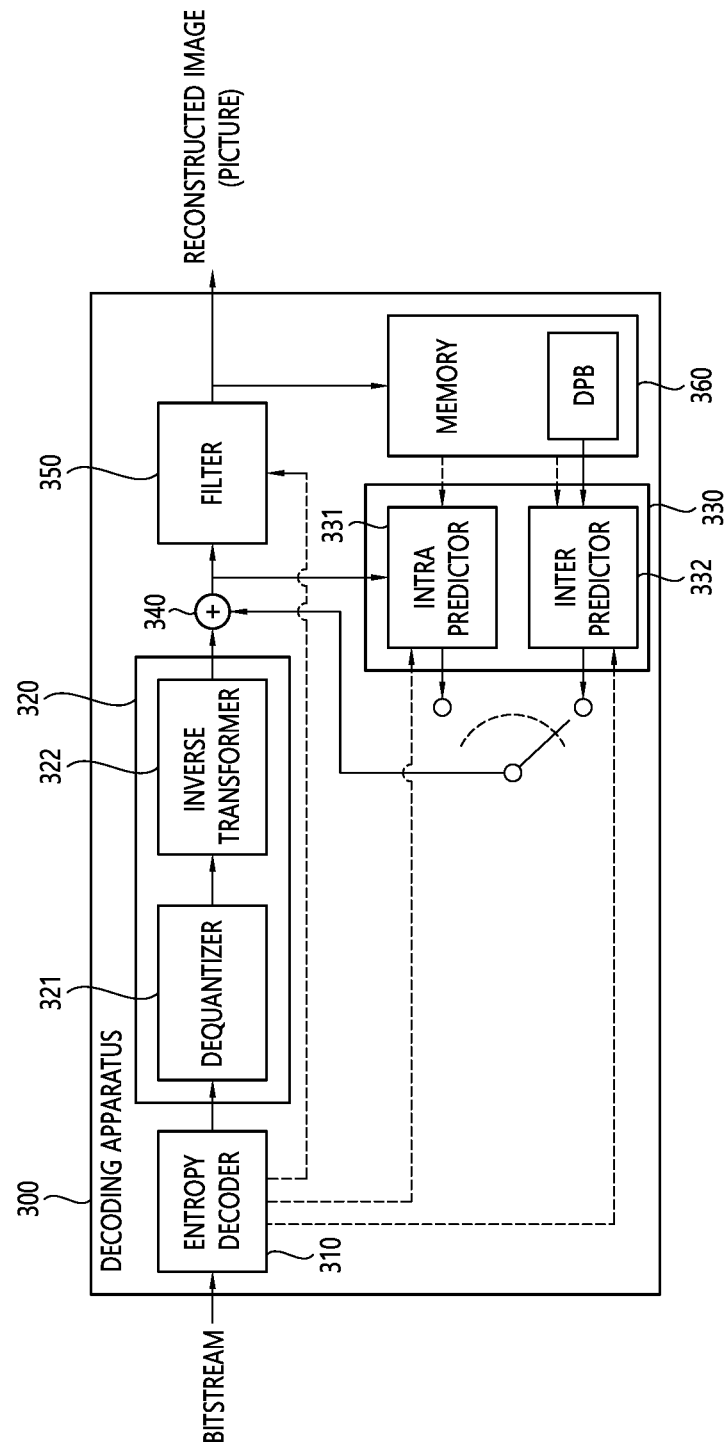
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an intra predictor 331 and an inter predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an infra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the infra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain) The predicted block may be derived indentically in the encoding apparatus and the decoding apparatus, and the encoding apparatus may signal to the decoding apparatus not original sample value itself of an original block but information on residual (residual information) between the original block and the predicted block, thereby increasing the image coding efficiency. The decoding apparatus may derive a residual block including residual samples, based on the residual information, generate a reconstructed block including reconstruction samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a dequantization/inverse transform procedure and derive the residual samples (or residual sample block), based on residual information. The decoding apparatus may generate a reconstructed picture based on a predicted block and the residual block. The encoding apparatus may also derive a residual block by dequantizing/inverse transforming quantized transform coefficients for reference for inter prediction of a next picture, and may generate a reconstructed picture based on this derived residual block.

Figure 4:
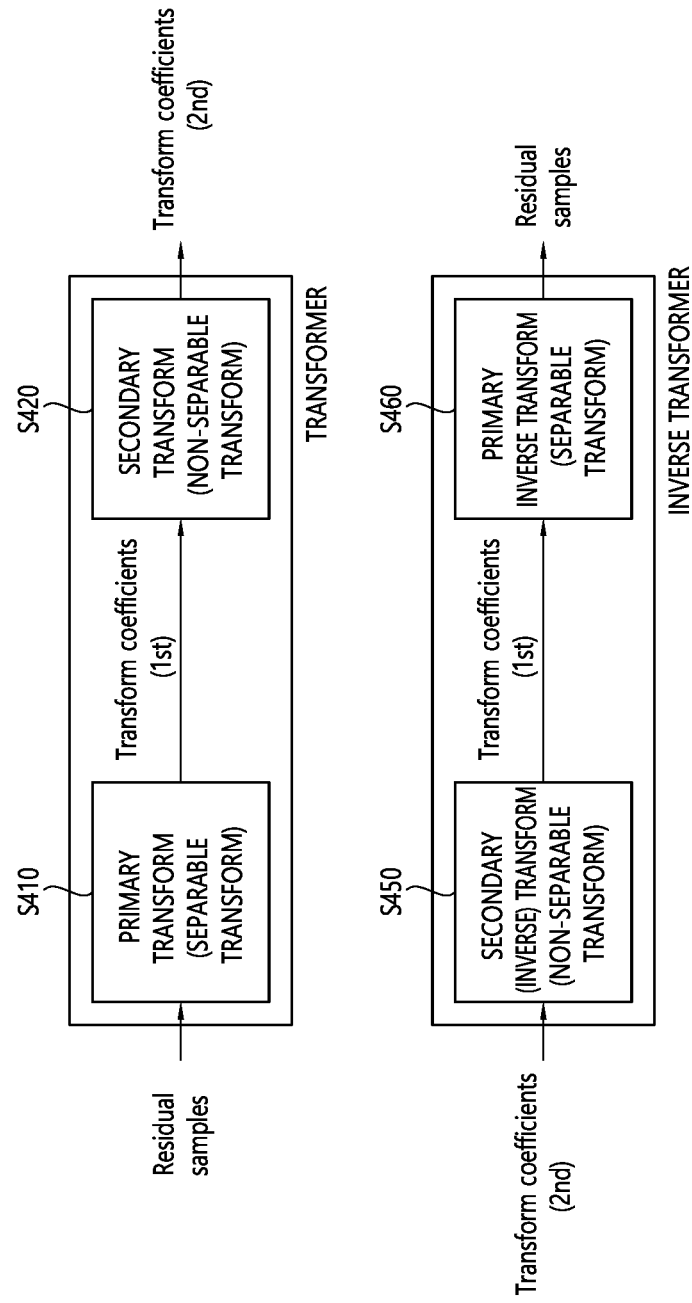
FIG. 4 is a diagram representing an example of transform and inverse transform.

FIG. 4 is a diagram representing an example of transform and inverse transform.

Referring to FIG. 4, a transformer may correspond to the transformer in the above-described encoding apparatus of FIG. 2, and an inverse transformer may correspond to the inverse transformer in the above-described encoding apparatus of FIG. 2, or to the inverse transformer in the decoding apparatus of FIG. 3.

The transformer may derive (primary) transform coefficients by performing a primary transform based on residual samples (residual sample array) in a residual block (S410). This primary transform may be referred to as a core transform. Here, the primary transform may be based on multiple transform selection (MTS), and when a multiple transform is applied as the primary transform, it may be referred to as a multiple core transform.

For example, the multiple core transform may represent a method of transforming additionally using discrete cosine transform (DCT) type 2 (DCT-II) and discrete sine transform (DST) type 7 (DST-VII), DCT type 8 (DCT-VIII), and/or DST type 1 (DST-I). That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Here, the primary transform coefficients may be referred to as temporary transform coefficients from the viewpoint of the transformer.

In other words, when the existing transform method is applied, transform coefficients might be generated by applying transform from a space domain to a frequency domain for a residual signal (or residual block) based on the DCT type 2. However, unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be referred to as a transform type, transform kernel or transform core. These DCT/DST transform types may be defined based on basis functions.

If the multiple core transform is performed, then a vertical transform kernel and/or a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

Alternatively, for example, when performing a first-order transform by applying MTS, specific basis functions may be set to a predetermined value, and a mapping relationship for a transform kernel may be set by combining whether or not which basis functions are applied in the case of vertical transform or horizontal transform. For example, when a horizontal transform kernel is denoted by trTypeHor and a vertical transform kernel is denoted by trTypeVer, trTypeHor or trTypeVer having a value of 0 may be set to DCT2, and trTypeHor or trTypeVer having a value of 1 may be set to DST7. trTypeHor or trTypeVer having a value of 2 may be set to DCT8.

Alternatively, for example, an MTS index may be encoded to indicate any one of a multiple of transform kernel sets, and MTS index information may be signaled to the decoding apparatus. Here, the MTS index may be represented by a tu_mts_idx syntax element or an mts_idx syntax element. For example, when the MTS index is 0, it may be indicated that both trTypeHor and trTypeVer values are 0, and (trTypeHor, trTypeVer)=(DCT2, DCT2). When the MTS index is 1, it may be indicated that both trTypeHor and trTypeVer values are 1, and (trTypeHor, trTypeVer)=(DCT7, DCT7). When the MTS index is 2, it may be indicated that the trTypeHor value is 2 and the trTypeVer value is 1, and (trTypeHor, trTypeVer)=(DCT8, DST7). When the MTS index is 3, it may be indicated that the trTypeHor value is 1 and the trTypeVer value is 2, and (trTypeHor, trTypeVer)=(DCT7, DST8). When the MTS index is 4, it may be indicated that both trTypeHor and trTypeVer values are 2, and (trTypeHor, trTypeVer)=(DCT8, DCT8). For example, the transform kernel set according to the MTS index may be represented as shown in the following table.

TABLE 1

| MTS index | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S420). The primary transform is a transform from a spatial domain to a frequency domain, and the secondary transform may indicate transforming into a more compressive expression by using a correlation existing between (primary) transform coefficients.

The secondary transform may include a non-separable transform. In this case, the secondary transform may be referred to as a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix.

In other words, the non-separable secondary transform may represent a transform method in which the vertical and horizontal components of the (primary) transform coefficients are not separated, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix.

For example, the row-first order is to place in a line in the order of 1st row, 2nd row, . . . , Nth row for an M×N block, and the column-first order is to place in a line in the order of 1st column, 2nd column, . . . , Mth column for an M×N block. Here, M and N may represent a width (W) and a height (H) of a block, respectively, and both may be positive integers.

For example, the non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) and height (H) of the transform coefficient block are all equal to or greater than 4 is satisfied, the 4×4 non-separable secondary transform may be applied to the top-left min(8, W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

When said X is represented in the form of a vector, the vector $\vec{x}$ may be represented as below.

$$\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$$ [Equation 2]

As in Equation 2, the vector $\vec{x}$ rearranges the 2D block of X of Equation 1 into a 1D vector according to the row-first order.

In this case, the secondary non-separable transform may be calculated as below.

$$\vec{F} = T \cdot \vec{x}$$ [Equation 3]

where $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that can be applied to an 8×8 region included in the corresponding transform coefficient block when both W and H are greater than or equal to 8, and the 8×8 region may be the top-left 8×8 region inside the corresponding transform coefficient block. Similarly, the 4×4 transform refers to a transform that can be applied to a 4×4 region included in the corresponding transform coefficient block when both W and H are greater than or equal to 4, and the 4×4 region may be the top-left 4×4 region inside the corresponding transform coefficient block. For example, the 8×8 transform kernel matrix may become a 64×64/16×64 matrix, and the 4×4 transform kernel matrix may become a 16×16/8×16 matrix.

At this time, for mode-based transform kernel selection, two non-separated quadratic transform kernels per transform set for non-separated quadratic transform for both 8×8 transform and 4×4 transform may be configured, and there may be four transform sets. That is, 4 transform sets may be configured for the 8×8 transform, and 4 transform sets may be configured for the 4×4 transform. In this case, each of 4 transform sets for the 8×8 transform may include two 8×8 transform kernels, and in this case, each of 4 transform sets for the 4×4 transform may include two 4×4 transform kernels.

However, a size other than 8×8 or 4×4 may be used by way of example as the size of the transform, that is, the size of the region to which the transform is applied, and the number of sets may ben, and the number of transform kernels in each set may be k.

For example, the transform set may be referred to as an NSST set or a Low-Frequency Non-Separable Transform (LFNST) set. The selection of a specific set from among the transform sets may be performed, for example, based on the intra prediction mode of the current block (CU or sub-block). A Low-Frequency Non-Separable Transform (LFNST) may be an example of a reduced non-separable transform, to be described later, and represents a non-separable transform with respect to a low frequency component.

For example, the mapping of four transform sets according to the intra prediction mode may be represented, for example, as shown in the following table.

TABLE 2

| lfnstPredModeIntra | lfnstTrSetIdx |
|---|---|
| lfnstPredModeIntra < 0 | 1 |
| 0 <= lfnstPredModeIntra <= 1 | 0 |
| 2 <= lfnstPredModeIntra <= 12 | 1 |
| 13 <= lfnstPredModeIntra <= 23 | 2 |
| 24 <= lfnstPredModeIntra <= 44 | 3 |
| 45 <= lfnstPredModeIntra <= 55 | 2 |
| 56 <= lfnstPredModeIntra <= 80 | 1 |
| 81 <= lfnstPredModeIntra <= 83 | 0 |

As shown in Table 2, any one of the four transform sets, that is, one of four if fnstTrSetIdx's values 0, 1, 2, 3 may be mapped according to the intra prediction mode.

Meanwhile, if a specific set is determined to be used to a non-separable transform, one of k transform kernels in the specific set may be selected through the non-separable secondary transform index. The encoding apparatus may derive a non-separable secondary transform index indicating a specific transform kernel, based on the rate-distortion (RD) check, and may signal the non-separable secondary transform index to the decoding apparatus. The decoding apparatus may select one from among k transform kernels in the specific set based on the non-separable secondary transform index. For example, the lfnst index value 0 may indicate a first non-separable secondary transform kernel, the lfnst index value 1 may indicate a second non-separable secondary transform kernel, and the lfnst index value 2 may indicate a third non-separable secondary transform kernel. Alternatively, the lfnst index value 0 may indicate that the first non-separable secondary transform is not applied to a current block, and the lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S450), and may obtain a residual block (residual samples) by performing a primary (inverse) transform on the (primary) transform coefficients (S460). In this connection, the primary transform coefficients may be called modified transform coefficients from the viewpoint of the inverse transformer. As described above, the encoding apparatus and the decoding apparatus may generate the reconstructed block, based on the residual block and the predicted block, and may generate the reconstructed picture based on the reconstructed block.

Meanwhile, the decoding apparatus may further include a secondary inverse transform application determiner (or a component determining whether or not the secondary inverse transform is applied), and a secondary inverse transform determiner (or a component determining whether or not the secondary inverse transform is applied). The secondary inverse transform application determiner may determine whether or not to apply the secondary inverse transform. For example, the secondary inverse transform may be NSST, RST, or LFNST, and the secondary inverse transform application determiner may determine whether or not to apply the secondary inverse transform, based on a secondary transform flag parsed from the bitstream. As another example, the secondary inverse transform determiner may determine whether or not to apply the secondary inverse transform, based on the transform coefficient of the residual block.

The secondary inverse transform determiner may determine the secondary inverse transform. In this case, the secondary inverse transform determiner may determine the secondary inverse transform applied to the current block, based on the LFNST (NSST or RST) transform set specified according to the intra prediction mode. Also, as an embodiment, a method for determining a secondary transform may be determined depending on a method for determining a primary transform. Various combinations of a primary transform and a secondary transform may be determined according to the intra prediction mode. Also, as an example, the secondary inverse transform determiner may determine a region to which the secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block, based on the residual block and the predicted block, and may generate the reconstructed picture based on the reconstructed block.

In addition, the transform/inverse transform may be performed in units of CUs or TUs. That is, the transform/inverse transform may be applied to residual samples in a CU or to residual samples in a TU. The CU size and the TU size may be the same, or a plurality of TUs may exist in the CU region. Meanwhile, the CU size may generally indicate a luma component (sample) CB size. The TU size may generally indicate a luma component (sample) TB size. The chroma component (sample) CB or TB size may be derived based on the luma component (sample) CB or TB size depending on a component ratio according to a color format (Chroma format, e.g., 4:4:4, 4:2:2, 4:2:0, etc.). The TU size may be derived based on maxTbSize. For example, when the CU size is greater than the maxTbSize, a plurality of TUs (TBs) of the maxTbSize may be derived from the CU, and transform/inverse transform may be performed in units of the TUs (TBs). The maxTbSize may be taken into consideration for determining whether or not to apply various intra prediction types such as intra sub-partitions (ISP) or the like. The information on the maxTbSize may be predetermined, or may be generated and encoded by an encoding apparatus and signaled to the decoding apparatus.

Meanwhile, as described above, the quantizer of the encoding apparatus applies quantization to the transform coefficients and derives quantized transform coefficients, and the dequantizer of the encoding apparatus or the dequantizer of the decoding apparatus may derive transform coefficients by applying dequantization to the quantized transform coefficients.

In general, in video/image coding, a quantization rate may be changed, and compression rate may be adjusted using the changed quantization rate. In terms of implementation, a quantization parameter (QP) may be used instead of using a quantization rate directly under the consideration of complexity. For example, quantization parameters of integer values from 0 to 63 may be used, and each quantization parameter value may correspond to an actual quantization rate. Further, for example, a quantization parameter ($QP_Y$) for a luma component (luma sample) and a quantization parameter ($QP_C$) for a chroma component (chroma sample) may be set differently.

The quantization process takes a transform coefficient C as an input, divides it by a quantization rate ($Q_a$tep), and based on this, a quantized transform coefficient C' may be obtained. In this case, under the consideration of computational complexity, a quantization rate may be multiplied by a scale to form an integer, and a shift operation may be performed by a value corresponding to the scale value. A quantization scale may be derived based on the product of the quantization rate and the scale value. That is, the quantization scale may be derived depending on the QP. For example, by applying the quantization scale to the transform coefficient C, a quantized transform coefficient C' may be derived based thereon.

The dequantization process is the inverse process of the quantization process, and a reconstructed transform coefficient C' may be obtained based on what is obtained by multiplying the quantized transform coefficient C' by the quantization rate ($Q_a$tep). In this case, a level scale may be derived depending on the quantization parameter, and a reconstructed transform coefficient C'' may be derived based on what is obtained by applying the level scale to the quantized transform coefficient C'. The reconstructed transform coefficient C'' may be slightly different from the original transform coefficient C due to loss in the transform and/or quantization process. Therefore, the encoding apparatus performs dequantization in the same manner as in the decoding apparatus.

Meanwhile, an adaptive frequency weighting quantization technique in which quantization intensity is adjusted depending on frequency may be applied. The adaptive frequency weighting quantization technique is a method of applying different quantization intensity according to frequency. In the adaptive frequency weighting quantization, a quantization intensity for each frequency may be applied differently using a predefined quantization scaling matrix. That is, the above-described quantization/dequantization process may be performed based on the quantization scaling matrix. For example, different quantization scaling metrics may be used according to the size of the current block and/or whether a prediction mode applied to the current block is inter prediction or intra prediction in order to generate a residual signal of the current block. The quantization scaling matrix may be referred to as a quantization matrix or a scaling matrix. The quantization scaling matrix may be predefined. In addition, for frequency adaptive scaling, quantization scale information for each frequency of the quantization scaling matrix may be configured/encoded in the encoding apparatus, and signaled to the decoding apparatus. The quantization scale information for each frequency may be referred to as quantization scaling information. The quantization scale information for each frequency may include scaling list data (scaling_list_data). The (modified) quantization scaling matrix may be derived based on the scaling list data. Additionally, the quantization scale information for each frequency may include present flag information indicating whether or not the scaling list data exists. Alternatively, when the scaling list data is signaled at a upper level (e.g., SPS), information indicating whether or not the scaling list data is modified at a deeper level (e.g., PPS or tile group header, etc.) of the upper level, and the like may be further included.

In addition, the picture decoding procedure may schematically include a picture restoration procedure and an in-loop filtering procedure for the reconstructed picture. Through the in-loop filtering procedure, a modified reconstructed picture may be generated, which may be output as a decoded picture, and may be stored in the decoding picture buffer 360 or a memory of the encoding apparatus/decoding apparatus, and used as a reference picture in the inter prediction procedure of the next picture encoding/decoding. The in-loop filtering procedure may include the deblocking filtering procedure, the sample adaptive offset (SAO) procedure, the adaptive loop filter (ALF) procedure, and/or the bi-lateral filter procedure as described above. In this case, one or some of the deblocking filtering procedure, the sample adaptive offset (SAO) procedure, the adaptive loop filter (ALF) procedure, and/or the bi-lateral filter procedure may be sequentially applied, or all of them may be sequentially applied. For example, after the deblocking procedure is applied to the reconstructed picture, the SAO procedure may be performed thereon. Alternatively, for example, after the deblocking procedure is applied to the reconstructed picture, the ALF procedure may be performed thereon. This may be likewise performed in the encoding apparatus.

The picture encoding procedure may schematically include a procedure of generating a reconstructed picture for a current picture and applying in-loop filtering, as well as a procedure of encoding information for picture reconstruction (e.g., partitioning information, prediction information, residual information, or the like) and outputting it in the form of a bitstream. In this case, through the in-loop filtering procedure, the modified reconstructed picture may be generated, which may be stored in the picture buffer 270 or a memory, and used as a reference picture in the inter prediction procedure of the next picture decoding, similarly to a case of the decoding apparatus. In a case where the in-loop filtering process is performed, (in-loop) filtering-related information (parameter) may be encoded in the entropy encoder 240 and output in the form of a bitstream, and the decoding apparatus may perform the in-loop filtering procedure in the same way as that of the encoding apparatus based on the filtering-related information.

Through this in-loop filtering procedure, it is possible to reduce noises, such as deblocking artifact and ringing artifact, which are generated during the image/video coding, and to increase subjective/objective visual quality. Further, as the in-loop filtering procedure is performed in both the encoding apparatus and the decoding apparatus, the encoding apparatus and the decoding apparatus can derive the same prediction result, increase the reliability of the picture coding, and reduce the amount of data to be transmitted for picture coding. As an example of the in-loop filtering procedure, an adaptive loop filter (ALF) procedure will be described later with reference to FIG. 5.

Figure 5:
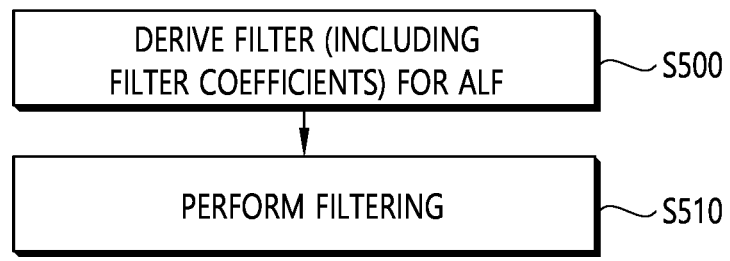
FIG. 5 is a flowchart schematically representing an example of an ALF procedure.

FIG. 5 is a flowchart schematically representing an example of an ALF procedure.

ALF is a technique of filtering a reconstructed picture in units of samples, based on filter coefficients according to a filter shape. The encoding apparatus may determine whether or not to apply ALF, an ALF shape and/or an ALF filtering coefficient, etc. through comparison of the reconstructed picture and the original picture, and may signal the determination to the decoding apparatus. That is, the filtering information for ALF may include information on whether or not ALF is applied, ALF filter shape information, ALF filtering coefficient information, and the like. ALF may be applied to the reconstructed picture after applying deblocking filtering.

The ALF procedure disclosed in FIG. 5 may be performed in an encoding apparatus and a decoding apparatus. In this document, a coding apparatus may include the encoding apparatus and/or decoding apparatus.

Referring to FIG. 5, the coding apparatus derives a filter for ALF (S500). The filter may include filter coefficients. The coding apparatus may determine whether or not to apply the ALF, and when having determined to apply the ALF, it may derive a filter including filter coefficients for the ALF. The filter (coefficients) for ALF or information for deriving the filter (coefficients) for ALF may be referred to as an ALF parameter. Information on whether or not ALF is applied (eg, ALF availability flag) and ALF data for deriving the filter may be signaled from the encoding apparatus to the decoding apparatus. ALF data may include information for deriving the filter for ALF. Further, for example, for hierarchical control of ALF, an ALF enable flag may be signaled from the SPS, picture header, slice header, and/or CTB level, respectively.

In order to derive the filter for ALF, the activity and/or directivity of the current block (or ALF target block) may be derived, and the filter may be derived based on the activity and/or the directivity. For example, the ALF procedure may be applied in units of 4×4 blocks (based on luma components). The current block or ALF target block may be, for example, a CU, or may be a 4×4 block within a CU. Specifically, for example, filters for ALF may be derived based on first filters derived from information included in the ALF data and predefined second filters, and the coding apparatus may select one of the filters based on the activity and/or the directionality. The coding apparatus may use for the ALF, filter coefficients included in the selected filter.

The coding apparatus performs filtering based on the filter (S510). Modified reconstructed samples may be derived based on the filtering. For example, the filter coefficients in the filter may be arranged or assigned according to a filter shape, and the filtering may be performed on reconstructed samples in the current block. Here, the reconstructed samples in the current block may be reconstructed samples after the completion of the deblocking filter procedure and the SAO procedure. For example, one filter shape may be used, or one filter shape may be selected and used from among a plurality of predetermined filter shapes. For example, a filter shape applied to the luma component and a filter shape applied to the chroma component may be different from each other. For example, a 7×7 diamond filter shape may be used for the luma component, and a 5×5 diamond filter shape may be used for the chroma component.

Figure 6:
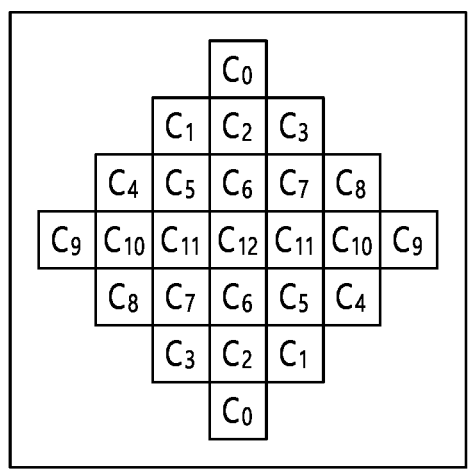
FIG. 6 shows an example of the shape of an ALF filter.
Figure 6:
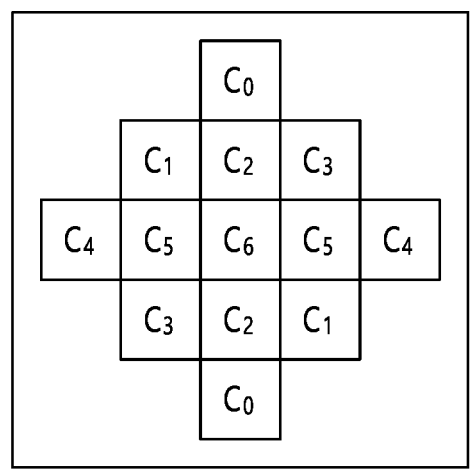

FIG. 6 shows an example of the shape of an ALF filter.

Sub-figure (a) of FIG. 6 shows the shape of a 7×7 diamond filter, and Sub-figure (b) of FIG. 6 shows the shape of a 5×5 diamond filter. In FIG. 6, Cn in the filter shape represents a filter coefficient. When n in Cn is the same, it is indicated that the same filter coefficient may be assigned thereto. In this document, the position and/or unit to which filter coefficients are assigned according to the filter shape of the ALF may be referred to as a filter tab. In this case, one filter coefficient may be assigned to each filter tap, and a shape in which the filter tabs are arranged may correspond to a filter shape. A filter tab located at the center of the filter shape may be referred to as a center filter tab. The same filter coefficient may be assigned to two filter taps of the same n value, which exist at positions corresponding to each other with respect to the center filter tap. For example, in the case of a 7×7 diamond filter shape including 25 filter taps, since filter coefficients C0 to C11 are assigned in a centrally symmetric form, filter coefficients can be assigned to the 25 filter taps using only 13 filter coefficients. Additionally, for example, in the case of a 5×5 diamond filter shape including 13 filter taps, since filter coefficients C0 to C5 are assigned in a centrally symmetric form, filter coefficients can be assigned to the 13 filter taps using only 6 filter coefficients. For example, in order to reduce the data amount of information on signaled filter coefficients, 12 filter coefficients of the 13 filter coefficients for the 7×7 diamond filter shape are signaled (explicitly), and 1 filter coefficient may be derived (implicitly). Additionally, for example, 6 filter coefficients of the 7 filter coefficients for the 5×5 diamond filter shape are signaled (explicitly), and 1 filter coefficient may be derived (implicitly).

For example, the ALF parameter used for the ALF procedure may be signaled through an adaptation parameter set (APS). The ALF parameter may be derived from filter information or ALF data for said ALF.

ALF is a type of in-loop filtering technique that can be applied in video/image coding as described above. ALF may be performed based on the filter shape and filter coefficients. For example, ALF may be performed using a Wiener-based adaptive filter. This may be to minimize a mean square error (MSE) between original samples and decoded samples (or reconstructed samples). A high level design for an ALF tool may incorporate syntax elements accessible from the SPS and/or slice header (or tile group header).

Meanwhile, luma mapping with chroma scaling (LMCS) may be applied to increase coding efficiency. LMCS may be referred to as a loop reshaper (reshaping). In order to increase coding efficiency, LMCS control and/or signaling of LMCS-related information may be performed hierarchically.

Figure 7:
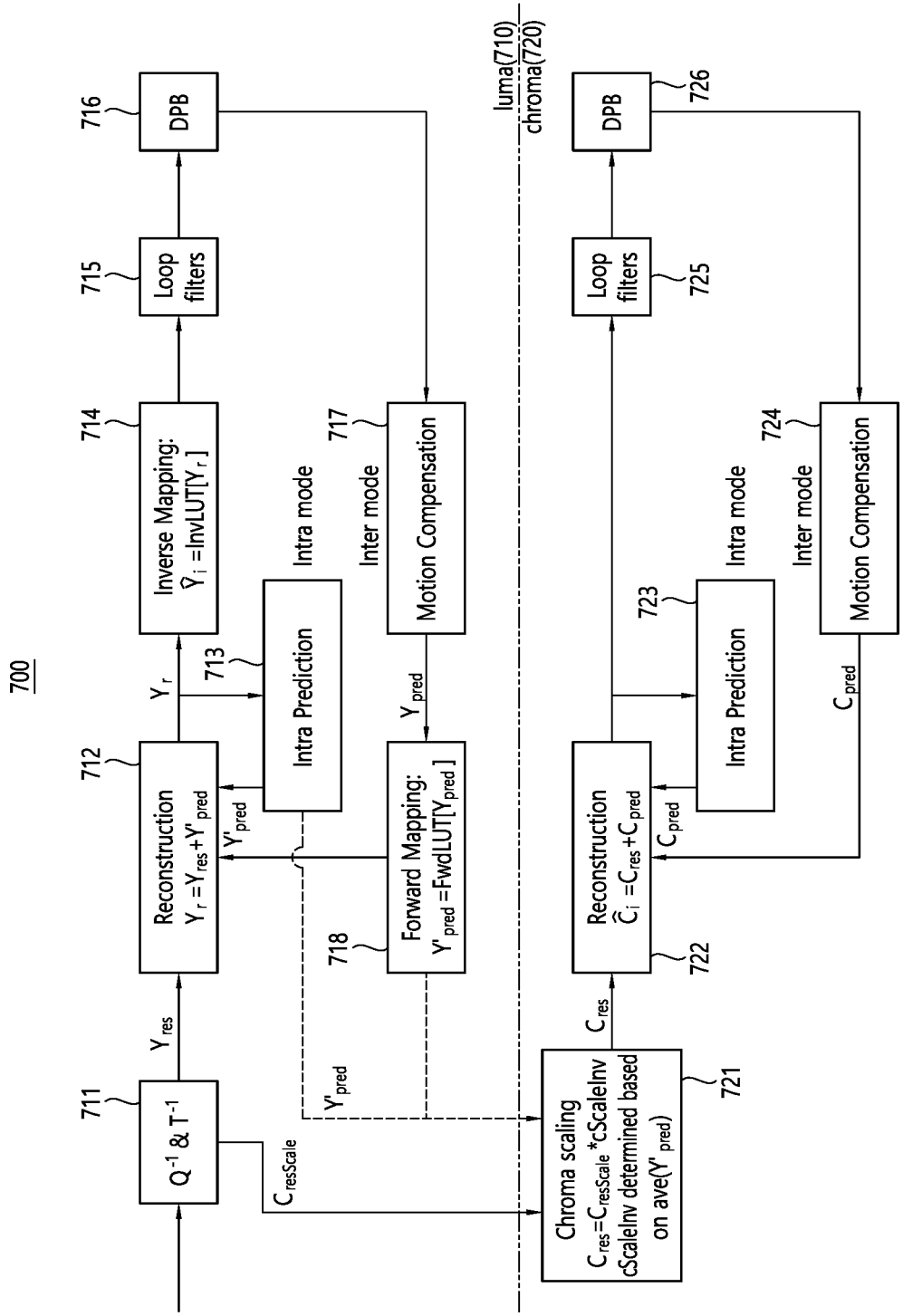
FIG. 7 represents an example of an LMCS structure.

FIG. 7 represents an example of an LMCS structure. The LMCS structure 700 of FIG. 7 may include an in-loop mapping portion 710 of luma components based on adaptive piecewise linear (adaptive PWL) models, and a luma-dependent chroma residual scaling portion 720 for chroma components. A dequantization and inverse transform block 711, a reconstruction block 712 and an intra prediction block 713 of the in-loop mapping portion 710 represent processes applied in the mapped (reshaped) domain. A loop filters block 715 and a motion compensation or inter prediction block 717 of the in-loop mapping portion 710, and a reconstruction block 722, an intra prediction block 723, a motion compensation or inter prediction block 724, a loop filters block 725 of the chroma residual scaling portion 720 represent processes applied in the original (non-mapped, non-reshaped) domain.

Referring to FIG. 7, in the case of LMCS being enabled, at least one of an inverse reshaping (mapping) process 714, a forward reshaping (mapping) process 718, and a chroma scaling process 721 may be applied. For example, the inverse reshaping process may be applied to a (reconstructed) luma sample (or luma samples or luma sample array) of the reconstructed picture. The inverse reshaping process may be performed based on a piecewise function (inverse) index of the luma sample. The piecewise function (inverse) index may identify the fragment (or part) to which the luma sample belongs. The output of the inverse reshaping process is a modified (reconstruction) luma sample (or modified luma samples or modified luma sample array). LMCS may be enabled or disabled at a tile group (or slice), picture, or higher level.

The forward reshaping process and/or the chroma scaling process may be applied to generate a reconstructed picture. A picture may include luma samples and chroma samples. A reconstructed picture having luma samples may be referred to as a reconstructed luma picture, and a reconstructed picture having chroma samples may be referred to as a reconstructed chrome picture. A combination of the reconstructed luma picture and the reconstructed chroma picture may be referred to as a reconstructed picture. The reconstructed luma picture may be generated based on the forward reshaping process. For example, if inter prediction is applied to the current block, forward reshaping is applied to the luma prediction sample derived based on the (reconstructed) luma sample of the reference picture. Since the (reconstructed) luma sample of the reference picture is generated based on the inverse reshaping process, forward reshaping may be applied to the luma prediction sample, so that a reshaped (mapped) luma prediction sample may be derived. The forward reshaping process may be performed based on the piecewise function index of the luma prediction sample. The piecewise function index may be derived based on a value of a luma prediction sample or a value of a luma sample of a reference picture used for inter prediction. A reconstructed sample may be generated based on the (reshaped/mapped) luma prediction sample. The inverse reshaping (mapping) process may be applied to the reconstructed sample. The reconstructed sample to which the inverse reshaping (mapping) process is applied may be referred to as an inverse reshaping (mapped) reconstructed sample. Also, the inverse reshaped (mapped) reconstructed sample may be simply referred to as a reshaped (mapped) reconstructed sample. When infra prediction (or intra block copy (IBC)) is applied to the current block, forward mapping to the prediction sample(s) of the current block may not be needed because the inverse reshaping process has not yet been applied to the reconstructed samples of the referenced current picture. In the reconstructed luma picture, a (reconstructed) luma sample may be generated based on a (reshaped) luma prediction sample and a corresponding luma residual sample.

The reconstructed chroma picture may be generated based on a chroma scaling process. For example, a (reconstructed) chroma sample in the reconstructed coma picture may be derived based on a chroma prediction sample and a chroma residual sample ($c_{res}$) in the current block. The chroma residual sample ($c_{res}$) is derived based on a (scaled) chroma residual sample ($c_{resScale}$) and a chroma residual scaling factor (cScaleInv may be referred to as varScale) for the current block. The chroma residual scaling factor may be calculated based on reshaped luma prediction sample values in the current block. For example, the scaling factor may be calculated based on an average luma value (ave($Y'_{pred}$)) of the reshaped luma prediction sample values ($Y'_{pred}$). For reference, the (scaled) chroma residual sample derived based on the inverse transform/dequantization in FIG. 7 may be referred to as $c_{resScale}$, and the chroma residual sample derived by performing the (inverse) scaling procedure on the (scaled) chroma residual sample may be referred to as $c_{res}$.

Meanwhile, in lossless coding, processing that may cause information loss in an image coding system may be modified and/or bypassed. For example, at least one of (inverse) transform and/or (de)quantization, which are coding techniques that cause information loss, may not be applied. That is, lossless coding may mean coding to which at least one of (inverse) transform nor (de)quantization is not applied when coding residual information. Alternatively, lossless coding may mean coding to which neither (inverse) transform nor (de)quantization is applied when coding residual information.

In addition, when the lossless coding is applied, the decoded image may be the same as the original image, and thus an in-loop filtering procedure that may introduce unwanted distortion may not be required.

Whether or not the lossless coding is applied may be determined in units of CUs, slices, tiles, subpictures, pictures, or sequences. Whether or not the lossless coding is applied may be signaled/determined based on, for example, flag information regarding whether or not the lossless coding is applied. However, this is an example, and whether or not the lossless coding is applied may be determined or indicated by another method. In one example, whether or not the lossless coding is used may be determined based on, for example, a quantization parameter (QP) value. For example, when the QP value is equal to or less than 4, it may be determined that the lossless coding is applied. Alternatively, as another example, whether or not the lossless coding is applied may be signaled in High Level Syntax (HLS) or units of blocks. For example, when said HLS indicates that the image relates to national defense or medical care, the lossless coding may be applied.

In one embodiment, a syntax element sps_transquant_bypass_enabled_flag indicating whether or not to apply lossless coding, i.e., whether or not to bypass a processing which causes information loss, may be transmitted in a sequence parameter set (SPS).

Here, the above-mentioned method is an example, and it may also be signaled in an HLS other than the SPS (e.g., video parameter set (VPS), picture parameter set (PPS), slice header, etc.). For example, the sps_transquant_bypass_enabled_flag may indicate that the lossless coding is available for picture(s) and block(s) included in a sequence associated with the corresponding SPS.

For example, SPS syntax according to the above-described embodiment may be as shown in the following table.

TABLE 3

| | Descriptor |
|---|---|
| seq_parameter_set_rbsp( ) { | |
|   sps_deceding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chorma_format_idc  = =  3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   ..... | |
|   sps_transquant_bypass_enable_flag | u(1) |
|   .... | |
|   if ( sps_ladf_enabled_flag ) { | |
|     sps_num_ladf_intervals_minus2 | u(2) |
|     sps_ladf_lowest_interval_qp_offset | ue(v) |
|     for( i = 0; i < sps_num_ladf_intervals_minus2 + 1; j++ ) { | |
|       sps_ladf_qp_offset[ i ] | ue(v) |
|       sps_ladf_delta_threshold_minus1[ i ] | ue(v) |
|     } | |
|   } | |
|   timing_info_present_flag | u(1) |
|   if( timing_info_present_flag ) { | |
|     num_units_in_tick | u(32) |
|     time_scale | u(32) |
|     hrd_parameters_present_flag | u(1) |
|     if( hrd_parameters_present_flag ) | |
|       hrd_parameters( sps_max_sub_layer_minus1 ) | |
|   } | |
|   vui_parameters_present_flag | u(1) |
|   if( vui_parameters_present_flag ) | |

TABLE 3-continued

| | Descriptor |
|---|---|
|     vui_parameters( ) | |
|   sps_extension_flag | u(1) |
|   if( sps_extension_flag ) | |
|     while( more_rbsp_data( ) ) | |
|       sps_extension_delta_flag | u(1) |
|   rbsp_trailing_bits( ) | |
| } | |

Additionally, for example, a semantic of a syntax element for the above-described embodiment among the syntax elements of said SPS syntax may be represented as shown in the following table.

TABLE 4

| |
|---|
| sps_transquant_bypass_enable_flag equal to 1 specifies that cu_transquant_bypass_flag is present. sps_transquant_bypass_enable_flag equal to 0 specifies that cu_transquant_bypass_flag is not present. |

For example, said sps_transquant_bypass_enabled_flag may indicate whether or not cu_transquant_bypass_flag, which will be described later, exists. When the value of said sps_transquant_bypass_enabled_flag is 1, cu_transquant_bypass_flag may exist. In addition, when the value of said sps_transquant_bypass_enabled flag is 0, cu_transquant_bypass_flag may not be explicitly included in the image/video information or the CU syntax.

Additionally, in an embodiment of this document, a syntax element pps_transquant_bypass_enable_flag indicating whether or not lossless coding is applied, that is, whether or not a processing which causes information loss is bypassed, may be transmitted in a picture parameter set (PPS). For example, the pps_transquant_bypass_enable_flag may indicate that the lossless coding is available for picture(s) and block(s) included in a sequence associated with the corresponding PPS.

For example, PPS syntax according to the above-described embodiment may be as shown in the following table.

TABLE 5

| | Descriptor |
|---|---|
| pic_parameter_set_rbsp( ) { | |
|   pps_pic_parameter_set_id | ue(v) |
|   pps_seq_parameter_set_id | ue(v) |
|   output_flag_present flag | u(1) |
|   single_tile_in_pic_flag | u(1) |
|   .... | |
|   pps_transquant_bypass_enable_flag | u(1) |
|   .... | |
|   pps_loop_filter_across_virtual_boundaries_disabled_flag | u(1) |
|   if( pps_loop_filter_across_virtual_boundaries_disabled_flag ) { | |
|     pps_num_ver_virtual_boundaries | u(2) |
|     for( i = 0; i < pps_num_ver_virtual_boundaries; i++ ) | |
|       pps_virtual_boundaries_pos_x[ i ] | u(v) |
|     pps_num_virtual_boundaries | u(2) |
|     for( i = 0; i < pps_num_hor_virtual_boundaries; i++ ) | |
|       pps_virtual_boundaries_pos_y[ i ] | u(v) |
|   } | |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

Additionally, for example, a semantic of a syntax element for the above-described embodiment among the syntax elements of said PPS syntax may be represented as shown in the following table.

TABLE 6

| |
|---|
| pps_transquant_bypass_enable_flag equal to 1 specifies that cu_transquant_bypass_flag is present.<br>pps_transquant_bypass_enable_flag equal to 0 specifies that cu_transquant_bypass_flag is not present. |

For example, said pps_transquant_bypass_enabled_flag may indicate whether or not cu_transquant_bypass_flag, which will be described later, exists. When the value of said pps_transquant_bypass_enabled_flag is 1, cu_transquant_bypass_flag may exist. In addition, when the value of said pps_transquant_bypass_enabled_flag is 0, cu_transquant_bypass_flag may not be explicitly included in the image/video information or the CU syntax.

Additionally, in an embodiment of this document, a syntax element no_transquant_bypass_constraint_flag indicating whether or not lossless coding is applied, that is, whether or not a processing which causes information loss is bypassed, may be transmitted in general constraint information.

For example, the syntax of general constraint information according to the above-described embodiment may be as shown in the following table.

TABLE 7

| | Descriptor |
|---|---|
| general_constraint_info( ) { | |
|   general_progressive_source_flag | u(1) |
|   general_interlaced_source_flag | u(1) |
|   general_non_packed_constraint_flag | u(1) |
|   general_frame_only_constraint_flag | u(1) |
|   intra_only_constraint_flag | u(1) |
|   max_bitdepth_constraint_idc | u(4) |
|   max_chroma_format_constraint_idc | u(2) |
|   frame_only_constraint_flag | u(1) |
|   no_qtbtt_dual_tree_intra_constraint_flag | u(1) |
|   no_partition_constraints_override_constraint_flag | u(1) |

TABLE 7-continued

| | Descriptor |
|---|---|
|   no_sao_constraint_flag | u(1) |
|   no_alf_constraint_flag | u(1) |
|   no_pcm_constraint_flag | u(1) |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   no_dmvr_constraint_flag | u(1) |
|   no_cclm_constraint_flag | u(1) |
|   no_mts_constraint_flag | u(1) |
|   no_sbt_constraint_flag | u(1) |
|   no_affine_motion_constraint_flag | u(1) |
|   no_bcw_constraint_flag | u(1) |
|   no_ibc_constraint_flag | u(1) |
|   no_clip_constraint_flag | u(1) |
|   no_fpel_mmvd_constraint_flag | u(1) |
|   no_triangle_constraint_flag | u(1) |
|   no_ladf_constraint_flag | u(1) |
|   no_transform_skip_constraint_flag | u(1) |
|   no_qp_delta_constraint_flag | u(1) |
|   no_dep_quant_constraint_flag | u(1) |
|   no_sign_data_hiding_constraint_flag | u(1) |
|   no_transquant_bypass_constraint_flag | u(1) |
|   // ADD reserved bits for future extensions | |
|   while( 1byte_aligned( ) ) | |
|     gel_alignment_zero_bit | f(1) |
| } | |

For example, when the value of said no_transquant_bypass_constraint_flag is 1, it may be designated that the value of above-described sps_transquant_bypass_enabled_flag is equal to 0. Also, when the value of said no_transquant_bypass_constraint_flag is 0, there may be no constraint.

Additionally, in an embodiment of this document, a method of signaling a syntax element cu_transquant_bypass_flag indicating whether or not lossless coding is used in units of coding units (CUs) may be proposed. That is, for example, the syntax element cu_transquant_bypass_flag may indicate whether or not lossless coding is used for the current block. cu_transquant_bypass_flag may be referred to as transquant_bypass_flag. Here, the current block may be a CU.

For example, CU syntax according to the above-described embodiment may be as shown in the following table.

TABLE 8

| | Descriptor |
|---|---|
| coding_unit( x0, y0, cbWidth, cbHeight, treeType ) { | |
|   if(sps_transquant_bypass enable_flag) | |
|     cu_transquant_bypass_flag | ae(v) |
|   if( slice_type != I || sps_ibc_enabled_flag ) { | |
|     if( treeType != DUAL_TREE_CHROMA && | |
|       !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|       && !( cbWidth = = 4 && cbHeight = = 4 ) ) | |
|       pred_mode_flag | ae(v) |
|     if( ( ( slice_type = = I && cu_skip_flag[ x0 ][ y0 ] = =0 ) || | |
|       ( silce_type != I && ( CuPredMode[ x0 ][ y0 ] != MODE_INTRA || | |
|       ( cbWidth = = 4 && cbHeight = = 4 && cu_skip_flag[ x0 ][ y0 ] = = 0 ) ) ) ) && | |
|       sps_ibc_enabled_flag && ( cbWidth != 128 || cbHeight != 128 ) ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MsxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( 1byte_aligned( ) ) | |

TABLE 8-continued

|  | Descriptor |
|---|---|
| ``` |  |
|             pcm_alignment_zero_bit | f(1) |
|           pcm_sample( cbWidth, cbHeight, treeType) |  |
|         } else { |  |
|           if( treeType = = SINGLE_TREE  ||  treeType = = DUAL_TREE_LUMA ) { |  |
|             if( cbWidth <= 32  &&  cbHeight <= 32 ) |  |
|               intra_bdpcm_flag[ x0 ][ y0 ] | ae(v) |
|             if( intra_bdpcm_flag[ x0 ][ y0 ] ) |  |
|               intra_bdpcm_dir_flag[ x0 ][ y0 ] | ae(v) |
|             else { |  |
|               if(  sps_mip_enabled_flag   && |  |
|                 ( Abs( Log2( cbWidth ) − Log2( cbHeight ) ) <= 2 )   && |  |
|                   cbWidth <= MaxTbSizeY   &&   cbHeight <= MaxTbSizeY ) |  |
|                 intra_mip_flag[ x0 ][ y0 ] | ae(v) |
|               if( intra_mip_flag[ x0 ][ y0 ] ) { |  |
|                   intra_mip_mpm_flag[ x0 ][ y0 ] | ae(v) |
|                 if( intra_mip_mpm_flag[ x0 ][ y0 ] ) |  |
|                   intra_mip_mpm_idx[ x0 ][ y0 ] | ae(v) |
|                 else |  |
|                   intra_mip_mpm_remainder[ x0 ][ y0 ] | ae(v) |
|               } else ( |  |
|                 if( sps_mrl_enabled_flag   &&   ( ( y0 % CtbSizeY ) > 0 ) ) |  |
|                   intra_luma_ref_idx[ x0 ][ y0 ] | ae(v) |
|                 if ( sps_isp_enabled_flag   &&   intra_luma_ref_idx[ x0 ][ y0 ] = = 0   && |
|                     ( cbWidth <= MaxTbSizeY   &&   cbHeight <= MaxTbSizeY )   && |  |
|                     ( cbWidtb * cbHeight > MinlbSizeY * MinTbSizeY ) ) |  |
|                   intra_subpartitions_mode_flag[ x0 ][ y0 ] | ae(v) |
|                 if( intra_subpartitions_mode_flag[ x0 ][ y0 ] = = 1   && |  |
|                     cbWidth <= MaxTbSizeY   &&   cbHeight <= MaxTbSizeY ) |  |
|                   intra_subpartitions_split_flag[ x0 ][ y0 ] | ae(v) |
|                 if( intra_luma_ref_idx[ x0 ][ y0 ] = = 0   && |  |
|                   intra_subpartitions_mode_flag[ x0 ][ y0 ] = = 0 ) |  |
|                   intra_luma_mpm_flag[ x0 ][ y0 ] | ae(v) |
|                 if( intra_luma_mpm_flag[ x0 ][ y0 ] ) { |  |
|                   if( intra_luma_ref_idx[ x0 ][ y0 ] = = 0 ) |  |
|                     intra_luma_not_planar_flag[ x0 ][ y0 ] | ae(v) |
|                   if( intra_luma_not_planar_flag[ x0 ][ y0 ] ) |  |
|                     intra_luma_mpm_idx[ x0 ][ y0 ] | ae(v) |
|                 } else |  |
|                   intra_luma_mpm_reimainder[ x0 ][ y0 ] | ae(v) |
|               } |  |
|             } |  |
|           } |  |
|           if( treeType = = SINGLE_TREE  ||  treeType = = DUAL_TREE_CHROMA ) |  |
|             intra_chroma_pred mode[ x0 ][ y0 ] | ae(v) |
|         } |  |
|       } else if( treeType != DUAL_TREE_CHROMA ) { /* MODE_INTER or MODE_IBC */ |  |
|         if( cu_skip_flag[ x0 ][ y0 ] = = 0 ) |  |
|           general_merge_flag[ x0 ][ y0 ] | ae(v) |
|         if( general_merge_flag[ x0 ][ y0 ] ) { |  |
|           merge_data( x0, y0, cbWidth, cbHeight ) |  |
|         } else if ( CuPredMode[ x0 ][ y0 ]  = =   MODE_IBC ) { |  |
|           mvd_coding( x0, y0, 0, 0 ) |  |
|           mvp_l0_flag[ x0 ][ y0 ] | ae(v) |
|           if( sps_amvr_enabled_flag && |  |
|               ( MvdL0[ x0 ][ y0 ][ 0 ] != 0   ||   MvdL0[ x0 ][ y0 ][ 1 ] != 0 ) ) { |  |
|             amvr_precision_flag[ x0 ][ y0 ] | ae(v) |
|           } |  |
|         } else { |  |
|           if( slice_type = = B ) |  |
|             inter_pred_idc[ x0 ][ y0 ] | ae(v) |
|           if( sps_affine_enabled_flag &&   cbWidth >= 16   &&   cbHeight >= 16 ) { |  |
|             inter_affine_flag[ x0 ][ y0 ] | ae(v) |
|             if( sps_affine_type_flag   &&   inter_affine_flag[ x0 ][ y0 ] ) |  |
|               cu_affine_type_flag[ x0 ][ y0 ] | ae(v) |
|           } |  |
|           if( sps_amvd_enabled_flag   &&   inter_pred_idc[ x0 ][ y0 ] = = PRED_BI   && |  |
|           !inter_affine_flag[ x0 ][ y0 ]   &&   RefIdxSymL0 > −1   &&   RefIdxSymL1 > −1 ) |  |
|             sym_mvd_flag[ x0 ][ y0 ] | ae(v) |
|           if( inter_pred_idc[ x0 ][ y0 ]   !=   PRED_L1 ) { |  |
|             if( NumRefIdxActive[ 0 ] > 1   &&   !sym_mvd_flag[ x0 ][ y0 ] ) |  |
|               ref_idx_l0[ x0 ][ y0 ] | ae(v) |
|             mvd_coding( x0, y0, 0, 0 ) |  |
|             if( MotionModelIdc[ x0 ][ y0 ] > 0 ) |  |
|               mvd_coding( x0, y0, 0, 1 ) |  |
|             if(MotionModelIdc[ x0 ][ y0 ] > 1 ) |  |
|               mvd_coding( x0, y0, 0, 2 ) |  |

TABLE 8-continued

|  | Descriptor |
|---|---|
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ]  !=  PRED_L0 ) { | |
|       if( NumRefIdxActive[ 1 ] > 1   &&   !sym_mvd_flag[ x0 ][ y0 ] ) | |
|         ref_idx_l1[ x0 ][ y0 ] | ae(v) |
|       if( mvd_l1_zero_flag  &&   inter_pred_idc[ x0 ][ y0 ]  = =  PRED_BI ) { | |
|         MvdL1[ x0 ][ y0 ][ 0 ] = 0 | |
|         MvdL1[ x0 ][ y0 ][ 1 ] = 0 | |
|         MvdCpL1[ x0 ][ y0 ][ 0 ][ 0 ] = 0 | |
|         MvdCpL1[ x0 ][ y0 ][ 0 ][ 1 ] = 0 | |
|         MvdCpL1[ x0 ][ y0 ][ 1 ][ 0 ] = 0 | |
|         MvdCpL1[ x0 ][ y0 ][ 1 ][ 1 ] = 0 | |
|         MvdCpL1[ x0 ][ y0 ][ 2 ][ 0 ] = 0 | |
|         MvdCpL1[ x0 ][ y0 ][ 2 ][ 1 ] = 0 | |
|       } else { | |
|         if( sym_mvd_flag[ x0 ][ y0 ] ) { | |
|           MvdL1[ x0 ][ y0 ][ 0 ] = −MvdL0[ x0 ][ y0 ][ 0 ] | |
|           MvdL1[ x0 ][ y0 ][ 1 ] = −MvdL0[ x0 ][ y0 ][ 1 ] | |
|         } else | |
|           mvd_coding( x0, y0, 1, 0 ) | |
|         if( MotionModelIdc[ x0 ][ y0 ] > 0 ) | |
|           mvd_coding( x0, y0, 1, 1 ) | |
|         if(MotionModelIdc[ x0 ][ y0 ] > 1 ) | |
|           mvd_coding( x0, y0, 1, 2 ) | |
|         mvp_l1_flag[ x0 ][ y0 ] | ae(v) |
|       } | |
|     } else { | |
|       MvdL1[ x0 ][ y0 ][ 0 ] = 0 | |
|       MvdL1[ x0 ][ y0 ][ 1 ] = 0 | |
|     } | |
|     if( ( sps_amvr_enabled_flag  &&   inter_affine_flag[ x0 ][ y0 ]  = =  0  && | |
|       ( MvdL0[ x0 ][ y0 ][ 0 ]  !=0   ||  MvdL0[ x0 ][ y0 ][ 1 ] != 0   || | |
|       MvdL1[ x0 ][ y0 ][ 0 ]  !=0   ||  MvdL1[ x0 ][ y0 ][ 1 ] != 0 ) )   || | |
|       ( sps_affine_amvr_enabled_flag  &&   inter_affine_flag[ x0 ][ y0 ]  = =  1  && | |
|       ( MvdCpL0[ x0 ][ y0 ][ 0 ][ 0 ]  != 0   ||  MvdCpL0[ x0 ][ y0 ][ 0 ][ 1 ] != 0   || | |
|       MvdCpL1[ x0 ][ y0 ][ 0 ][ 0 ]  != 0   ||  MvdCpL1[ x0 ][ y0 ][ 0 ][ 1 ] != 0   || | |
|       MvdCpL0[ x0 ][ y0 ][ 1 ][ 0 ]  != 0   ||  MvdCpL0[ x0 ][ y0 ][ 1 ][ 1 ] != 0   || | |
|       MvdCpL1[ x0 ][ y0 ][ 1 ][ 0 ]  != 0   ||  MvdCpL1[ x0 ][ y0 ][ 1 ][ 1 ] != 0   || | |
|       MvdCpL0[ x0 ][ y0 ][ 2 ][ 0 ]  != 0   ||  MvdCpL0[ x0 ][ y0 ][ 2 ][ 1 ] != 0   || | |
|       MvdCpL1[ x0 ][ y0 ][ 2 ][ 0 ]  != 0   ||  MvdCpL1[ x0 ][ y0 ][ 2 ][ 1 ]  != 0 ) ) { | |
|       amvr_flag[ x0 ][ y0 ] | ae(v) |
|       if( amvr_flag[ x0 ][ y0 ] ) | |
|         amvr_precision_flag[ x0 ][ y0 ] | ae(v) |
|     } | |
|     if( sps_bcw_enabled_flag  &&   inter_pred_idc[ x0 ][ y0 ]  = =  PRED_BI  && | |
|       luma_weight_l0_flag[ ref_idx_l0 [ x0 ][ y0 ] ]  = =  0  && | |
|       luma_weight_l1_flag[ ref_idx_l1 [ x0 ][ y0 ] ]  = =  0  && | |
|       chroma_weight_l0_flag[ ref_idx_l0 [ x0 ][ y0 ] ]  = =  0  && | |
|       chroma_weight_l1_flag[ ref_idx_l1 [ x0 ][ y0 ] ]  = =  0  && | |
|       cbWidth * cbHeight  >=   256 ) | |
|       bcw_idc[ x0 ][ y0 ] | ae(v) |
|   } | |
| } | |
| if( !pcm_flag[ x0 ][ y0 ] ) { | |
|   if( CuPredMode[ x0 ][ y0 ]  !=  MODE_INTRA  && | |
|     general_merge_flag[ x0 ][ y0 ]  = =   0 ) | |
|     cu_cbf | ae(v) |
|   if( cu_cbf ) { | |
|     if( CuPredMode[ x0 ][ y0 ]  = =  MODE_INTER  &&  sps_sbt_enabled_flag  && | |
|       !ciip_flag[ x0 ][ y0 ]   &&   !MergeTriangleFlag[ x0 ][ y0 ] ) { | |
|       if( cbWidth <= MaxSbtSize   &&   cbHeight <= MaxSbtSize ) { | |
|         allowSbtVerH  =  cbWidth >= 8 | |
|         allowSbtVerQ  =  cbWidth >= 16 | |
|         allowSbtHorH  =  cbHeight >= 8 | |
|         allowSbtHorQ  =  cbHeight >= 16 | |

TABLE 8-continued

| | Descriptor |
|---|---|
|       if( allowSbtVerH \|\| allowSbtHorH \|\| allowSbtVerQ \|\| allowSbtHorQ ) | |
|         cu_sbt_flag | ae(v) |
|       } | |
|       if( cu_sbt_flag ) { | |
|         if( ( allowSbtVerH \|\| allowSbtHorH ) && ( allowSbtVerQ \|\| allowSbtHorQ ) ) | |
|           cu_sbt_quad_flag | ae(v) |
|         if( ( cu_sbt_quad_flag && allowSbtVerQ && allowSbtHorQ ) \|\| <br>          ( !cu_sbt_quad_flag && allowSbtVerH && allowSbtHorH ) ) | |
|           cu_sbt_horizontal_flag | ae(v) |
|         cu_sbt_pos_flag | ae(v) |
|       } | |
|     } | |
|     numSigCoeff = 0 | |
|     numZeroOutSigCoeff = 0 | |
|     transform_tree( x0, y0, cbWidth, cbHeight, treeType ) | |
|     lfnstWidth = ( treeType == DUAL_TREE_CHROMA ) ? cbWidth / SubWidthC <br>          : cbWidth | |
|     lfnstHeight = ( treeType == DUAL_TREE_CHROMA ) ? cbHeight / SubHeightC <br>          : cbHeight | |
|     if( Min( lfnstWidth, lfnstHeight ) >= 4 && sps_lfnst_enabled_flag == 1 && <br>      CuPredMode[ x0 ][ y0 ] == MODE_INTRA && <br>      IntraSubPartitionsSplitType == ISP_NO_SPLIT && <br>      !intra_mip_flag[ x0 ][ y0 ] ) { | |
|       if( ( numSigCoeff > ( ( treeType == SINGLE_TREE ) ? 2 : 1 ) ) && <br>        numZeroOutSigCoeff == 0 ) | |
|         lfnst_idx[ x0 ][ y0 ] | ae(v) |
|     } | |
|   } | |
| } | |

Additionally, for example, a semantic of a syntax element for the above-described embodiment among the syntax elements of said CU syntax may be represented as shown in the following table.

TABLE 9

| |
|---|
| cu_transquant_bypass_flag equal to 1 specifies that the scaling and transform process and the in-loop filter process are bypassed when cu_transquant_bypass_flag is not present, it is inferred to be equal to 0. |

For example, when the value of cu_transquant_bypass_flag is 1, it may be indicated that lossless coding is used for the current block. Accordingly, (inverse) transform, (de)quantization, and/or in-loop filtering procedures may not be applied to the current block.

Additionally, the embodiment of this document proposes a method of not applying the ALF procedure to the current block when the above-described lossless coding is applied. For example, as described above, whether or not the lossless coding is applied may be determined by a flag (e.g., cu_transquant_bypass_flag, etc.) regarding whether or not the lossless coding is applied, or by other method described above.

For example, when the value of the above-described cu_transquant_bypass_flag is 1, the luma component of the current block may be replaced with a sample to which the ALF filter is not applied and which has not been subjected to the ALF filtering as shown in Table 10 below. Additionally, when the value of the above-described cu_transquant_bypass_flag is 1, the chroma component of the current block may be replaced with a sample to which the ALF filter is not applied and which has not been subjected to the ALF filtering as shown in Table 11 below.

TABLE 10

| |
|---|
| Coding tree Hock filtering process for luma samples |
| .... |
| - The modified filtered reconstructed luma picture sample alfPicture$_L$[ xCtb + x ][ yCtb + y ] is derived as follows: <br>  - If pcm_loop_filter_disabled_flag and pcm_flag[ xCtb+ x ][ yCtb + y ] are both equal to 1, the following applies: <br>    alfPicturp$_L$[ xCtb + x ][ yCtb + y ] = recPicture$_L$[ h$_x$, v$_y$ ]    (8-1207) <br>  - If cu_transquant_bypass_flag[ xCtb+ x ][ yCtb + y ] is equal to 1, the following applies: <br>    alfPicture$_L$[ xCtb + x ][ yCtb + y ] = recPicture$_L$[ h$_x$, v$_y$ ]    (8-1207) <br>  - Otherwise (pcm_loop_filter_disabled_flag is equal to 0 or pcm_flag[ x ][ y ] is equal 0), the following applies; <br>    alfPicture$_L$[ xCtb + x ][ yCtb + y ] = Clip3( 0, ( 1 << BitDepth$_Y$ ) − 1, sum ) (8-1208) |

TABLE 11

Coding tree block filtering process for chroma samples

.....
- The modified filtered reconstructed chroma picture sample
  alfPicture[ xCtbC + x ][ yCtbC + y ] is derived as follows:
  - If pcm_loop_filter_disabled_flag and
    pcm_flag[ ( xCtbC + x ) * SubWidthC ][ ( yCtbC + y ) * SubHeightC ] are both equal to
    1, the following applies:
            alfPicture[ xCtbC + x ][ yCtbC + y ] = recPicture$_L$[ h$_x$, v$_y$ ]        (8-1259)
    Otherwise, if
    cu_transquant_bypass_flag[ ( xCtbC + x ) * SubWidthC ][ ( yCtbC + y ) * SubHeightC ]
    is equal to 1, the following applies:
            alfPicture[ xCtbC + x ][ yCtbC + y ] = recPicture$_L$[ h$_x$, v$_y$ ]        (8-1259)
  - Otherwise (pcm_loop_filter_disabled_flag is equal to 0 or pcm_flag[ x ][ y ] is equal 0),
    the following applies:
            alfPicture[ xCtbC + x ][ yCtbC + y ] = Clip3( 0, ( 1 << BitDepthC ) − 1, sum ) (8-126
            0)

Additionally, the embodiment of this document proposes a method of performing a PCM operation on the current block when the above-described lossless coding is applied. For example, whether or not the lossless coding is applied may be determined by a flag (e.g., cu_transquant_bypass_flag, etc.) regarding whether or not the lossless coding is applied, or by other method described above.

In FIGS. 2 and 3, as described above, the intra predictor may generate a prediction block for the current block by performing prediction based on pixel information in the current picture. For example, the intra predictor may predict a pixel value in the current block by using pixels in the reconstructed block located top, left, top-left, and/or top-right around the current block. In this case, a processing unit in which prediction is performed and a processing unit in which a prediction method and specific content are determined may be different. For example, a prediction method and a prediction mode may be determined in units of PUs, and prediction may be performed in units of TUs.

Intra prediction may be performed according to the infra prediction mode for each PU in the current block (e.g., CU). The intra prediction mode may include vertical, horizontal, DC, planar, angular modes, and the like according to the positions and/or prediction methods of reference pixels used for prediction of pixel values of the current block. In the vertical mode, prediction may be performed in the vertical direction by using a pixel value of an adjacent block, and in the horizontal mode, prediction may be performed in the horizontal direction by using a pixel value of an adjacent block. Additionally, in the DC mode, a prediction block may be generated by averaging pixel values of reference pixels. In the angular mode, prediction may be performed according to a predetermined angle and/or direction for each mode. Additionally, for intra prediction, a predetermined prediction direction and prediction mode value may be used.

When the prediction mode for the current block is the intra mode, the encoding apparatus and the decoding apparatus may use an I_PCM mode (Intra Pulse Code Modulation) besides the intra prediction mode, for lossless encoding. The I_PCM mode may be referred to as a PCM mode. When the I_PCM mode is applied to the current block, the encoding apparatus may transmit pixel values in the current block to the decoding apparatus as they are, without performing prediction, transform, and/or quantization thereon. In this case, for example, pixel values in the current block may be coded in a raster scan order and transmitted to the decoding apparatus. The encoding apparatus may not perform prediction, inverse scaling, inverse transform, and/or dequantization on a block to which the I_PCM mode is applied. In this case, the decoding apparatus may parse the pixel values transmitted from the encoding apparatus, and then derive a pixel value in a reconstructed block directly from the parsed pixel values.

When the I_PCM mode is used, the encoding apparatus may transmit information on whether or not the I_PCM mode is applied to the current block (e.g., CU) to the decoding apparatus. The information may be indicated, for example, by a PCM flag (pcm_flag). Here, the PCM flag may be a flag indicating whether or not the I_PCM mode is applied to the current block, that is, whether or not the current block is coded by I_PCM. The decoding apparatus may entropy-encode the flag and transmit it to the encoding apparatus. In this case, the decoding apparatus may receive and decode the encoded PCM flag, and may determine whether or not I_PCM is applied to the current block by using the decoded PCM flag.

As described above, in the case that pixel values in the current block are coded with I_PCM, the decoding apparatus may not perform prediction, inverse scaling, inverse transform and/or dequantization, etc. on the current block. In this case, after parsing the pixel value transmitted from the encoding apparatus, the decoding apparatus may derive the reconstructed pixel value directly from the parsed pixel value. Here, the reconstructed pixel value may mean a reconstructed pixel value prior to the application of an in-loop filter.

In addition, a PCM flag (pcm_flag) is signaled at the CU level, and when pcm_flag is 1, a PCM operation may be performed. The semantic of pcm_flag may be expressed as shown in the following table.

TABLE 12 pcm_flag[ x0 ][ y0 ] equal to 1 specifies that the pcm_sample( ) syntax structure is present and
the transform_tree( ) syntax structure is not present in the coding unit including the luma coding
block at the location ( x0, y0 ). pcm_flag[ x0 ][ y0 ] equal to 0 specifies that pcm_sample( )
syntax structure is not present. When pcm_flag[ x0 ][ y0 ] is not present, it is inferred to be equal
to 0.
The value of pcm_flag[ x0 + i ][ y0 +j ] with i = 1..cbWidth − 1, j = 1..cbHeight − 1 is inferred
to be equal to pcm_flag[ x0 ][ y0 ].

Meanwhile, when the value of pcm_flag is 1, a prediction block may be generated with a sample value expressed by pcm bit depth transmitted from the SPS through the decoding procedure as shown in Table 13 below, and the corresponding prediction block may be used as a decoding block.

TABLE 13

General decoding process for coding anils coded in intra prediction mode

Inputs to this process are:
- a luma location ( xCb, yCb ) specifying the top-left sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single or a dual tree is used and if a dual tree is used, it specifies whether the current tree corresponds to the luma or chrome components.

Output of this process is a modified reconstructed picture before in-loop filtering.
The derivation process for quantization parameters as specified in clause 8.7.1 is invoked with the luma location ( xCb, yCb ), the width of the current coding block in luma samples cbWidth and the height of the current coding block in luma samples cbHeight, and the variable treeType as inputs.
When treeType is equal to SINGLE_TREE of treeType is equal to DUAL_TREE_LUMA, the decoding process for luma samples is specified as follows:
- If pcm_flag[ xCb ][ yCb ] is equal to 1, the reconstructed picture is modified as follows:
  $S_L$[ xCb + i ][ yCb t j ] =
  pcm_sample_luma[ ( cbHeight * j ) + i ] << ( $BitDepth_Y$ – $PcmBitDepth_Y$ ),     (8-6)
  with i = 0..cbWidth − 1, j = 0..xbHeight − 1
- Otherwise, the following applies:
  ......

When treeType is equal to SINGLE_TREE or treeType is equal to DUAL_TREE_CHROMA, the decoding process for chroma samples is specified as follows:
- If pcm.flag[ xCb ][ yCb ] is equal to 1, the reconstructed picture is modified as follows:
  $S_{Cb}$[ xCb / SubWidthC + i ][ yCb / SubHeightC + j ] =
  pcm_sample_chroma[ ( cbHeight / SubWidthC * j ) + i ] << ( $BitDepth_C$ – $PcmBitDepth_C$ ),
  with i = 0.. cbWidth / SubWidthC − 1 and j = 0.. cbHeight / SubHeightC − 1     (8-8)
  $S_{Cr}$[ xCb / SubWidthC + i ][ yCb / SubHeightC + j ] =
  pcm_sample_chroma[ ( cbHeight / SubWidthC * ( j + cbHeight / SubHeightC ) ) + i ] << ( $BitDepth_C$ – $PcmBitDepth_C$ ),
  with i = 0..cbWidth / SubWidthC − 1 and j = 0..cbHeight / SubHeightC − 1     (8-9)
- Otherwise, the following applies:
  .....

In foregoing Table 13, pcm_sample_luma may indicate a pixel value of a luma component that is encoded in the I_PCM mode for the current block and transmitted to the decoding apparatus. In addition, $PCMBitDepth_Y$ may mean the number of bits used to represent each pixel corresponding to pcm_sample_luma, and $BitDepth_Y$ may mean the bit depth of luma component pixels in the current block.

Further, in foregoing Table 13, pcm_sample_chroma may indicate a pixel value of a chroma component that is encoded in the I_PCM mode for the current CU and transmitted to the decoding apparatus. In addition, $PCMBitDepth_C$ may mean the number of bits used to represent each pixel corresponding to pcm_sample_chroma, and $BitDepth_C$ may mean the bit depth of chroma component pixels in the current CU.

For example, the $PcmBitDepth_Y$ and the $PcmBitDepth_C$ may be derived as shown in Table 14 below by pcm_sample_bit_depth_luma_minus1 and pcm_sample_bit_depth_chroma_minus1 signaled in sps.

TABLE 14 bit_depth_luma_minus8 specifies the bit depth of the samples of the luma array $BitDepth_Y$ and the value of the luma quantization parameter range offset $QpBdOffset_Y$ as follows:
  $BitDepth_Y$ = 8 + bit_depth_luma_minus8     (7-4)
  $QpBdOffset_Y$ = 6 * bit_depth_luma_minus8     (7-5)
bit_depth_luma_minus8 shall be in the range of 0 to 8, inclusive.
bit_depth_chroma_minus8 specifies the bit depth of the samples of the chroma arrays $BitDepth_C$ and the value of the chroma quantization parameter range offset $QpBdOffset_C$ as follows:
  $BitDepth_C$ = 8 + bit_depth_chroma_minus8     (7-6)
  $QpBdOffset_C$ = 6 * bit_depth_chroma_minus8     (7-7)
bit_depth_chroma_minus8 shall be in the range of 0 to 8, inclusive.
pcm_sample_bit_depth_luma_minus1 specifies the number of bits used to represent each of PCM sample values of the luma component as follows:
  $PcmBitDepth_Y$ = pcm_sample_bit_depth_luma_minus1 + 1     (7-32)
The value of $PcmBitDepth_Y$ shall be less than or equal to the value of $BitDepth_Y$.
pcm_sample_bit_depth_chroma_minus1 specifies the number of bits used to represent each of PCM sample values of the chroma components as follows:
  $PcmBitDepth_C$ = pcm_sample_bit_depth_chroma_minus1 + 1     (7-33)

Meanwhile, in the case that the value of cu_transquant_bypass_flag is 1 and the value of pcm flag is 1, when the PcmBitDepth$_Y$ and the PcmBitDepth$_C$ have smaller values than the BitDepth$_Y$ and the BitDepth$_C$, a loss may occur in the block induced to the PCM.

Accordingly, an embodiment proposed in this document proposes a method in which, when the value of cu_transquant_bypass_flag is 1, a block coded with PCM is coded with the BitDepth$_Y$ and the BitDepth$_C$ instead of the PcmBitDepth$_Y$ and the PcmBitDepth$_C$ as shown in Table 15 below.

Additionally, the embodiment of this document proposes a method of performing a Block-based Delta Pulse Code Modulation (BDPCM) operation on a current block when the aforementioned lossless coding is applied. For example, whether or not the lossless coding is applied may be determined by a flag (e.g., cu_transquant_bypass_flag, etc.) regarding whether or not the lossless coding is applied, or by other method described above.

According to an embodiment, a block differential pulse coded modulation (BDPCM) or block-based Delta Pulse

TABLE 15

General deceding process for coding units ceded in intro prediction mode

Inputs to this process are:
- a luma location ( xCb, yCb ) specifying the top-left sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single or a dual tree is used and if a dual tree is used, it specifies whether the current tree corresponds to the luma or chroma components.

Output of this process is a modified reconstructed picture before in-loop filtering.
The derivation process for quantization parameters as specified in clause 8.7.1 is invoked with the luma location ( xCb, yCb ), the width of the current coding block in luma samples cbWidth and the height of the current coding block in luma samples cbHeight, and the variable treeType as inputs.
When treeType is equal to SINGLE_TREE or treeType is equal to DUAL_TREE_LUMA, the decoding process for luma samples is specified as follows:
- If pcm_flag[ xCb ][ yCb ] is equal to 1 and cu_transquant_bypass_flag[ xCb ][ yCb ] is not equal to 1, the reconstructed picture is modified as follows:
    $S_L$[ xCb + i ][ yCb + j ] =
        pcm_sample_luma[ ( cbHeight * j ) + i ] << ( BitDepth$_Y$ − PcmBitDepth$_Y$ ),    (8-6)
        with i = 0..cbWidth − 1, j = 0..cbHeight − 1
- Otherwise, the following applies:
    ......
When treeType is equal to SINGLE_TREE or treeType is equal to DUAL_TREE_CHROMA, the decoding process for chroma samples is specified as follows:
- If pcm_flag[ xCb ][ yCb ] is equal to 1 and cu_transquant_bypass_flag[ xCb ][ yCb ] is not equal to 1, the reconstructed picture is modified as follows:
    $S_{Cb}$[ xCb / SubWidthC + i ][ yCb / SubHeightC + j ] =
        pcm_sample_chroma[ ( cbHeight / SubWidthC * j ) + i ] << ( BitDepth$_C$ − PcmBitDeptb$_C$ ),
        with i = 0.. cbWidth / SubWidthC − 1 and j = 0.. cbHeight / SubHeightC − 1    (8-8)
    $S_{Cr}$[ xCb / SubWidthC + i ][ yCb / SubHeightC + j ] =
        pcm_sample_chroma[ ( cbHeight / SubWidthC * ( j + cbHeight / SubHeightC ) ) + i ] <<
        ( BitDepth$_C$ − PcmBitDeptb$_C$ ),
        with i = 0..cbWidth / SubHeightC − 1 and j = 0..cbHeight / SubHeightC − 1    (8-9)
- Otherwise if if pcm_flag[ xCb ][ yCb ] is equal to 1 cu_transquant_bypass_flag[ xCb ][ yCb ] is equal to 1, the reconstructed picture is modified as follows:
    $S_{Cb}$[ xCb / SubWidthC + i ][ yCb / SubHeightC + j ] =
        pcm_sample_chroma[ (cbHeight / SubWidthC * j ) + i ] .
        with i = 0.. cbWidth / SubWidthC − 1 and j = 0.. cbHeight / SubHeightC − 1    (8-8)
    $_{SCr}$[ xCb / SubWidthC + i ][ yCb / SubHeightC + j ] =
        pcm_sample_chroma[ ( cbHeight / SubWidlbC * ( j + cbHeight / SubHeightC ) ) + i ].
        with i = 0..cbWidth / SubWidthC − 1 sad j = 0..cbHeight / SubHeightC − 1    (8-9)
- Otherwise, the following applies:
    .....

For example, the semantic of the syntax element for the above-described embodiment may be represented as shown in the following table.

Code Modulation (BDPCM) technique may be used. BDPCM may also be referred to as quantized residual block-based Delta Pulse Code Modulation (RDPCM).

TABLE 16 pcm_sample_luma[ i ] represents a coded luma sample value in the raster scan within the coding unit. The number of bits used to represent as following:
- if cu_transquant_bypass_flag[ xCb ][ yCb ] is equal to 0, each of these samples is PcmBitDepth$_Y$.
- otherwise if cu_transquant_bypass_flag[ xCb ][ yCb ] is equal to 1, each of these samples is BitDepth$_Y$.

pcm_sample_chroma[ i ] represents a coded chroma sample value in the raster scan within the coding unit. The first half of the values represent coded Cb samples and the remaining half of the values represent coded Cr samples. The number of bits used to represent as following:
- if cu_transquant_bypass_flag[ xCb ][ yCb ] is equal to 0, each of these samples is PcmBitDepth$_C$.
- if cu_transquant_bypass_flag[ xCb ][ yCb ] is equal to 1, each of these samples is BitDepth$_C$.

When predicting a block by applying BDPCM, reconstructed samples may be utilized to predict a row or column of the block line-by-line. The reference sample used in this time may be an unfiltered sample.

The BDPCM direction may indicate whether vertical direction or horizontal direction prediction is used. That is, when BDPCM is applied, a vertical direction or a horizontal direction may be selected as the BDPCM direction, and prediction may be performed in the BDPCM direction. The prediction error may be quantized in the spatial domain, and the sample may be reconstructed by adding the dequantized prediction error to the prediction (i.e., the prediction sample). The prediction error may mean a residual.

For a block of M×N size, a residual derived by using a prediction value obtained by performing intra prediction in a horizontal direction (Copying left neighboring sample line to the prediction block line-by-line) or intra prediction in a vertical direction (Copying top neighboring sample line to the prediction block line-by-line) using unfiltered samples among left or top boundary samples (i.e., the left neighboring samples or the top neighboring samples) may be assumed as $r_{(i,j)}$ (0≤i≤M−1, 0≤j≤N−1). Here, M may represent a row or height, and N may represent a column or width. And, it may be assumed that the quantized value of the residual $r_{(i,j)}$ is $Q(r_{(i,j)})$ (0≤i≤M−1, 0≤j≤N−1). In this connection, the residual means a difference value between the value of the original block and the value of the prediction block.

Then, if BDPCM is applied to the quantized residual sample, a modified array $\bar{R}$ of M×N consisting of $\tilde{r}_{i,j}$ may be derived.

For example, when vertical BDPCM is signaled (i.e., when vertical BDPCM is applied), $\tilde{r}_{i,j}$ may be derived as shown in the following equation.

$$\tilde{r}_{i,j} = \begin{cases} Q(r_{i,j}), & i=0, 0 \le j \le (N-1) \\ Q(r_{i,j}) - Q(r_{(i-1),j}). & 1 \le i \le (M-1), 0 \le j \le (N-1) \end{cases}$$ [Equation 4]

That is, for example, when vertical BDPCM is applied, the encoding apparatus may perform vertical infra prediction based on top neighboring samples, and quantized residual samples for the current block may be derived as in Equation 4 described above. Referring to Equation 4 above, the quantized residual sample of rows except the first row of the current block may be derived as a difference between the quantized value for the corresponding position and the quantized value for the position of the previous row at the corresponding position (i.e., the top neighboring position of the corresponding position).

In addition, when similarly applied to horizontal prediction (i.e., when BDPCM of the horizontal direction is applied), the quantized residual samples may be derived as the following equation.

$$\tilde{r}_{i,j} = \begin{cases} Q(r_{i,j}), & 0 \le i \le (M-1), j=0 \\ Q(r_{i,j}) - Q(r_{i,(j-1)}). & 0 \le i \le (M-1), 1 \le j \le (N-1) \end{cases}$$ [Equation 5]

That is, for example, when horizontal BDPCM is applied, the encoding apparatus may perform horizontal intra prediction based on left neighboring samples, and quantized residual samples for the current block may be derived as in Equation 5 described above. Referring to Equation 5 above, the quantized residual sample of columns except the first column of the current block may be derived as a difference between the quantized value for the corresponding position and the quantized value for the position of the previous column at the corresponding position (i.e., the left neighboring position of the corresponding position).

The quantized residual sample $\tilde{r}_{i,j}$ may be transmitted to the decoding apparatus.

In the decoding apparatus, the above operation may be performed inversely to derive $Q(r_{(i,j)})$ (0≤i≤M−1, 0≤j≤N−1).

To vertical prediction, the following equation may be applied.

$$Q(r_{i,j}) = \Sigma_{k=0}^{i} \tilde{r}_{k,j}, 0 \le i \le (M-1), 0 \le j \le (N-1)$$ [Equation 6]

Additionally, to horizontal prediction, the following equation may be applied.

$$Q(r_{i,j}) = \Sigma_{k=0}^{j} \tilde{r}_{i,k}, 0 \le i \le (M-1), 0 \le j \le (N-1)$$ [Equation 7]

The dequantized quantized residual $Q^{-1}$ ($Q(r_{i,j})$) is summed with the intra block prediction value to derive the reconstructed sample value.

The main advantage of this technique is that inverse BDPCM can be performed by simply adding predictors at the time of parsing the coefficients or after parsing.

As described above, the BDPCM may be applied to a quantized residual domain, and the quantized residual domain may include a quantized residual (or quantized residual coefficient), in which case transform skip may be applied to the residual.

That is, when BDPCM is applied, transform may be skipped for the residual sample, and quantization may be applied to the same.

Alternatively, the quantized residual domain may include the quantized transform coefficient. A flag indicating whether or not BDPCM is applicable may be signaled in a sequence level (SPS), and this flag may also be signaled only when it is signaled that a transform skip mode is possible in the SPS. The flag may be referred to as a BDPCM enabled flag or an SPS BDPCM enabled flag.

When BDPCM is applied, intra prediction for the quantized residual domain may be performed on the entire block by sample copy according to a prediction direction (e.g., vertical prediction or horizontal prediction) similar to the intra prediction direction. The residual is quantized, and a delta value, that is, a difference value between the quantized residual and a predictor in the horizontal or vertical direction (i.e., the quantized residual in the horizontal or vertical direction) may be coded.

In the case that BDPCM is applicable, when the CU size is less than or equal to MaxTsSize (maximum transform skip block size) for a luma sample, and the CU is coded with intra prediction, the flag information may be transmitted in the CU level. The flag information may be referred to as a BDPCM flag. Here, MaxTsSize may mean the maximum block size for allowing the transform skip mode. The flag information may indicate whether conventional intra coding or BDPCM is applied. When BDPCM is applied, a BDPCM prediction direction flag indicating whether the prediction direction is a horizontal direction or a vertical direction may be transmitted. The BDPCM prediction direction flag may be referred to as a BDPCM direction flag. Thereafter, the block may be predicted through a conventional horizontal or vertical intra prediction process using an unfiltered reference sample. In addition, the residual may be quantized, and a difference value between each quantized residual and its predictor, for example, a residual of neighboring position already quantized in a horizontal or vertical direction according to a BDPCM prediction direction, may be coded.

CU syntax elements for the above-described BDPCM flag and BDPCM direction flag and semantics for the syntax elements may be represented as shown in the following tables.

TABLE 17

| | Descriptor |
|---|---|
| coding_unit( x0, y0, cbWidth, cbHeight, treeType ) {<br>  if( slice_type != I \|\| sps_ibc_enabled_flag ) {<br>    if( treeType != DUAL_TREE_CHROMA &&<br>      !( cbWidth = = 4 && cbHeight = = 4  &&  !sps_ibc_enabled_flag ) )<br>        cu_skip_flag[ x0 ][ y0 ] | ae(v) |
|     if( cu_skip_flag[ x0 ][ y0 ] = = 0  &&  slice_type != I<br>      && !( cbWidth = = 4 && cbHeight = = 4 ) )<br>        pred_mode_flag | ae(v) |
|     if( ( ( slice_type = = I  &&  cu_skip_flag[ x0 ][ y0 ] = =0 )  \|\|<br>      ( slice_type != I  &&  ( CuPredMode[ x0 ][ y0 ] != MODE_INTRA  \|\|<br>      ( cbWidth = = 4  &&  cbHeight = = 4  && cu_skip_flag[ x0 ][ y0 ] = = 0 ) ) ) ) &&<br>      sps_ibc_enabled_flag  &&  ( cbWidth != 128  \|\|  cbHeight != 128 ) )<br>        pred_mode_ibc_flag<br>  } | ae(v) |
|   if( CuPredMode[ x0 ][ y0 ]  = =  MODE_INTRA ) {<br>    if( sps_pcm_enabled_flag  &&<br>      cbWidth >= MinIpcmCbSizeY  &&  cbWidth <= MaxIpcmCbSizeY &&<br>      cbHeight >= MinIpcmCbSizeY  &&  cbHeight <= MaxIpcmCbSizeY )<br>        pcm_flag[ x0 ][ y0 ] | ae(v) |
|     if( pcm_flag[ x0 ][ y0 ] ) {<br>      while( !byte_aligned( ) )<br>        pcm_alignment_zero_bit | f(1) |
|       pcm_sample( cbWidth, cbHeight, treeType)<br>    } else {<br>      if( treeType = = SINGLE_TREE  \|\|  treeType = = DUAL_TREE_LUMA ) {<br>        if( cbWidth <= 32  &&  cbHeight <= 32 )<br>          intra_bdpcm_flag[ x0 ][ y0 ] | ae(v) |
|         if( intra_bdpcm_flag[ x0 ][ y0 ] )<br>          intra_bdpcm_dir_flag[ x0 ][ y0 ]<br>... | ae(v) |

TABLE 18 intra_bdpcm_flag[ x0 ][ y0 ] equal to 1 specifies that BDPCM is applied to the current luma coding block at the location ( x0, y0 ), i.e. the transform is skipped, the intra luma prediction mode is specified by intra_bdpcm_dir_flag[ x0 ][ y0 ]. intra_bdpcm_dir_flag[ x0 ][ y0 ] equal to 0 specifies that BDPCM is not applied to the current luma coding block at the location ( x0, y0 ).
When intra_bdpcm_flag[ x0 ][ y0 ] is not present it is inferred to be equal to 0.
The variable BdpcmFlag[ x ][ y ] is set equal to intra_bdpcm_flag[ x0 ][ y0 ] for
x = x0..x0 + cbWidth − 1 and y = y0..y0 + cbHeight − 1.
intra_bdpcm_dir_flag[ x0 ][ y0 ] equal to 0 specifies that the BDPCM prediction direction is horizontal. intra_bdpcm_dir_flag[ x0 ][ y0 ] equal to 1 specifies that the BDPCM prediction direction is vertical.
The variable BdpcmDir[ x ][ y ] is set equal to intra_bdpcm_dir_flag[ x0 ][ y0 ] for
x = x0..x0 + cbWidth − 1 and y = y0..y0 + cbHeight − 1.

The syntax element intra_bdpcm_flag[x0][y0] of foregoing Table 18 may indicate whether or not BDPCM is applied to the current block. For example, if the value of intra_bdpcm_flag[x0][y0] is 1, then the BDPCM may be applied to the current block, the transform for the current block may be skipped, and intra_bdpcm_dir_flag[x0][y0] indicating the prediction direction for the current block may exist. Additionally, for example, if the value of intra_bdpcm_flag[x0] [y0] is 0, it may not be applied to the current block. Additionally, for example, if intra_bdpcm_flag[x0][y0] does not exist, this value may be regarded as 0.

The infra_bdpcm_dir_flag[x0][y0] may indicate a prediction direction for the current block. For example, if the value of the infra_bdpcm_dir_flag[x0][y0] is 1, the prediction direction for the current block may be a vertical direction, while, if the value of the intra_bdpcm_dir_flag[x0][y0] is 0, the prediction direction for the current block may be a horizontal direction.

Further, when BDPCM is applied, an example of the dequantization process may be represented in the following table.

TABLE 19

| Scaling process for transform coefficients |
|---|
| Inputs to this process are:<br>-         a luma location ( xTbY, yTbY ) specifying the top-left sample of the current luma transform block relative to the top-loft luma sample of the current picture,<br>-         a variable nTbW specifying the transform block width,<br>-         a varlable nTbH specifying the transform block height,<br>-         a variable cIdx specifying the colour component of the current block,<br>-         a variable bitDepth specifying the bit depth of the current colour component. |

TABLE 19-continued

Scaling process for transform coefficients

Output of this process is the (nTbW)×(nTbH) array d of scaled transform coefficients with elements d[ x ][ y ].
The quantization parameter qP is derived as follows:
- If cIdx is equal to 0, the following applies:
  qP = Qp'$_Y$     (8-940)
- Otherwise, if cIdx is equal to 1 and tu_joint_cbcr_residual[ xTbY ][ yTbY ] is equal to 1, the following applies:
  qP = Qp'$_{CbCr}$     (8-941)
- Otherwise, if cIdx is equal to 1, the following applies:
  qP = Qp'$_{Cb}$     (8-942)
- Otherwise (cIdx is equal to 2), the following applies:
  qP = Qp'$_{Cr}$     (8-943)

The variable rectNonTsFlag is derived as follows:
  rectNonTsFlag = ( ( ( Log2( nTbW ) + Log2( nTbH ) ) & 1 ) = = 1 && transform_skip_flag[ xTbY ][ yTbY ] = = 0 )     (8-944)

The variables bdShift, rectNorm and bdOffset are derived as follows:
  bdShift = bitDepth + ( ( rectNonTsFlag ? 1 : 0 ) + ( Log2( nTbW ) + Log2( nTbH ) ) / 2 ) − 5 + dep_quant_enabled_flag     (8-945)
  bdOffset = ( 1 << bdShift ) >> 1     (8-946)

The list levelScale[ ][ ] is specified as levelScale[ j ][ k ] = { { 40, 45, 51, 57, 64, 72 }, { 57, 64, 72, 81, 91, 102 } } with j = 0..1, k = 0..5.
The (nTbW)×(nTbH) array dz is set equal to the (nTbW)×(nTbH) array TransCoeffLevel[ xTbY ][ yTbY ][ cIdx ].
For the derivation of the scaled transform coefficients d[ x ][ y ] with x = 0..nTbW − 1, y = 0..nTbH − 1, the following applies:
- The intermediate scaling factor m[ x ][ y ] is set equal to 16.
- The scaling factor ls[ x ][ y ] is derived as follows:
  - If dep_quant_enabled_flag is equal to 1, the following applies:
    ls[ x ][ y ] = ( m[ x ][ y ] * levelScale[ rectNonTsFlag ][ (qP + 1) % 6 ] ) << ( (qP + 1) / 6 )     (8-947)
  - Otherwise (dep_quant_enabled_flag is equal to 0), the following applies:
    ls[ x ][ y ] = ( m[ x ][ y ] * levelScale[ rectNonTsFlag ][ qP % 6 ] ) << ( qP / 6 )     (8-948)
- When BdpcmFlag[ xTbY ][ yYbY ] is equal to 1, dz[ x ][ y ] is modified as follows:
  - If BdpcmDir[ xTbY ][ yYbY ] is equal to 0 and x is greater than 0, the following applies:
    dz[ x ][ y ] = Clip3( CoeffMin, CoeffMax, dz[ x − 1 ][ y ] + dz[ x ][ y ])     (8-949)
  - Otherwise, if BdpcmDir[ xTbY ][ yYbY ] is equal to 1 and y is greater than 0, the following applies:
    dz[ x ][ y ] = Clip3( CoeffMin, CoeffMax, dz[ x ][ y − 1 ] + dz[ x ][ y ])     (8-950)
- The value dnc[ x ][ y ] is derived as follows:
    dnc[ x ][ y ] = ( dz[ x ][ y ] * ls[ x ][ y ] +bdOffset ) >> bdShift     (8-951)
- The scaled transform coefficient d[ x ][ y ] is derived as follows:
    d[ x ][ y ] = Clip3( CoeffMin, CoeffMax, dnc[ x ][ y ])     (8-952)

Referring to Table 19, when the value of intra_bdpcm_flag is 1, d[x][y] corresponding to the dequantized residual coefficient (scaled transform coefficient) may be derived based on the intermediate variable dz[x][y]. Here, x, a horizontal coordinate, may increase from left to right; y, a vertical coordinate, may increase from top to bottom; and a position in the two-dimensional block may be expressed as (x, y). In addition, the position in the two-dimensional block indicates the (x, y) position when the top-left position of the block is set to (0, 0).

For example, when the value of intra_bdpcm_dir_flag is 0, that is, when horizontal BDPCM is applied, the variable dz[x][y] may be TransCoeffLevel[xTbY][yTbY][cIdx][x][y] when x is 0, while it may be derived based on dz[x−1][y]+dz[x][y] when x is not 0. That is, when horizontal BDPCM is applied (the value of bdpcm_dir_flag is 0), the variable dz[x][y] of the sample located in the first column where x is 0 is TransCoeffLevel[xTbY][yTbY][cIdx][x][y] derived based on the residual information of the sample, and the variable dz[x][y] of a sample located in a column other than the first column where x is not 0 may be derived as the sum of dz[x−1][y] of the sample's left neighboring sample and dz[x][y] for the sample. Here, dz[x][y] for the sample that is added to the dz[x−1][y] may be derived based on the signaled residual information about the sample.

Additionally, for example, when the value of intra_bdpcm_dir_flag is 1, that is, when vertical BDPCM is applied, the variable dz[x][y] may be derived based on dz[x][y−1]+dz[x][y]. That is, when vertical BDPCM is applied (the value of bdpcm_dir_flag is 1), the variable dz[x][y] of the sample located in the first row where y is 0 is TransCoeffLevel[xTbY][yTbY][cIdx][x][y] derived based on the residual information of the sample, and the variable dz[x][y] of a sample located in a row other than the first row where y is not 0 may be derived as the sum of dz[x][y−1] of the sample's top neighboring sample and dz[x][y] for the sample. Here, dz[x][y] for the sample that is added to the dz[x][y−1] may be derived based on the signaled residual information about the sample.

In addition, d[x][y] corresponding to the dequantized residual coefficient (scaled transform coefficient) may be derived based on in the above-mentioned intermediate variable dz[x][y] and the scaling factor ls[x][y]. In this way, dequantization may be performed even when BDPCM is applied.

Accordingly, an embodiment of this document proposes a method in which quantization/dequantization and transform/inverse transform are not performed even when BDPCM is applied, in the case that lossless coding is applied. Accordingly, when BDPCM is applied, an example of the dequantization process may be represented in the following table.

TABLE 20

| Scaling process for transform coefficients |
| --- |

Inputs to this process are:
- a luma location ( xTbY, yTbY ) specifying the top-left sample of the current luma transform block relative to the top-loft luma sample of the current picture,
- a variable nTbW specifying the transform block width,
- a varlable nTbH specifying the transform block height,
- a variable cIdx specifying the colour component of the current block,
- a variable bitDepth specifying the bit depth of the current colour component.

Output of this process is the (nTbW)×(nTbH) array d of scaled transform coefficients with elements d[ x ][ y ].

The quantization parameter qP is derived as follows:
- If cIdx is equal to 0, the following applies:

qP = Qp'$_Y$ (8-940)

- Otherwise, if cIdx is equal to 1 and tu_joint_cbcr_residual[ xTbY ][ yTbY ] is equal to 1, the following applies:

qP = Qp'$_{CbCr}$ (8-941)

- Otherwise, if cIdx is equal to 1, the following applies:

qP = Qp'$_{Cb}$ (8-942)

- Otherwise (cIdx is equal to 2), the following applies:

qP = Qp'$_{Cr}$ (8-943)

- If cu_transquant_bypass_flag is equal to 1, the following applies :
- The (nTbW)×(nTbH) array dz is sot equal to the (nTbW)×(nTbH) array TransCoeffLevel[ xTbY ][ yTbY ][ cIdx ].
    - When BdpcmFlag[ xTbY ][ yYbY ] is equal to 1, dz[ x ][ y ] is modified as follows:
        - If BdpcmDir[ xTbY ][ yYbY ] is equal to 0 and x is greater than 0, the following applies:

dz[ x ][ y ] = Clip3( CoeffMin, CoeffMax, dz[ x − 1 ][ y ] + dz[ x ][ y ]) (8-949)

- Otherwise, if BdpcmDir[ xTbY ][ yYbY ] is equal to 1 and y is greater then 0, the following applies:

dz[ x ][ y ] = Clip3( CoeffMin, CoeffMax, dz[ x ][ y − 1 ] + dz[ x ][ y ]) (8-950)

- Othewise the following applies :
- The variable rectNonTsFlag is derived as follows:

rectNonTsFlag = ( ( ( Log2( nTbW ) + Log2( nTbH ) ) & 1 ) = = 1 && (8-944)
    transform_skip_flag[ xTbY ][ yTbY ] = = 0 )

- The variables bdShift, rectNorm and bdOffset are derived as follows:

bdShift = bitDepth + ( ( rectNonTsFlag ? 1 : 0 ) + (8-945)
    ( Log2( nTbW ) + Log2( nTbH ) ) / 2 ) − 5 + dep_quant_enabled_flag bdOffset = ( 1 << bdShift ) >> 1 (8-946)

- The list levelScale[ ][ ] is specified as levelScale[ j ][ k ] = { { 40, 45, 51, 57, 64, 72 }, { 57, 64, 72, 81, 91, 102 } } with j = 0..1, k = 0..5.
- The (nTbW)×(nTbH) array dz is set equal to the (nTbW)×(nTbH) array TransCoeffLevel[ xTbY ][ yTbY ][ cIdx ].
- For the derivation of the scaled transform coefficients d[ x ][ y ] with x = 0..nTbW − 1, y = 0..nTbH − 1, the following applies:
- The intermediate scaling factor m[ x ][ y ] is set equal to 16.
- The scaling factor ls[ x ][ y ] is derived as follows:
    - If dep_quant_enabled_flag is equal to 1, the following applies:

ls[ x ][ y ] = ( m[ x ][ y ] * levelScale[ rectNonTsFlag ][ (qP + 1) % 6 ] ) << ( (qP + 1) / 6 ) (8-947)

- Otherwise (dep_quant_enabled_flag is equal to 0), the following applies:

ls[ x ][ y ] = ( m[ x ][ y ] * levelScale[ rectNonTsFlag ][ qP % 6 ] ) << ( qP / 6 ) (8-948)

- When BdpcmFlag[ xTbY ][ yYbY ] is equal to 1, dz[ x ][ y ] is modified as follows:
    - If BdpcmDir[ xTbY ][ yYbY ] is equal to 0 and x is greater than 0, the following applies:

dz[ x ][ y ] = Clip3( CoeffMin, CoeffMax, dz[ x − 1 ][ y ] + dz[ x ][ y ]) (8-949)

- Otherwise, if BdpcmDir[ xTbY ][ yYbY ] is equal to 1 and y is greater than 0, the following applies:

dz[ x ][ y ] = Clip3( CoeffMin, CoeffMax, dz[ x ][ y − 1] + dz[ x ][ y ]) (8-950)

- The value dnc[ x ][ y ] is derived as follows:

dnc[ x ][ y ] = ( dz[ x ][ y ] * ls[ x ][ y ] +bdOffset ) >> bdShift (8-951)

- The scaled transform coefficient d[ x ][ y ] is derived as follows:

d[ x ][ y ] = Clip3( CoeffMin, CoeffMax, dnc[ x ][ y ]) (8-952)

Referring to Table 20, in the case that the value of cu_transquant_bypass_flag is 1, even when BDPCM is applied, the intermediate variable dz[x][y] may be finally derived as d[x][y] corresponding to the dequantized residual coefficient(scaled transform coefficient), and thus it can be seen that dequantization is not applied.

tax may be a syntax related to Multiple Transform Selection (MTS), Low-Frequency Non-Separable Transform (LFNST), subblock transform (SBT), and the like described above with reference to FIG. 4.

For example, CU syntax according to the above-described embodiment may be as shown in the following table.

TABLE 21

| | Descriptor |
|---|---|
| coding_unit( x0, y0, cbWidth, cbHeight, treeType ) { | |
|   if( !pcm_flag[ x0 ][ y0 ] ) { | |
|     if( CuPredMode[ x0 ][ y0 ] != MODE_INTRA && | |
|       general_merge_flag[ x0 ][ y0 ] == 0 ) | |
|     cu_cbf | ae(v) |
|   if( cu_cbf ) { | |
|     if( !cu_transquant_bypass_flag && CuPredMode[ x0 ][ y0 ] == MODE_INTER && sps_sbt_enabled_flag && | |
|       !ciip_flag[ x0 ][ y0 ] && !MergeTriangleFlag[ x0 ][ y0 ] ) { | |
|       if( cbWidth <= MaxSbtSize && cbHeight <= MaxSbtSize ) { | |
|         allowSbtVerH = cbWidth >= 8 | |
|         allowSbtVerQ = cbWidth >= 16 | |
|         allowSbtHorH = cbHeight >= 8 | |
|         allowSbtHorQ = cbHeight >= 16 | |
|         if( allowSbtVerH \|\| allowSbtHorH \|\| allowSbtVerQ \|\| allowSbtHorQ ) | |
|           cu_sbt_flag | ae(v) |
|       } | |
|       if( cn_abt_flag ) { | |
|         if( ( allowSbtVerH \|\| allowSbtHorH ) && ( allowSbtVerQ \|\| allowSbtHorQ) ) | |
|           cu_sbt_quad_flag | ae(v) |
|         if( ( cu_sbt_quad_flag && allowSbtVerQ && allowSbtHorQ ) \|\| | |
|           ( !cu_sbt_quad_flag && allowSbtVerH && allowSbtHorH ) ) | |
|           cu_sbt_horizontal_flag | ae(v) |
|           cu_sbt_pos_flag | ae(v) |
|       } | |
|     } | |
|     numSigCoeff = 0 | |
|     numZeroOutSigCoeff = 0 | |
|     transform_tree( x0, y0, cbWidth, cbHeight, treeType ) | |
|     lfnstWidth = ( treeType == DUAL_TREE_CHROMA ) ? cbWidth / SubWidthC : cbWidth | |
|     lfnstHeight = ( treeType == DUAL_TREE_CHROMA ) ? cbHeight / SubHeightC : cbHeight | |
|     if(!cu_transquant_bypass_flag && Min( lfnstWidth, lfnstHeight ) >= 4 && sps_lfnst_enabled_flag == 1 && | |
|       CuPredMode[ x0 ][ y0 ] == MODE_INTRA && | |
|       IntraSubPartitionsSplitType == ISP_NO_SPLIT && | |
|       !intra_mip_flag[ x0 ][ y0 ] ) { | |
|       if( ( numSigCoeff > ( ( treeType == SINGLE_TREE ) ? 2 : 1 ) ) && | |
|         numZeroOutSigCoeff == 0 ) | |
|         lfnst_idx[ x0 ][ y0 ] | ae(v) |
|     } | |
|   } | |
|   } | |
| } | |

That is, when the value of cu_transquant_bypass_flag is 1, values of residual coefficients may be derived as values of residual samples, while, when cu_transquant_bypass flag is 0, values derived by dequantizing residual coefficients may be derived as values of residual samples.

Meanwhile, an embodiment of the present document proposes a method of constraining signaling of a transform related syntax when lossless coding is applied. For example, whether or not the lossless coding is applied may be determined by a flag (e.g., cu_transquant_bypass_flag, etc.) regarding whether or not the lossless coding is applied, or by other method described above. The reason is that, when lossless coding is applied, transform/inverse transform for the current block is not applied, and thus there is no need to signal transform-related syntax. The transform-related syntax may be a syntax related to Multiple Transform Selection (MTS), Low-Frequency Non-Separable Transform (LFNST), subblock transform (SBT), and the like described above with reference to FIG. 4.

Referring to Table 21, when the value of cu_transquant_bypass_flag is 1, the flag cu_sbt_flag indicating whether or not subblock transform (SBT) is applied to the current block, or lfnst_idx[x0][y0] indicating the Mist index value may not be signaled.

Additionally, an embodiment of this document proposes a method of constraining TU (Transform Unit) tiling when lossless coding is applied. For example, whether or not the lossless coding is applied may be determined by a flag (e.g., cu_transquant_bypass_flag, etc.) regarding whether or not the lossless coding is applied, or by other method described above.

For example, the TU size may be derived based on maxTbSize. For example, when the size of the current block is larger than the maxTbSize, a plurality of TUs having a size smaller than the maxTbSize may be derived from the current block, and transform/inverse transform may be performed in units of the TUs. However, in the case that the value of cu_transquant_bypass_flag is 1, even when the size of the current block is larger than the maxTbSize, the tiling process of deriving a plurality of TUs having a size smaller than the maxTbSize from the current block may not be performed.

For example, transform tree syntax according to the above-described embodiment may be as shown in the following table.

TABLE 22

| | Descriptor |
|---|---|
| transform_tree( x0, y0, tbWidth, tbHeight, treeType ) { | |
|   InferTuCbfLuma = 1 | |
|   if( !cu_transquant_bypass_flag && IntraSubPartitionsSplitType = = NO_ISP_SPLIT && !cu_sbt_flag ) { | |
|     if( tbWidth  >  MaxTbSizeY  ||  tbHeight > MaxTbSizeY ) { | |
|       trafoWidth   =  ( tbWidth  >  MaxTbSizeY ) ? (tbWidth / 2) : tbWidth | |
|       trafoHeight   =  ( tbHeight  >   MaxTbSizeY ) ? (tbHeight / 2) : tbHeight | |
|       transform_tree( x0, y0, trafoWidth, trafoHeight ) | |
|       if( tbWidth  >  MaxTbSizeY ) | |
|         transform_tree( x0 + trafoWidth, y0, trafoWidth, trafoHeight, treeType ) | |
|       if( tbHeight  >   MaxTbSizeY ) | |
|         transform_tree( x0, y0 + trafoHeight, trafoWidth, trafoHeight, treeType ) | |
|       if( tbWidth  >   MaxTbSizeY  &&  tbHeight  >   MaxTbSizeY ) | |
|         transform_tree( x0 + trafoWidth, y0 + trafoHeight, trafoWidth, trafoHeight, treeType ) | |
|     } else { | |
|       transform_unit( x0, y0, tbWidth, tbHeight, treeType, 0 ) | |
|     } | |
|   } else if( cu_sbt_flag ) { | |
|     if( !cu_sbt_horizontal_flag ) { | |
|       trafoWidth   =   tbWidth * SbtNumFourthsTb0 / 4 | |
|       transform_unit( x0, y0, trafoWidth, tbHeight, treeType, 0 ) | |
|       transform_unit( x0 + trafoWidth, y0, tbWidth − trafoWidth, tbHeight, treeType, 1 ) | |
|     } else { | |
|       trafoHeight   =   tbHeight * SbtNumFourthsTb0 / 4 | |
|       transform_unit( x0, y0, tbWidth, trafoHeight, treeType, 0 ) | |
|       transform_unit( x0, y0 + trafoHeight, tbWidth, tbHeight − trafoHeight, treeType, 1 ) | |
|     } | |
|   } else if( IntraSubPartitionsSplitType = = ISP_HOR_SPLIT ) { | |
|     trafoHeight = tbHeight / NumIntraSubPartitions | |
|     for( partIdx = 0; partIdx < NumIntraSubPartitions; partIdx++ ) | |
|       transform_unit( x0, y0 + trafoHeight * partIdx, tbWidth, trafoHeight, treeType, partIdx ) | |
|   } elae if( IntraSubPartitionsSplitType = = ISP_VER_SPLTT ) { | |
|     trafoWidth = tbWidth / NumIntraSubPartitions | |
|     for( partIdx = 0; partIdx < NumIntraSubPartitions; partIdx++ ) | |
|       transform_unit( x0 + trafoWidth * partIdx, y0, trafoWidth, tbHeight, treeType, partIdx ) | |
|   } else { | |
|     transform_unit( x0, y0, trafoWidth, tbHeight, treeType, partIdx ) | |
|   } | |
| } | |

In addition, an embodiment of this document proposes a method of not signaling a transform skip flag (transform_skip_flag) when lossless coding is applied. For example, whether or not the lossless coding is applied may be determined by a flag (e.g., cu_transquant_bypass_flag, etc.) regarding whether or not the lossless coding is applied, or by other method described above. Transform skip flag indicates whether or not a transform for an associated block is omitted.

The reason is that, when lossless coding is applied, quantization/dequantization and transform/inverse transform are not applied to the current block, and thus signaling a transform skip flag indicating whether or not transform is omitted corresponds to redundant signaling.

For example, TU syntax according to the above-described embodiment may be as shown in the following table.

TABLE 23

| | Descriptor |
|---|---|
| transform_unit( x0, y0, tbWidth, tbHeight, treeType, subTuIndex ) { | |
|     if( ( treeType = = SINGLE_TREE  ||   treeType = = DUAL_TREE_CHROMA ) { | |
|       if( ( IntraSubPartitionsSplitType =  = ISP_NO_SPLIT  &&  !( cu_sbt_flag  && | |
|         ( ( subTuIndex = = 0 && cu_sbt_pos_flag )  || | |
|           ( subTuIndex = = 1 && !cu_sbt_pos_flag ) ) ) ) || | |

TABLE 23-continued

|  | Descriptor |
|---|---|
| ``` 
            ( IntraSubPartitionsSplitType != ISP_NO_SPLIT &&
                ( subTuIndex = = NumIntraSubPartitions - 1 ) ) ) {
                tu_cbf_cb[ x0 ][ y0 ]
                ta_cbf_cr[ x0 ][ y0 ]
            }
        }
        if( treeType = = SINGLE_TREE  ||  treeType = = DUAL_TREE_LUMA ) {
            if( ( IntraSubPartitionsSplitType =  = ISP_NO_SPLIT  &&  !( cu_sbt_flag  &&
                    ( ( subTuIndex = = 0 && cu_sbt_pos_flag )   ||
                        ( subTuIndex = = 1 && !cu_sbt_pos_flag ) ) )   &&
                    ( CuPredMode[ x0 ][ y0 ] = = MODE_INTRA   ||
                        tu_cbf_cb[ x0 ][ y0 ]  ||  tu_cbf_cr[ x0 ][ y0 ]  ||
                        CbWidth[ x0 ][ y0 ] > MaxTbSizeY  ||  CbHeight[ x0 ][ y0 ] > MaxTbSizeY ) ) ||
                ( IntraSubPartitionsSplitType != ISP_NO_SPLIT &&
                    ( subTuIndex < NumIntraSubPartitions - 1   ||   !InferTuCbfLuma ) ) )
                tu_cbf_luma[ x0 ][ y0 ]
            if (IntraSubPartitionsSplitType != ISP_NO_SPLIT )
                InferTuCbfLuma   =   InferTuCbfLuma   &&   !tu_cbf_luma[ x0 ][ y0 ]
        }
        if( IntraSubPartitionsSplitType != ISP_NO_SPLIT &&
            treeType = = SINGLE_TREE   &&   subTuIndex = = NumIntraSubPartitions - 1 ) )
            xC = CbPosX[ x0 ][ y0 ]
            yC = CbPosY[ x0 ][ y0 ]
            wC = CbWidth[ x0 ][ y0 ] / 2
            hC = CbHeight[ x0 ][ y0 ] / 2
        } else
            xC = x0
            yC = y0
            wC = tbWidth / SubWidthC
            hC = tbHeight / SubHeightC
        }
        if( ( tu_cbf_luma[ x0 ][ y0 ]   ||   tu_cbr_cb[ x0 ][ y0 ]   ||   tu_cbf_cr[ x0 ][ y0 ] ) &&
            treeType   != DUAL_TREE_CHROMA ) {
            if( cu_qp_delta_enabled_flag   &&   !IsCuQpDeltaCoded ) {
                cu_qp_delta_abs
                if( cu_qp_delta_abs )
                    cu_qp_delta_sign_flag
            }
        }
        if( tu_cbf_luma[ x0 ][ y0 ]  && treeType !=  DUAL_TREE_CHROMA
            && ( tbWidth <= 32 ) && ( tbHeight <= 32 )
            && ( IntraSubPartitionsSplit[ x0 ][ y0 ] = = ISP_NO_SPLIT )  &&  ( !cu_sbt_flag ) ) {
            if( !cu_transquant_bypass_flag && transform_skip_enabled_flag  && tbWidth  <=
MaxTsSize && tbHeight  <=  MaxTsSize )
                transform_skip_flag[ x0 ][ y0 ]
            if( ( ( CuPredMode[ x0 ][ y0 ] != MODE_INTRA && sps_explicit_mts_inter_enabled_flag )
                ||  ( CuPredMode[ x0 ][ y0 ] = = MODE_INTRA && sps_ecplicit_mts_intra_enabled_flag ))
                &&  ( !transform_skip_flag[ x0 ][ y0 ] ) )
                tu_mts_idx[ x0 ][ y0 ]
        }
        if( tu_cbf_luma[ x0 ][ y0 ] ) {
            if( !transform_skip_flag[ x0 ][ y0 ] )
                residual_coding( x0, y0, Log2( tbWidth ), Log2( tbHeight ), 0 )
            else
                residual_ts_coding( x0, y0, Log2( tbWidth ), Log2( tbHeight ), 0 )
        }
        if( tu_cbf_cb[ x0 ][ y0 ] )
            residual_coding( xC, yC, Log2( wC ), Log2( hC ), 1 )
        if( tu_cbf_cr[ x0 ][ y0 ] ) {
            if( tu_cbf_cb[ x0 ][ y0 ] )
                tu_joint_cbcr_residual[ x0 ][ y0 ]
            if( !tu_joint_cbcr_residual[ x0 ][ y0 ] )
                residual_coding( xC, yC, Log2( wC ), Log2( hC ), 2 )
        }
}
``` | ae(v)<br>ae(v)<br><br><br><br><br><br><br><br><br>ae(v)<br><br><br><br><br><br><br><br><br><br><br><br><br><br><br><br><br><br><br>ae(v)<br>ae(v)<br><br><br><br><br><br>ae(v)<br><br><br><br>ae(v)<br><br><br><br><br><br><br>ae(v) |

Referring to Table 23, when cu_transquant_bypass_flag is 1, transform_skip_flag[x0][y0] may not be signaled.

Additionally, an embodiment of the present document proposes a method of constraining signaling of MTS (Multiple Transform Selection) related syntax when lossless coding is applied. For example, whether or not the lossless coding is applied may be determined by a flag (e.g., cu_transquant_bypass_flag, etc.) regarding whether or not the lossless coding is applied, or by other method described above.

Specifically, when lossless coding is applied, signaling of a flag indicating the MTS index may be limited. The MTS index may correspond to an index indicating any one of a plurality of transform kernel sets, as described above with reference to FIG. 4.

For example, TU syntax according to the above-described embodiment may be as shown in the following table.

TABLE 24

|  | Descriptor |
|---|---|
| transform_unit( x0, y0, tbWidth, tbHeight, treeType, subTuIndex ) { | |
|   if( ( treeType = = SINGLE_TREE   ||   treeType = = DUAL_TREE_CHROMA ) { | |
|     if( ( IntraSubPartitionsSplitType =   = ISP_NO_SPLIT   &&   !( cu_sbt_flag  && | |
|         ( ( subTuIndex = = 0 && cu_sbt_pos_flag )   || | |
|           ( subTuIndex = = 1 && !cu_sbt_pos_flag ) ) ) ) || | |
|      ( IntraSubPartitionsSplitType != ISP_NO_SPLIT && | |
|        ( subTuIndex = = NumIntraSubPartitions − 1 ) ) ) { | |
|      tu_cbf_cb[ x0 ][ y0 ] | ae(v) |
|      tu_cbf_cr[ x0 ][ y0 ] | ae(v) |
|     } | |
|   } | |
|   if( treeType = = SINGLE_TREE   ||   treeType = = DUAL_TREE_LUMA ) { | |
|     if( ( IntraSubPartitionsSplitType =   = ISP_NO_SPLIT   &&   !( cu_sbt_flag  && | |
|         ( ( subTuIndex = = 0 && cu_sbt_pos_flag )   || | |
|           ( subTuIndex = = 1 && !cu_sbt_pos_flag ) ) )  && | |
|          ( CuPredMode[ x0 ][ y0 ] = = MODE_INTRA   || | |
|           tu_cbf_cb[ x0 ][ y0 ]   ||   tu_cbf_cr[ x0 ][ y0 ] || | |
|           CbWidth[ x0 ][ y0 ] > MaxTbSizeY   ||   CbHeight[ x0 ][ y0 ] > MaxTbSizeY ) ) || | |
|      ( IntraSubPartitionsSplitType != ISP_NO_SPLIT && | |
|       ( subTuIndex < NumIntraSubPartitions − 1   ||   !InferTuCbfLuma ) ) | |
|      tu_cbf_luma[ x0 ][ y0 ] | ae(v) |
|     if (IntraSubPartitionsSplitType != ISP_NO_SPLIT ) | |
|      InferTuCbfLuma  =  InferTuCbfLuma  &&  !tu_cbf_luma[ x0 ][ y0 ] | |
|   } | |
|   if( IntraSubPartitionsSplitType != ISP_NO_SPLIT && | |
|     treeType = = SINGLE_TREE  &&  subTuIndex = = NumIntraSubPartitions − 1 ) ) | |
|     xC = CbPosX[ x0 ][ y0 ] | |
|     yC = CbPosY[ x0 ][ y0 ] | |
|     wC = CbWidth[ x0 ][ y0 ] / 2 | |
|     hC = CbHeight[ x0 ][ y0 ] / 2 | |
|   } else | |
|     xC = x0 | |
|     yC = y0 | |
|     wC = tbWidth / SubWidthC | |
|     hC = tbHeight / SubHeightC | |
|   } | |
|   if( ( tu_cbf_luma[ x0 ][ y0 ]   ||   tu_cbf_cb[ x0 ][ y0 ]   ||   tu_cbf_cr[ x0 ][ y0 ] ) && | |
|     treeType  !=  DUAL_TREE_CHROMA ) { | |
|     if( cu_qp_delta_enabled_flag  &&  !IsCuQpDeltaCoded ) { | |
|      cu_qp_delta_abs | ae(v) |
|      if( cu_qp_delta_abs ) | |
|       cu_qp_delta_sign_flag | ae(v) |
|     } | |
|   } | |
|   if( tu_cbf_luma[ x0 ][ y0 ]  && treeType  !=  DUAL_TREE_CHROMA | |
|     && ( tbWidth <= 32 ) && ( tbHeight <= 32 ) | |
|     && ( IntraSubPartitionsSplit[ x0 ][ y0 ] = = ISP_NO_SPLIT )  &&  ( !cu_sbt_flag ) ) { | |
|     if( transform_skip_enabled_flag  &&  tbWidth  <=  MaxTsSize && tbHeight  <= MaxTsSize ) | |
| transform_unit( x0, y0, tbWidth, tbHeight, treeType, subTuIndex ) { | |
|   if( ( treeType = = SINGLE_TREE   ||   treeType = = DUAL_TREE_CHROMA ) { | |
|     if( ( IntraSubPartitionsSplitType =   = ISP_NO_SPLIT   &&   !( cu_sbt_flag  && | |
|         ( ( subTuIndex = = 0 && cu_sbt_pos_flag )   || | |
|           ( subTuIndex = = 1 && !cu_sbt_pos_flag ) ) ) ) || | |
|      ( IntraSubPartitionsSplitType != ISP_NO_SPLIT && | |
|        ( subTuIndex = = NumIntraSubPartitions − 1 ) ) ) { | |
|      tu_cbf_cb[ x0 ][ y0 ] | ae(v) |
|      tu_cbf_cr[ x0 ][ y0 ] | ae(v) |
|     } | |
|   } | |
|   if( treeType = = SINGLE_TREE   ||   treeType = = DUAL_TREE_LUMA ) { | |
|     if( ( IntraSubPartitionsSplitType =   = ISP_NO_SPLIT   &&   !( cu_sbt_flag  && | |
|         ( ( subTuIndex = = 0 && cu_sbt_pos_flag )   || | |
|           ( subTuIndex = = 1 && !cu_sbt_pos_flag ) ) )  && | |
|          ( CuPredMode[ x0 ][ y0 ] = = MODE_INTRA   || | |
|           tu_cbf_cb[ x0 ][ y0 ]   ||   tu_cbf_cr[ x0 ][ y0 ] || | |
|           CbWidth[ x0 ][ y0 ] > MaxTbSizeY   ||   CbHeight[ x0 ][ y0 ] > MaxTbSizeY ) ) || | |
|      ( IntraSubPartitionsSplitType != ISP_NO_SPLIT && | |
|       ( subTuIndex < NumIntraSubPartitions − 1   ||   !InferTuCbfLuma ) ) ) | |
|      tu_cbf_luma[ x0 ][ y0 ] | ae(v) |
|     if (IntraSubPartitionsSplitType != ISP_NO_SPLIT ) | |
|      InferTuCbfLuma  =  InferTuCbfLuma  &&  !tu_cbf_luma[ x0 ][ y0 ] | |
|   } | |

TABLE 24-continued

| | Descriptor |
|---|---|
| if( IntraSubPartitionsSplitType != ISP_NO_SPLIT &&  <br>    treeType = = SINGLE_TREE && subTuIndex = = NumIntraSubPartitions − 1 ) )  <br>    xC = CbPosX[ x0 ][ y0 ]  <br>    yC = CbPosY[ x0 ][ y0 ]  <br>    wC = CbWidth[ x0 ][ y0 ] / 2  <br>    bC = CbHeight[ x0 ][ y0 ] / 2  <br>  } else  <br>    xC = x0  <br>    yC = y0  <br>    wC = tbWidth / SubWidthC  <br>    hC = tbHeight / SubHeightC  <br>  }  <br>  if( ( tu_cbf_luma[ x0 ][ y0 ] || tu_cbf_cb[ x0 ][ y0 ] || tu_cbf_cr[ x0 ][ y0 ] ) &&  <br>    treeType != DUAL_TREE_CHROMA ) {  <br>    if( cu_qp_delta_enabled_flag && !IsCuQpDeltaCoded ) {  <br>      cu_qp_delta_abs | ae(v) |
|       if( cu_qp_delta_abs )  <br>        cu_qp_delta_sign_flag | ae(v) |
|     }  <br>  }  <br>  if( !cu_transquant_bypass_flag && tu_cbf_luma[ x0 ][ y0 ] && treeType !=  <br>DUAL_TREE_CHROMA  <br>    && ( tbWidth <= 32 ) && ( tbHeight <= 32 )  <br>    && ( IntraSubPartitionsSplit[ x0 ][ y0 ] = = ISP_NO_SPLIT ) && ( !cu_sbt_flag ) ) {  <br>    if( transform_skip_enabled_flag && tbWidth <= MaxTsSize && tbHeight <=  <br>MaxTsSize )  <br>      transform_skip_flag[ x0 ][ y0 ] | ae(v) |
|     if( ((  CuPredMode[ x0 ][ y0 ] != MODE_INTRA && sps_explicit_mts_inter_enabled_flag )  <br>      || ( CuPredMode[ x0 ][ y0 ] = = MODE_INTRA && sps_explict_mts_intra_enabled_flag ))  <br>    && ( !transform_skip_flag[ x0 ][ y0 ] ) )  <br>      tu_mts_idx[ x0 ][ y0 ] | ae(v) |
|   }  <br>  if( tu_cbf_luma[ x0 ][ y0 ] ) {  <br>    if( !transform_skip_flag[ x0 ][ y0 ] )  <br>      residual_coding( x0, y0, Log2( tbWidth ), Log2( tbHeight ), 0 )  <br>    else  <br>      residual_ts_coding( x0, y0, Log2( tbWidth ), Log2( tbHeight ), 0 )  <br>  }  <br>  if( tu_cbf_cb[ x0 ][ y0 ] )  <br>    residual_coding( xC, yC, Log2( wC ), Log2( bC ), 1 )  <br>  if( tu_cbf_cr[ x0 ][ y0 ] ) {  <br>    if( tu_cbf_cb[ x0 ][ y0 ] )  <br>      tu_joint_cbcr_residual[ x0 ][ y0 ] | ae(v) |
|     if( !tu_joint_cbcr_residual[ x0 ][ y0 ] )  <br>      residual_coding( xC, yC, Log2( wC ), Log2( bC ), 2 )  <br>  }  <br>} | |

Referring to Table 24, when the value of cu_transquant_bypass_flag is 1, tu_mts_idx[x0][y0] indicating the value of the MTS index may not be signaled.

Meanwhile, an embodiment in which a transform skip flag (transform_skip_flag) is not signaled when the value of cu_transquant_bypass_flag is 1, and an embodiment in which a flag indicating an MTS index is not signaled when cu_transquant_bypass_flag is 1 may be shown in the following table.

TABLE 25

| | Descriptor |
|---|---|
| transform_unit( x0, y0, tbWdith, tbHeight, treeType, subTuIndex ) {  <br>  if( treeType = = SINGLE_TREE || treeType = = DUAL_TREE_LUMA ) {  <br>    if( ( IntraSubPartitionsSplitType = = ISP_NO_SPLIT && !( cu_sbt_flag &&  <br>      ( ( subTuIndex = = 0 && cu_sbt_pos_flag ) ||  <br>        ( subTuIndex = = 1 && !cu_sbt_pos_flag ) ) ) &&  <br>      ( CuPredMode[ x0 ][ y0 ] = = MODE_INTRA ||  <br>        tu_cbf_cb[ x0 ][ y0 ] || tu_cbf_cr[ x0 ][ y0 ] ||  <br>        CbWidth[ x0 ][ y0 ] > MaxTbSizeY || CbHeight[ x0 ][ y0 ] > MaxTbSizeY ) ) ||  <br>      ( IntraSubPartitionsSplitType != ISP_NO_SPLIT &&  <br>      ( subTuIndex < NumIntraSubPartitions − 1 || !InferTuCbfLuma ) ) )  <br>      tu_cbf_luma[ x0 ][ y0 ] | ae(v) |

TABLE 25-continued

| | Descriptor |
|---|---|
| ``if (IntraSubPartitionsSplitType != ISP_NO_SPLIT )
    InferTuCbfLuma = InferTuCbfLuma && !tu_cbf_luma[ x0 ][ y0 ]
}
if( IntraSubPartitionsSplitType != ISP_NO_SPLIT &&
    treeType = = SINGLE_TREE && subTuIndex = = NumIntraSubPartitions − 1 ) )
    xC = CbPosX[ x0 ][ y0 ]
    yC = CbPosY[ x0 ][ y0 ]
    wC = CbWidth[ x0 ][ y0 ] / 2
    bC = CbHeight[ x0 ][ y0 ] / 2
} else
    xC = x0
    yC = y0
    wC = tbWidth / SubWidthC
    hC = tbHeight / SubHeightC
}
if( ( tu_cbf_luma[ x0 ][ y0 ] | | tu_cbf_cb[ x0 ][ y0 ] | | tu_cbf_cr[ x0 ][ y0 ] ) &&
    treeType != DUAL_TREE_CHROMA ) {
    if( cu_qp_delta_enabled_flag && !IsCuQpDeltaCoded ) {
        cu_qp_delta_abs`` | ae(v) |
| ``        if( cu_qp_delta_abs )
            cu_qp_delta_sign_flag`` | ae(v) |
| ``    }
}
if( !cu_transquant_bypass_flag && tu_cbf_luma[ x0 ][ y0 ] && treeType !=
DUAL_TREE_CHROMA
    && ( tbWidth <= 32 ) && ( tbHeight <= 32 )
    && ( IntraSubPartitionsSplit[ x0 ][ y0 ] = = ISP_NO_SPLIT ) && ( !cu_sbt_flag ) ) {
    if( transform_skip_enabled_flag && tbWidth <= MaxTsSize && tbHeight <=
MaxTsSize )
        transform_skip_flag[ x0 ][ y0 ]`` | ae(v) |
| ``    if( ((CuPredMode[ x0 ][ y0 ] != MODE_INTRA && sps_explicit_mts_inter_enabled_flag )
        | | ( CuPredMode[ x0 ][ y0 ] = = MODE_INTRA && sps_explict_mts_intra_enabled_flag ))
        && ( !transform_skip_flag[ x0 ][ y0 ] ) )
        tu_mts_idx[ x0 ][ y0 ]`` | ae(v) |
| ``}
if( tu_cbf_luma[ x0 ][ y0 ] ) {
    if( !transform_skip_flag[ x0 ][ y0 ] )
        residual_coding( x0, y0, Log2( tbWidth ), Log2( tbHeight ), 0 )
    else
        residual_ts_coding( x0, y0, Log2( tbWidth ), Log2( tbHeight ), 0 )
}
if( tu_cbf_cb[ x0 ][ y0 ] )
    residual_coding( xC, yC, Log2( wC ), Log2( bC ), 1 )
if( tu_cbf_cr[ x0 ][ y0 ] ) {
    if( tu_cbf_cb[ x0 ][ y0 ] )
        tu_joint_cbcr_residual[ x0 ][ y0 ]`` | ae(v) |
| ``    if( !tu_joint_cbcr_residual[ x0 ][ y0 ] )
        residual_coding( xC, yC, Log2( wC ), Log2( bC ), 2 )
    }
}`` | |

Referring to foregoing Table 25, when the value of cu_transquant_bypass_flag is 1, transform_skip_flag[x0][y0] and tu_mts_idx[x0][y0] may not be signaled.

On the other hand, an embodiment of the present document proposes a method of constraining an Intra Sub-Partitions (ISP) operation with respect to a current block when lossless coding is applied. The ISP is an example of an infra prediction method. For example, whether or not the lossless coding is applied may be determined by a flag (e.g., cu_transquant_bypass_flag, etc.) regarding whether or not the lossless coding is applied, or by other method described above.

Intra prediction may indicate prediction that generates prediction samples for a current block based on reference samples in a picture to which the current block belongs (hereinafter, referred to as a current picture). When intra prediction is applied to the current block, neighboring reference samples to be used for intra prediction of the current block may be derived.

Meanwhile, the current block is divided into vertical or horizontal sub-partitions to perform intra prediction based on the same intra prediction mode, but neighboring reference samples may be derived and used in units of the sub-partitions. That is, in this case, the intra prediction mode for the current block is equally applied to the sub-partitions, and the intra prediction performance may be improved in some cases by deriving and using the neighboring reference samples in units of the sub-partitions. This prediction method may be referred to as intra sub-partitions (ISP) or ISP-based infra prediction.

In this case, a reconstructed block may be generated by performing encoding/decoding in units of partitioned blocks, and the reconstructed block may be used as a reference block of the next partitioned block. For example, the ISP may perform block partitioning as shown in Table 26 according to the block size.

TABLE 26

| Block size | Number of Partitions |
|---|---|
| 4 × 4 | No partition |
| 4 × 8, 8 × 4 | 2 |
| AU other cases | 4 |

Figure 8:
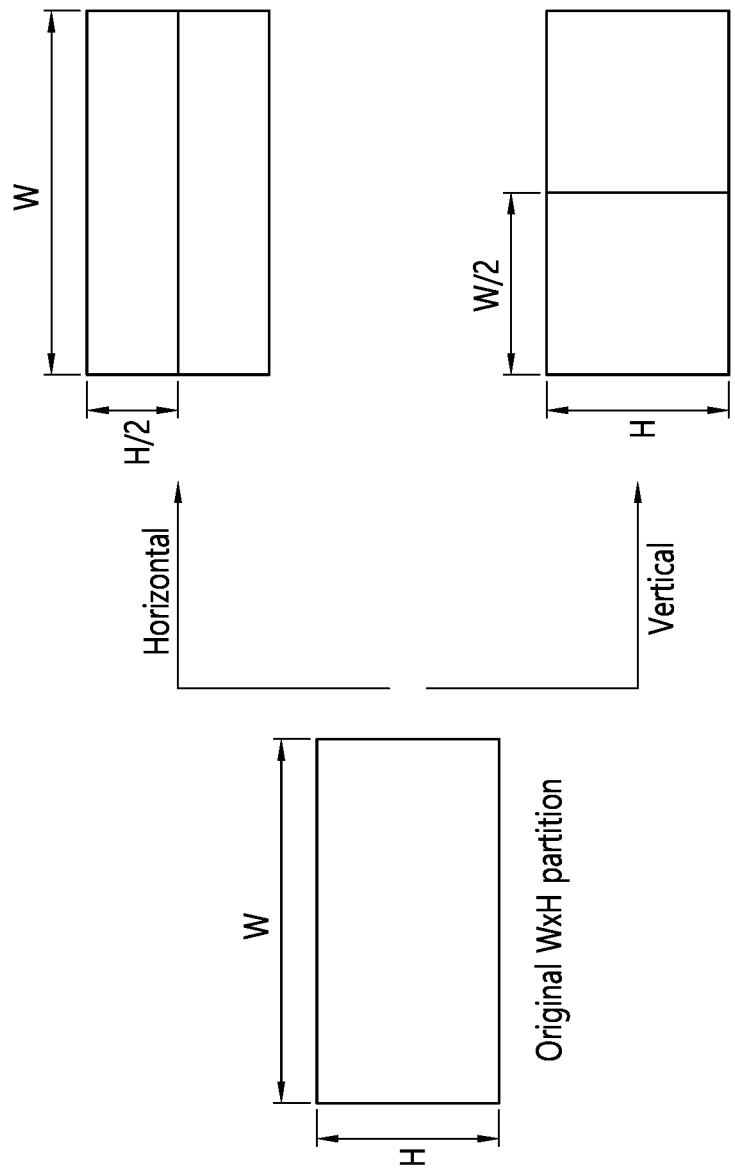
FIG. 8 represents an example of block partitioning according to an ISP in intra prediction.
Figure 9:
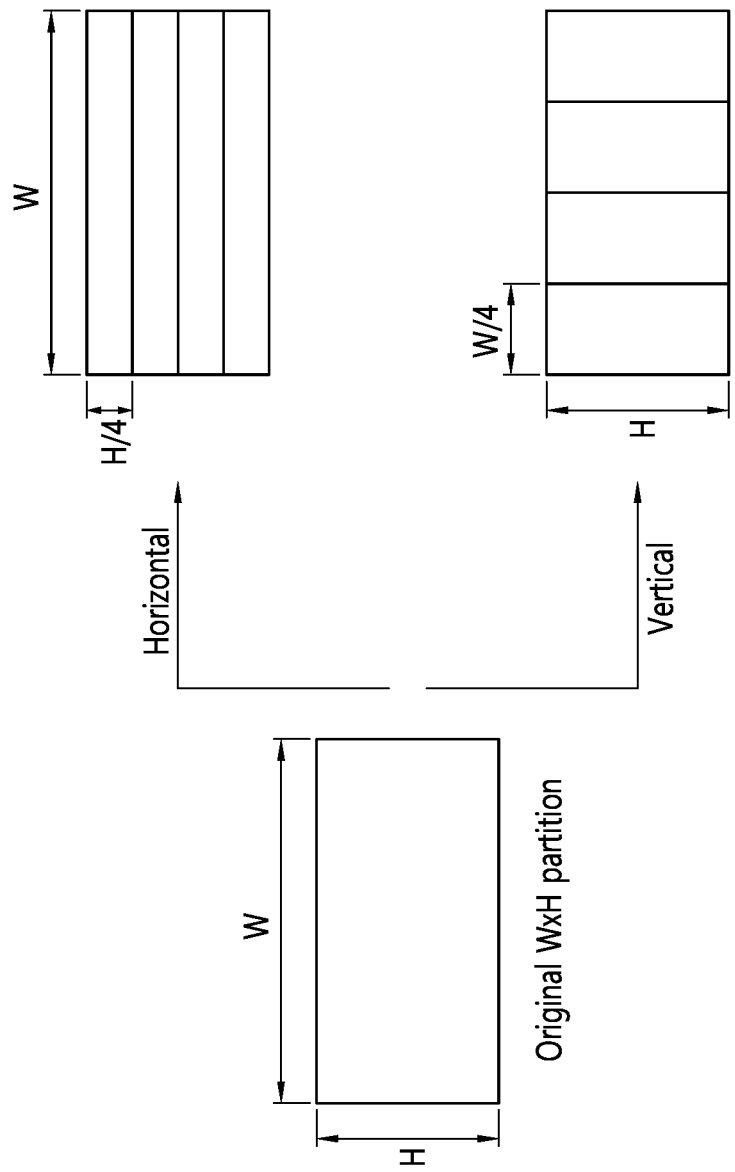
FIG. 9 represents another example of block partitioning according to an ISP in intra prediction.

Referring to Table 26, block partitioning according to the ISP may be performed differently depending on the size or shape of the block, and, for example, the block partitioning may be performed as shown in FIGS. 8 and 9. In Table 26, the number of partitions may mean the number of sub-partitions, and the sub-partition may represent a block generated by partitioning, a partitioned block, or a partitioned region.

FIG. 8 represents an example of block partitioning according to an ISP in intra prediction.

When the size of the block is 4×8 or 8×4, the block may be divided into two blocks in the ISP. Here, the divided block may be represented as a sub-partition or a sub-block.

Referring to FIG. 8, horizontal partition or vertical partition may be performed on a block of size W×H. For example, when horizontally partitioned, a block of size W×H may be divided into two sub-partitions of size W×H/2, while, when partitioned vertically, a block of size W×H may be divided into two sub-partitions of size W/2×H. Here, W may represent the width of the block, and H may represent the height of the block. Additionally, W×H may be 4×8 or 8×4.

For example, an 8×4 size block may be divided into two sub-partitions of size 8×2 when horizontally partitioned, or into two sub-partitions of size 4×4 when vertically partitioned. Alternatively, a 4×8 size block may be divided into two sub-partitions of size 4×4 when horizontally divided, or into two sub-partitions of size 2×8 when divided vertically.

FIG. 9 represents another example of block partitioning according to an ISP in intra prediction.

When the size of the block is not 4×4, 4×8, or 8×4, the block may be divided into 4 blocks in the ISP. That is, in all cases where the size of the block is not 4×4, 4×8, or 8×4, the block may be divided into 4 blocks in the ISP. Here, the divided block may be represented as a sub-partition or a sub-block.

Referring to FIG. 9, horizontal partition or vertical partition may be performed on a block of size W×H. For example, when horizontally partitioned, a block of size W×H may be divided into four sub-partitions of size W×H/4, while, when partitioned vertically, a block of size W×H may be divided into four sub-partitions of size W/4×H. Here, W may represent the width of the block, and H may represent the height of the block. Additionally, W×H may not be 4×4, 4×8 or 8×4.

Meanwhile, when ISP is applied to the current block, the horizontal direction transform kernel trTypeHor and the vertical direction transform kernel trTypeVer may be derived as shown in the table below.

TABLE 27

| Transformation process for scaled transform coefficients |
|---|
| The variable trTypeHor specifying the horizontal transform kernel and the variable trTypeVer specifying the vertical transform kernel are derived as follows:<br>- If cIdx is greater than 0, trTypeHor and trTypeVer are set equal to 0.<br>- Otherwise, if implicitMtsEnabled is equal to 1, the following applies:<br>  - If IntraSubPartitionsSplitType is not equal to ISP_NO_SPLIT or both sps_explicit_mts_intra_enabled_flag and sps_explicit_mts_inter_enabled_flag are equal to 0 and CuPredMode[ xTbY ][ yTbY ] is equal to MODE_INTRA, trTypeHor and trTypeVer are derived as follows:<br>    trTypeHor = ( nTbW >= 4  &&  nTbW <= 16 ) ? 1 : 0    (8-965)<br>    trTypeVer = ( nTbH >= 4  &&  nTbH <= 16 ) ? 1 : 0    (8-966)<br>  - Otherwise, if cu_sbt_flag is equal to 1, trTypaHor and trTypeVer are specified in Table 8-17 depending on cu_sbt_horizontal_flag and cu_sbt_pos_flag.<br>- Otherwise, trTypeHor and trTypeVer are specified in Table 8-16 depending on tu_mts_idx[ xTbY ][ yTbY ]. |

However, since quantization/dequantization and transform/inverse transform are not performed when lossless coding is applied, an embodiment of this document proposes a method of not applying ISP to a current block to which lossless coding is applied.

For example, CU syntax according to the above-described embodiment may be as shown in the following table.

TABLE 28

| | Descriptor |
|---|---|
| coding_unit( x0, y0, cbWidtb, cbHeight, treeType ) {<br>  if( slice_type != I || sps_ibc_enabled_flag ) {<br>    if( treeType 1= DUAL_TREE_CHROMA &&<br>      !( cbWidth = = 4 && cbHeight = = 4  &&  !sps_ibc_enabled_flag ) )<br>      cu_sklp_flag[ x0 ][ y0 ] | ae(v) |
|     if( cu_skip_flag[ x0 ][ y0 ] = = 0  &&  slice_type != I<br>      && !( cbWidth = = 4 && cbHeight = = 4 ) )<br>      pred_mode_flag | ae(v) |
|     if( ( ( slice_type = = I  &&  cu_skip_flag[ x0 ][ y0 ] = =0 )  ||<br>      ( slice_type != I  &&  ( CuPtedMode[ x0 ][ y0 ] != MODE_INTRA  ||<br>      ( cbWidth = = 4  &&  cbHeight = = 4 && cu_skip_flag[ x0 ][ y0 ] = = 0 ) ) ) &&| |

TABLE 28-continued

| | Descriptor |
|---|---|
|       sps_ibc_enabled_flag  &&  ( cbWidth != 128 \|\| cbHeight != 128 ) ) | |
|         pred_mode_ibc_flag | ae(v) |
| } | |
| if( CuPredMode[ x0 ][ y0 ]  = =  MODE_INTRA ) { | |
|   if( sps_pcm_enabled_flag  && | |
|     cbWidth >= MinIpcmCbSizeY  &&  cbWidth <= MaxIpcmCbSizeY && | |
|     cbHeight >= MinIpcmCbSizeY  &&  cbHeight <= MaxIpcmCbSizeY ) | |
|     pcm_flag[ x0 ][ y0 ] | ae(v) |
|   if( pcm_flag[ x0 ][ y0 ] ) { | |
|     while( !byte_aligned( ) ) | |
|       pcm_alignment_zero_bit | f(1) |
|     pcm_sample( cbWidth, cbHeight, treeType) | |
|   } else { | |
|     if( treeType = = SINGLE_TREE  \|\|  treeType = = DUAL_TREE_LUMA ) { | |
|       if( cbWidth <= 32  &&  cbHeight <= 32 ) | |
|         intra_bdpcm_flag[ x0 ][ y0 ] | ae(v) |
|       if( intra_bdpcm_flag[ x0 ][ y0 ] ) | |
|         intra_bdpcm_dir_flag[ x0 ][ y0 ] | ae(v) |
|       else { | |
|         if( sps_mip_enabled_flag && | |
|           ( Abs( Log2( cbWidth ) − Log2( cbHeight ) ) <= 2 )  && | |
|           cbWidth <= MaxTbSizeY  &&  cbHeight <= MaxTbSizeY ) | |
|         intra_mip_flag[ x0 ][ y0 ] | ae(v) |
|         if( intra_mip_flag[ x0 ][ y0 ] ) { | |
|           intra_mip_mpm_flag[ x0 ][ y0 ] | ae(v) |
|           if( intra_mip_mpm_flag[ x0 ][ y0 ] ) | |
|             intra_mip_mpm_idx[ x0 ][ y0 ] | ae(v) |
|           else | |
|             intra_mip_mpm_remainder[ x0 ][ y0 ] | ae(v) |
|         } else { | |
|           if( sps_mrl_enabled_flag  &&  ( ( y0 % CtbSizeY ) > 0 ) ) | |
|             intra_luma_ref_idx[ x0 ][ y0 ] | ae(v) |
|           if ( !cu_transquant_bypass_flag[ x0 ][ y0 ] && sps_isp_enabled_flag && | |
| intra_luma_ref_idx[ x0 ][ y0 ] = = 0  && | |
|             ( cbWidth <= MaxTbSizeY  &&  cbHeight <= MaxTbSizeY ) && | |
|             ( cbWidth * cbHeight > MinTbSizeY * MinTbSizeY ) ) | |
|             intra_subpartitions_mode_flag[ x0 ][ y0 ] | •efv) |
|           if( intra_subpartitions_mode_flag[ x0 ][ y0 ] = = 1  && | |
|             cbWidth <= MaxTbSizeY  &&  cbHeight <= MaxTbSizeY ) | |
|             intra_subpartitions_split_flag[ x0 ][ y0 ] | ae(v) |
|           if( intra_luma_ref_idx[ x0 ][ y0 ] = = 0  && | |
|             intra_subpartitions_mode_flag[ x0 ][ y0 ] = = 0 ) | |
|             intra_luma_mpm_flag[ x0 ][ y0 ] | ae(v) |
|           if( intra_luma_mpm_flag[ x0 ][ y0 ] ) { | |
|             if( intra_luma_ref_idx[ x0 ][ y0 ] = = 0 ) | |
|               intra_luma_not_planar_flag[ x0 ][ y0 ] | ae(v) |
|             if( intra_luma_not_planar_flag[ x0 ][ y0 ] ) | |
|               intra_luma_mpm_idx[ x0 ][ y0 ] | ae(v) |
|           } else | |
|             intra_luma_mpm_remainder[ x0 ][ y0 ] | ae(v) |
|         } | |
|       } | |
|     } | |
|     if( treeType = = SINGLE_TREE  \|\|  treeType = = DUAL_TREE_CHROMA ) | |
|       intra_chroma_pred_mode[ x0 ][ y0 ] | ae(v) |
|   } | |
| } | |

Referring to Table 28, when the value of cu_transquant_bypass flag is 1, the flag intra_subpartitions_mode_flag[x0][y0] indicating information on whether or not to apply ISP to the current block may not be signaled.

Additionally, an embodiment of the present document proposes a method of keep the transform and inverse transform processes from being performed when lossless coding of the current block is applied and ISP is applied.

For example, an example of the inverse transform process according to the above-described embodiment may be represented in the following table.

TABLE 29

Scaling and transformation process

Inputs to this process are:
- a luma location ( xTbY, yTbY ) specifying the top-left sample of the current luma transform block relative to the top-left luma sample of the current picture,
- a variable cIdx specifying the colour component of the current block,
- a variable nTbW specifying the transform block width,
- a variable nTbH specifying the transform block height.

TABLE 29-continued

Scaling and transformation process

Output of this process is the (nTbW)×(nTbH) array of residual samples resSamples[ x ][ y ] with
x = 0..nTbW − 1, y = 0..nTbH − 1.
The variables bitDepth, bdShift and tsShift are derived as follows:
    bitDepth = ( cIdx  = =  0 ) ? BitDepth$_Y$ : BitDepth$_C$     (8-934)
    bdShift = Max( 20 − bitDepth, 0 )     (8-935)
    tsShift = 5 + ( ( Log2( nTbW ) + Log2( nTbH ) ) / 2 )     (8-936)
The (nTbW)×(nTbH) array of residual samples resSamples is derived as follows:
- If cIdx is equal to 2 and tu_joint_cbcr_residual[ xTbY ][ yTbY ] is equal to 1, the residual samples
  resSamples[ x ][ y ] with x = 0..nTbW − 1, y = 0..nTbH − 1 are derived as follows:
    resSamples[ x ][ y ]  =  −resSamplesCb[ x ][ y ]     (8-937)
  where resSamplesCb is the residual sample array resSamples that is generated in the last
  invokation of this clause for the Cb component block with cIdx euqal to 1 at the transform block
  location ( xTbY, yTbY ).
- Otherwise (cIdx is less than 2 or tu_joint_cbcr_residual[ xTbY ][ yTbY ] is equal to 0), the following
  ordered steps apply:
  1. The scaling process for transform coefficients as specified in clause 8.7.3 is invoked with the
     transform block location ( xTbY, yTbY ), the transform block width nTbW and the transform
     block height nTbH, the colour component variable cIdx and the bit depth of the current colour
     component bitDepth as inputs, and the output is an (nTbW)×(nTbH) array of scaled transform
     coefficients d.
  2. The (nTbW)×(nTbH) array of residual samples r is derived as follows:
    - If cu_transquant_bypass_flag[xTbY][yTbY] is 1
        r[ x ][ y ] = d[ x ][ y ]     (8-938)
    - Otherwise if transform_skip_flag[ xTbY ][ yTbY ] is equal to 1 and cIdx is equal to 0, the
      residual sample array values r[ x ][ y ] with x = 0..nTbW − 1, y = 0..nTbH − 1 are derived
      as follows:
        r[ x ][ y ] = d[ x ][ y ] << tsShift     (8-938)
    - Otherwise (transform_skip_flag[ xTbY ][ yTbY ] is equal to 0 or and cIdx is not equal to
      0), the transformation process for scaled transform coefficients as specified in
      clause 8.7.4.1 is invoked with the transform block location ( xTbY, yTbY ), the transform
      block width nTbW and the transform block height nTbH, the colour component variable
      cIdx and the (nTbW)×(nTbH) array of scaled transform coefficients d as inputs, and the
      output is an (nTbW)×(nTbH) array of residual samples r.
  3. The residual samples resSamples[ x ][ y ] with x = 0..nTbW − 1, y = 0..nTbH − 1 are derived
     as follows:
        resSamples[ x ][ y ] = ( x[ x ][ y ] + ( 1  <<  ( bdShift − 1 ) ) )  >>  bdShift   (8-939)

In addition, an embodiment of the present document proposes a method in which chroma reconstructed samples are derived without luma dependent chroma residual scaling when lossless coding is applied. For example, whether or not the lossless coding is applied may be determined by a flag (e.g., cu_transquant_bypass_flag, etc.) regarding whether or not the lossless coding is applied, or by other method described above.

TABLE 30

1.1.1.1 Picture reconstruction with luma dependent chroma residual scaling process for chroma samples Inputs to this process are:
-     a location ( xCurr, yCurr ) of the top-left sample of the current transform block relative to the
    top-left sample of the current picture,
-     a variable nCurrSw specifying the transform block width,
-     a variable nCurrSh specifying the transform block height,
-     a variable tuCbfChroma specifying the coded block flag of the current chroma transform block,
-     an (nCurrSw)×(nCurrSh) array predSamples specifying the chroma prediction samples of the
    current block,
-     an (nCurrSw)×(nCurrSh) array resSamples specifying the chroma residual samples of the current
    block.
Output of this process is a reconstructed chroma picture sample array recSamples.
The reconstructed chroma picture sample recSamples is derived as follows for i = 0..nCurrSw − 1,
j = 0..nCurrSh − 1:
-     If one of the following conditions is true, recSamples[ xCurr + i ][ yCurr + j ] is ret equal to
    Clip1$_C$( predSamples[ i ][ j ] + resSamples[ i ][ j ] ):
    -     slice_chroma_residual_scale_flag is equal to 0
    -     nCurrSw * nCurrSh is less than or euqal 4
    -     tu_cbf_cb [ xCurr ][ yCurr ] is equal to 0 and tu_cbf_cr [ xCurr ][ yCurr ] is equal to 0
    -     cu_transquant_bypass_flag[ xCurr ][ yCurr ] is equal to 1
-     Otherwise, the following applies:
    -     For the derivation of the variable varScale the following ordered steps apply:
        1.     The variable invAvgLuma is derived as follows:
            invAvgLuma = Clip1$_Y$( $(\Sigma_{k=0}^{SubWidthC=nCurrSw-1} \Sigma_{l=0}^{SubHeightC=nCurrSh-1}$ TABLE 30-continued

| 1.1.1.1 Picture reconstruction with luma dependent chroma residual scaling process for chroma samples |
|---|

|   |   |
|---|---|
|   | PredMapSamples[ k ][ 1 ] + nCurrSw * nCurrSh<br>* ( ( SubWidthC * SubHeightC ) / 2 ) ) / (8-996)<br>( nCurrSw * nCurrSh *SubWidthC * SubHeightC ) ) |
| 2. | The variable idxYInv is derived by invoking the identification of piece-wise function index process for a luma sample as specified in clausa 8.8.2.3 with the variable lumaSample set equal to invAvgLuma as the input and idxYInv as the output. |
| 3. | The variable varScale is derived as follows:<br>varScale = ChromaScaleCoeff[ idxYinv ]     (8-997) |
| - | The recSamples is derived as follows: |
| - | If tuCbfChroma is equal to 1, the following applies:<br>resSamples[ i ][ j ] =<br>Clip3( −( 1 << BitDepth$_C$ ), ( 1 << BitDepth$_C$ ) − 1,  (8-998)<br>resSamples[ i ][ j ] )<br>recSamples[ xCurr + i ][ yCurr + j ] =     (8-999)<br>Clip1$_C$( predSamples[ i ][ j ] +<br>Sign( resSamples[ i ][ j ] ) *<br>( ( Abs( resSamples[ i ][ j ] ) * varScale +<br>( 1 << 10 ) ) >> 11 ) ) |
| - | Otherwise (tu_cbf is equal to 0), the following applies:<br>recSamples[ xCurr + i ][ yCurr + j ] = Clip1$_C$(predSamples[ i ][ j ] ) |

Referring to foregoing Table 30, it can be seen that, when the value of cu_transquant_bypass flag is 1, chroma reconstructed samples are derived without lama dependent chroma residual scaling.

In addition, an embodiment of this document proposes a method of constraining signaling of information on a quantization parameter of a current coding unit when lossless coding is applied. For example, whether or not the lossless coding is applied may be determined by a flag (e.g., cu_transquant_bypass flag, etc.) regarding whether or not the lossless coding is applied, or by other method described above.

As described above, a quantization parameter (QP) may be used for quantization/dequantization. For example, a quantization parameter (QP) may be used in deriving transform coefficients by performing dequantization (or scaling) based on the quantized transform coefficients of the current block. Alternatively, for example, the quantization parameter may be used in deriving the quantized transform coefficients by performing quantization on the transform coefficients in the encoding process.

For example, the quantization parameter may be derived based on information on the quantization parameter. For example, the quantization parameter may be derived based on a QP of a neighboring block of the current block and/or information on the quantization parameter.

For example, the information on the quantization parameter may include information on a difference value between a quantization parameter of a current coding unit and a prediction parameter thereof.

An embodiment of the present document proposes a method of not signaling CuQpDeltaVal corresponding to a difference value between a quantization parameter of a current coding unit and a prediction parameter thereof when lossless coding is applied. For example, whether or not the lossless coding is applied may be determined by a flag (e.g., cu_transquant_bypass flag, etc.) regarding whether or not the lossless coding is applied, or by other method described above.

For example, TU syntax according to the above-described embodiment may be as shown in the following table.

TABLE 31

```
if( cu_qp_delta_enabled_flag  &&  !IsCuQpDeltaCoded &&
!cu_transquant_bypass_flag) {
    cu_qp_delta_abs
    if( cu_qp_delta_abs )
        cu_qp_delta_sign_flag
}
```

Referring to Table 31, when the value of cu_transquant_bypass_flag is 1, cu_qp_delta_abs indicating the absolute value of CuQpDeltaVal corresponding to the difference value between the quantization parameter of the current coding unit and the prediction parameter thereof, and cu_qp_delta_sign_flag indicating the sign of CuQpDeltaVal may not be signaled.

In addition, the embodiment of this document proposes a method of not applying the LMCS procedure to the current block when the value of the above-described cu_transquant_bypass_flag is 1. The reason is that, when lossless coding is applied, the in-loop filtering procedure is not applied to the current block. For example, whether or not the lossless coding is applied may be determined by a flag (e.g., cu_transquant_bypass_flag, etc.) regarding whether or not the lossless coding is applied, or by other method described above.

For example, slice header syntax according to the above-described embodiment may be as shown in the following table.

TABLE 32

| | Descriptor |
|---|---|
| slice_beader( ) {<br>    slice_pic_parameter_set_id<br>    .....<br>    if( sps_lmcs_enabled_flag && !<br>    transquant_bypass_enabled_flag) {<br>        slice_lmcs_enabled_flag<br>        if( slice_lmcs_enabled_flag ) {<br>            slice_lmcs_aps_id<br>            if( !( qtbtt_dual_tree_intra_flag &&<br>            slice_type  = =  I ) )<br>                slice_chroma_reidual_scale_flag<br>} | ue(v)<br><br><br><br>u(1)<br><br>u(5)<br><br><br>u(1) |

Referring to Table 32, when the value of transquant_bypass_flag is 1, slice_lmcs_enabled_flag indicating whether or not LMCS is applied in a slice level may not be signaled.

In addition, an embodiment of this document proposes a method of not performing decoder-side motion vector refinement (DMVR) on the current block when lossless coding is applied. For example, whether or not the lossless coding is applied may be determined by a flag (e.g., cu_transquant_bypass_flag, etc.) regarding whether or not the lossless coding is applied, or by other method described above.

Figure 10:
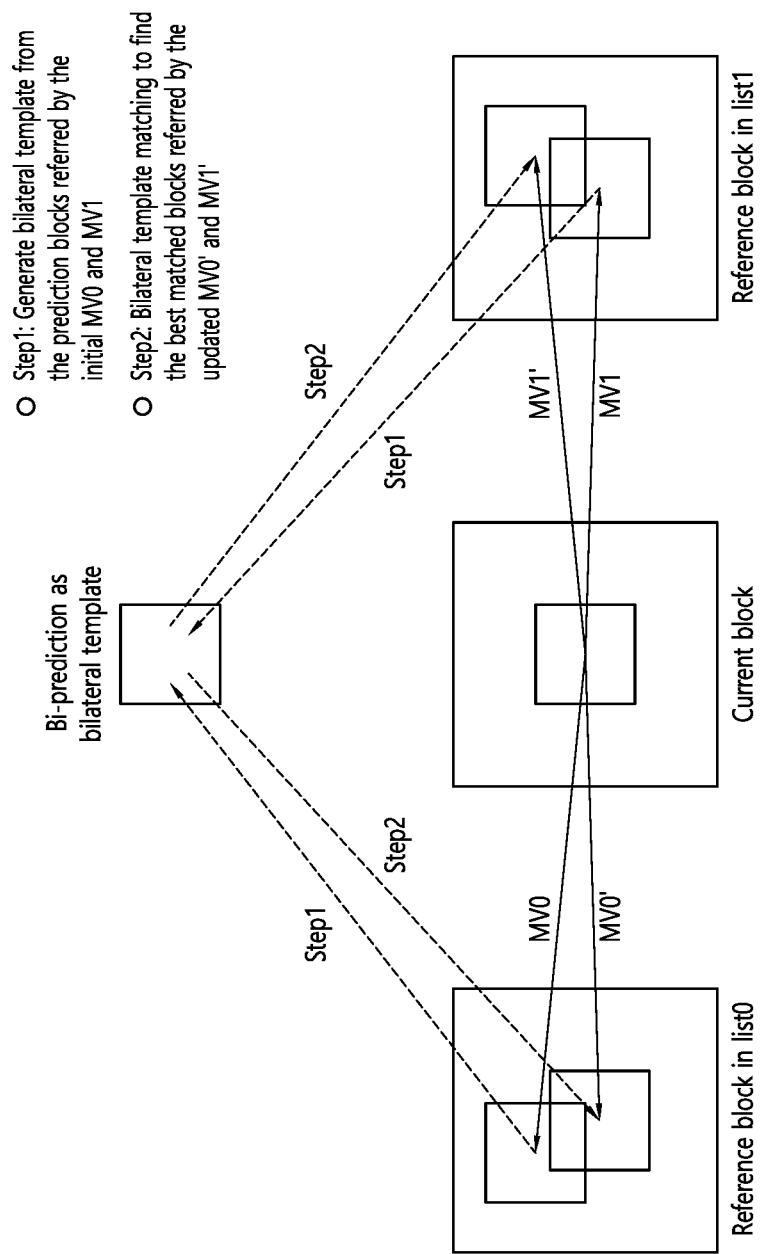
FIG. 10 is a diagram for explaining an example of a process of performing DMVR.

FIG. 10 is a diagram for describing an embodiment of a process of performing a Decoder-side Motion Vector Refinement (DMVR).

Referring to FIG. 10, the decoding apparatus may derive prediction blocks (i.e., reference blocks) identified by list0 and list1-direction initial motion vectors (or motion information) (e.g., MV0 and MV1) and generate a template (or a bilateral template) by a weighted sum (e.g., averaging) of the derived prediction samples (step 1). Here, the initial motion vectors (MV0 and MV1) may represent motion vectors derived by using the motion information of the neighboring block in the merge/skip mode.

In addition, the decoding apparatus may derive motion vectors (e.g., MV0' and MV1') for minimizing a difference between the template and the sample area of the reference picture through a template matching operation (step 2). Here, the sample area may indicate a neighboring area of an initial prediction block in the reference picture and the sample area may be referred to as the neighboring area, a reference area, a search area, a search range, a search space, etc. The template matching operation may include an operation of calculating a cost measurement value between the template and the sample area of the reference picture. For example, the sum of absolute differences (SAD) may be used for the cost measurement. As one example, as a cost function, the normalized SAD may be used. In this case, matching cost may be given as SAD(T−mean(T), 2*P[x]−2*mean(P[x])). Here, T represents the template and P[x] represents the block in the search area. In addition, a motion vector for calculating minimum template cost for each of two reference pictures may be considered as an updated motion vector (replacing the initial motion vector). As illustrated in FIG. 10, the decoding apparatus may generate a final bilateral prediction result (i.e. a final bilateral prediction block) by using the updated motion vectors MV0' and MV1'. For example, multi-iteration for deriving the updated (or new) motion vector may e used for acquiring the final bilateral prediction result.

For example, the decoding apparatus may call a DMVR process in order to enhance accuracy of an initial motion compensation prediction (i.e., the motion compensation prediction through the conventional merge/skip mode). For example, the decoding apparatus may perform the DMVR process when the prediction mode of the current block is the merge mode or the skip mode and the bilateral bi-prediction in which the bilateral reference pictures are located at opposite directions based on the current picture in a display order is applied to the current block.

An embodiment of this document prevents DMVR from being performed on the current block when lossless coding is applied, and the decoding process according to the above-described embodiment may be as shown in the table below.

TABLE 33

1.1 Decoding process for coding units coded in Inter prediction mode
1.1.1 General decoding process for coding anils coded la Inter prediction node Inputs to this process are:
- a luma location ( xCb, yCb ) specifying the top-left sample of the current coding block relative to the top-left luma sample of the current picture,
- a variable cbWidth specifying the width of the currant coding block in luma samples,
- a variable cbHeight specifying the height of the current coding block in luma samples,
- a variable treeType specifying whether a single or a dual tree is used and if a dual tree is used, it specifies whether the current tree corresponds to the luma or chroma components.

Output of this process is a modified reconstructed picture before in-loop filtering.
The derivation process for quantization parameters as specified in clause 8.7.1 is invoked with the luma location ( xCb, yCb ), the width of the current coding block in luma samples cbWidth and the height of the current coding block in luma samples cbHeight, and the variable treeType as inputs.
The decoding procass for coding units coded in inter prediction mode consists of the following ordered steps:
 1. The variable dmvrFlag is set equal to 0.
 2. The motion vector components and reference indices of the current coding unit are derived as follows:
   - If MergeTriangleFlag[ xCb ][ yCb ], inter_affine_flag[ xCb ][ yCb ] and merge_subblock_flag[ xCb ][ yCb ] are all equal to 0, the following applies:
   - The derivation process for motion vector components and reference indices as specified in clause 8.5.2.1 is invoked with the luma coding block location ( xCb, yCb ), the luma coding block width cbWidth and the luma coding block height cbHeight as inputs, and the luma motion vectors mvLD[ 0 ][ 0 ] and mvL1[ 0 ][ 0 ], the reference indices rafIdxL0 and refIdxL1 and the prediction list utilization flags predFlagL0[ 0 ][ 0 ] and predFlagL1[ 0 ][ 0 ], and the bi-prediction weight index bcwIdx as outputs.
   - When all of the following conditions are true, dmvrFlag is set equal to 1:
    - sps_dmvr_enabled_flag is equal to 1
    - general_merge_flag[ xCb ][ yCb ] is equal to 1
    - both predFlagL0[ 0 ][ 0 ] and predFlagL1[ 0 ][ 0 ] are equal to 1
    - mmvd_merge_flag[ xCb ][ yCb ] is equal to 0
    - DiffPicOrderCnt( currPic, RefPicList[ 0 ][ refIdxL0 ]) is equal to DiffPicOrderCnt( RefPicList[ 1 ][ refIdxL1 ], currPic )
    - BcwIdx[ xCb ][ yCb ] is equal to 0
    - Both luma_weight_l0_flag[ refIdxL0 ] and luma_weight_l1_flag[ refIdxL1 ] are equal to 0
    - cbWidth is greater than or equal to 8
    - cbHeight is greater than or equal to 8

TABLE 33-continued 1.1 Decoding process for coding units coded in Inter prediction mode
1.1.1 General decoding process for coding anils coded la Inter prediction node

- cbHeight*cbWidth is greater than or equal to 128
- cu_transquant_bypass_flag [ xCb ][ yCb ] is not equal to 1
- If dmvrFlag is equal to 1, the following applies:
  - For X being 0 and 1, the reference picture consisting of an ordered two-dimensional array refPicLX$_L$ of luma samples and two ordered two-dimensional arrays refPicLX$_{Cb}$ and refPicLX$_{Cr}$ of chroma samples is derived by invoking the process specified in clause 8.5.6.2 with X and refIdxLX as inputs.
  - The number of luma coding subblocks in horizontal direction numSbX and in vertical direction numSbY, the subblock width sbWidth and the subblock height sbHeight are derived as follows:

numSbX = ( cbWidth > 16 ) ? ( cbWidth >> 4 ) : 1      (8-240)
    numSbY = ( cbHeight > 16 ) ? ( cbHeight >> 4 ) : 1     (8-241)
    sbWidth = ( cbWidth > 16 ) ? 16 : cbWidth              (8-242)
    sbHeight = ( cbHeight > 16 ) ? 16 : cbHeight           (8-243)
  - For xSbIdx = 0..numSbX − 1 and ySbIdx = 0..numSbY − 1, the following applies:
    - The luma motion vectors mvLX[ xSbIdx ][ ySbIdx ] and the prediction list utilization flags predFlagLX[ xSbIdx ][ ySbIdx ] with X equal to 0 and 1, and the luma location ( xSb[xSbIdx][ySbIdx], ySb[xSbIdx][ySbIdx] ) specifying the top-left sample of the coding subblock relative to the top-left luma sample of the current picture are derived as follows:

mvLX[ xSbIdx ][ ySbIdx ] = mvLX[ 0 ][ 0 ]             (8-244)
      pradFlagLX[ xSbIdx ][ ySbIdx ] = predFlagLX[ 0 ][ 0 ] (8-245)
      xSb[ xSbIdx ][ ySbIdx ] =  xCb + xSbIdx * sbWidth     (8-246)
      ySb[ xSbIdx ][ ySbIdx ] =  yCb + ySbIdx * sbHeight    (8-247)
    - The decoder side motion vector reflmenent process specified in clause 8.5.3.1 is invoked with xSb[ xSbIdx ][ ySbIdx ], ySb[ xSbIdx ][ ySbIdx ] sbWidth, sbHeight the motion vectors mvLX[ xSbIdx ][ ySbIdx ] end the reference picture array refPicLX$_L$ as inputs and delta motion vectors dMvLX[ xSbIdx ][ ySbIdx ] as outputs with X equal to 0 and 1.
    - The derivation process for chroma motion vectors in clause 8.5.2.13 is invoked with mvLX[ xSbIdx ][ ySbIdx ] and refIdxLX as inputs, and mvCLX[ xSbIdx ][ ySbIdx ] as outputs with X equal to 0 and 1.

Referring to Table 33, when the value of cu_transquant_bypass_flag is not 1, the value of the flag dmvrFlag indicating whether or not DMVR is applied may be set to 1. Therefore, when the value of cu_transquant_bypass flag is 1, DMVR may not be applicable to the current block.

In addition, an embodiment of this document proposes a method of not performing Bi-directional optical flow (BDOF) on the current block when lossless coding is applied. For example, whether or not the lossless coding is applied may be determined by a flag (e.g., cu_transquant_bypass_flag, etc.) regarding whether or not the lossless coding is applied, or by other method described above.

As described above, when true bi-prediction is applied to the current block, BDOF may be used to refine the bi-prediction signal. Bi-directional optical flow (BDOF) may be used to calculate improved motion information when bi-prediction is applied to a current block, and to generate prediction samples based on the improved motion information. For example, BDOF may be applied in a 4×4 sub-block level. That is, BDOF may be performed in units of 4×4 subblocks in the current block. Alternatively, BDOF may be applied only to the luma component. Alternatively, the BDOF may be applied only to the chroma component, or may also be applied to the luma component and the chroma component.

The BDOF mode is based on the concept of optical flow, which assumes that the motion of an object is smooth, as indicated by its name. For each 4×4 subblock, motion refinement ($v_x$, $v_y$) may be calculated by minimizing a difference value between L0 and L1 prediction samples. And, the motion refinement may be used to adjust the bi-prediction sample values in the 4×4 subblock.

According to an embodiment of this document, when the value of cu_transquant_bypass_flag is 1, BDOF is not performed on the current block, and the decoding process according to the above-described embodiment may be as shown in Tables below.

TABLE 34

1.1.2 Decoding process for inter blocks
1.1.2.1 General

This process is invoked when decoding a coding unit coded in inter prediction mode.
Inputs to this process are:
- a luma location ( xCb, yCb ) specifying the top-left sample of the current coding block relative to the top-left luma sample of the current picture,
- a variable cbWidth specifying the width of the current coding block in luma samples,
- a variable cbHeight specifying the height of the current coding block in luma samples,
- variables numSbX and numSbY specifying the number of luma coding subblacks in horizontal and vertical direction,
- the motion vectors mvL0[ xSbIdx ][ ySbIdx ] and mvL1[ xSbIdx ][ ySbIdx ] with xSbIdx = 0 .. numSbX − 1, and ySbIdx = 0 .. numSbY − 1,
- the refined motion vectors refMvL0[ xSbIdx ][ ySbIdx ] and refMvL1[ xSbIdx ][ ySbIdx ] with xSbIdx = 0 .. numSbX − 1, and ySbIdx = 0 .. numSbY − 1,
- the reference indices refIdxL0 and refIdxL1, TABLE 34-continued 1.1.2 Decoding process for inter blocks
1.1.2.1 General

- the prediction list utilization flags predFlagL0[ xSbIdx ][ ySbIdx ] and
  predFlagL1[ xSbIdx ][ ySbIdx ] with xSbIdx = 0 .. numSbX − 1, and ySbIdx = 0 .. numSbY − 1,
  the bi-prediction weight index bcwIdx,
- a variable cIdx specifying the colour component index of the current block.
Outputs of this process are:
- an array predSamples of prediction samples.
let predSamplesL0$_L$, predSamplesL1$_L$ and predSamplesIntra$_L$ be (cbWidth)x(cbHeight) arrays of
predicted luma sample values and, predSamplesL0$_{Cb}$, predSamplesL1$_{Cb}$, predSamplesL0$_{Cr}$, and
predSamplesL1$_{Cr}$, predSamplesIntra$_{Cb}$, and predSamplesIntr$_{Cr}$ be (cbWidth / 2)x(cbHeight / 2) arrays
of predicted chroma sample values.
- The variable currPic specifies the current picture and the variable bdofFlag is derived as follows:
  - If all of the following conditions are true, bdofFlag is set equal to TRUE.
    - sps_bdof_enabled_flag is equal to 1.
    - predFlagL0[ xSbIdx ][ ySbIdx ] and predFlagL1[ xSbIdx ][ ySbIdx ] are both equal to 1.
    - DiffPicOrderCnt( currPic, RefPicList[ 0 ][ refIdxL0 ] ) *
      DiffPicOrderCnt( currPic, RelPicList[ 1 ][ refIdxL1 ] ) is less than 0.
    - MotionModelIdc[ xCb ][ yCb ] is equal to 0.
    - merge_subblock_flag[ xCb ][ yCb ] is equal to 0.
    - sym_mvd_flag[ xCb ][ yCb ] is equal to 0.
    - BcwIdx[ xCb ][ yCb ] is equal to 0.
    - luma_weight_l0_flag[ refIdxL0 ] and luma_waight_l1_flag[ refIdxL1 ] are both equal to 0.
    - cbHeight is greater than or equal to 8
    - cIdx is equal to 0.
    - cu_transquant_bypass_flag[ x0 ][ y0 ] is not equal to 1
  - Otherwise, bdofFlag is set equal to FALSE.
- If numSbY is equal to 1 and numSbX is equal to 1 the following applies:
  - When bdofFlag is equal to TRUE, the variables numSbY, numSbX are modified as follows:
    numSbX = ( cbWidth > 16 ) ? ( cbWidtb >> 4 ) : 1                                    (8-700)
    numSbY = ( cbHeight > 16 ) ? ( cbHeight >> 4 ) : 1                                  (8-701)
  - For X = 0..1, xSbIdx = 0..numSbX − 1 and ySbIdx = 0..numSbY − 1, the following applies:
    - predFlagLX[ xSbIdx ][ ySbIdx ] is set equal to predFlagLX[ 0 ][ 0 ].
    - refMvLX[ xSbIdx ][ ySbIdx ] is set equal to refMvLX[ 0 ][ 0 ].
The width and the height of the current coding sublock sbWidth, sbHeight in luma samples are
derived as follows:
    sbWidth = cbWidth / numSbX                                                          (8-702)
    sbHeight = cbHeight / numSbY                                                        (8-703)
For each coding subblock at subblock index ( xSbIdx, ySbIdx ) with xSbIdx = 0 .. numSbX − 1, and
ySbIdx = 0 .. numSbY − 1, the following applies:
- The luma location ( xSb, ySb ) specifying the top-left sample of the current coding subblock
  relative to the top-left luma sample of the current picture is derived as follows:
    ( xSb, ySb ) = ( xCb + xSbIdx * sbWidth, yCb + ySbIdx * sbHeight )                  (8-704)
- For X being each of 0 and 1, when predFlagLX[ xSbIdx ][ ySbIdx ] is equal to 1, the following
  applies:
  - The reference picture consisting of an ordered two-dimensional array refPicLX$_L$ of luma
    samples and two ordered two-dimensional arrays refPicLX$_{Cb}$ and refPicLX$_{Cr}$ of chroma
    samples is derived by invoking the process specified in clause 8.5.6.2 with X and refIdxLX as
    inputs.
  - The motion vector offset mvOffset is set equal to
    refMvLX[ xSbIdx ][ xSbIdx ] − nwLX[ xSbIdx ][ ySbIdx ].
  - When one or more of the following conditions is true, mvOffset[ 0 ] is set equal to 0:
    - xSb is not equal to xCb and mvOffset[ 0 ] is less than 0
    - ( xSb + sbWidth) is not equal to ( xCb + cbWidth) and mvOffset[ 0 ] is greater than 0
  - When one or more of the following conditions is true, mvOffset[ 1 ] is set equal to 0:
    - ySb is not equal to yCb and mvOffset[ 1 ] is less than 0
    - ( ySb + sbHeight ) is not equal to ( yCb + cbHeight ) and mvOffset[ 1 ] is greater than
      0
  - If cIdx is equal to 0, the following applies:
    - The array predSamplesLX$_L$ is derived by invoking the fractional sample Interpolation
      process specified in clause 8.5.6.3 with the luma location ( xSb, ySb ), the coding
      subblock width sbWidth, the coding subblock height sbHeight in luma samples, the
      luma motion vector offset mvOffset, the refined luma motion vector
      refMvLX[ xSbIdx ][ xSbIdx ], the reference array refPicLX$_L$, bdofFlag, and cIdx as inputs.
  - Otherwise if cIdx is equal to 1, the following applies:
    - The array pradSamplesLX$_{Cb}$ is derived by invoking the fractional sample interpolation
      process specified in clause 8.5.6.3 with the luma location ( xSb, ySb ), the coding
      subblock width sbWidth / 2, the coding subblock height sbHeight / 2, the chroma
      motion vector offset mvOffset, the refined chroma motion vector
      refMvLX[ xSbIdx ][ xSbIdx ], the reference array refPIcLX$_{Cb}$, bdofFlag, and cIdx as inputs.
  - Otherwise (cIdx is equal to 2), the following applies:
    - The array predSamplesLX$_{Cr}$ is derived by invoking the fractional sample interpolation
      process specified in clause 8.5.6.3 with the luma location ( xSb, ySb ), the coding
      subblock width sbWidth / 2, the coding subblock height sbHeight / 2, the chroma
      motion vector offset mvOffset, the refined chroma motion vector
      refMvLX[ xSbIdx ][ xSbIdx ] the reference array refPicLX$_{Cr}$, bdofFlag, and cIdx as inputs.
- If bdofFlag is equal to TRUE, the following applies:
  - The variable shift is set equal to Max( 2, 14 − BitDepth$_Y$ ).
  - The variables sbDiffThres, bdofBlkDiffThres, and sbSumDiff are derived as follows:

TABLE 34-continued 1.1.2 Decoding process for inter blocks
1.1.2.1 General sbDiffThres = ( 1 << ( BitDepth$_Y$ − 8 + shift ) ) * sbWidth*sbHeight     (8-705)
    bdofBlkDiffThres = 1 << ( BitDepth$_Y$ − 3 + shift )     (8-706)
    sbSumDiff = 0     (8-707)
- For xIdx = 0..(sbWidth >> 2 ) − 1 and yIdx = 0..( sbHeight >> 2 ) − 1, the variables bdofBlkSumDiff and the bidirectional optical flow utilization flag bdofUtilizationFlag[ xIdx ][ yIdx ] are derived as follows:
    bdofBlkSumDiff = $\Sigma_{i=0}^{3}\Sigma_{j=0}^{3}$ Abs( predSamptaL0$_L$[ ( xId
    x << 2 ) + 1 + i ][ ( yIdx << 2 ) + 1 + j ] −     (8-708)
    predSamplesL1$_L$[ ( xIdx << 2 ) + 1 + i ][ ( yIdx << 2 ) + 1 + j ] )
    bdofUtilizationFlag[ xIdx ][ yIdx ] = bdofBlkSumDiff >= bdofBlkDiffThres     (8-709)
    sbSumDiff += bdofBlkSumDiff     (8-710)
- The variable sbBdofFlag is derived as follows:
  - If sbSumDiff is less than sbDiffThres, sbBdofFlag is sot equal to FALSE.
  - Otherwise, sbBdofFlag set equal to TRUE.
- The array predSamples of prediction samples is derived as follows:
  - If cIdx is equal to 0, the prediction samples inside the current luma coding subblock. predSamples[ x$_L$ + xSb ][ y$_L$ + ySb ] with x$_L$ = 0..sbWidth − 1 and y$_L$ = 0..sbHeight − 1, are derived as follows:
    - If sbBdofFlag is equal to TRUE, the bidirectional optical flow sample prediction process as specified in clause 8.5.6.4 is invoked with nCbW set equal to the luma coding subblock width sbWidth, nCbH set equal to the luma coding subblock height sbHeight and the sample arrays predSamplesL0$_L$ and predSamplesL1$_L$, and the variables predFlagL0[ xSbIdx ][ ySbIdx ], predFlagL1[ xSbIdx ][ ySbIdx ], refIdxL0, refIdxL1 and bdofUtilizationFlag[ xIdx ][ yIdx ] with xIdx = 0..( sbWidth >> 2 ) − 1, yIdx = 0..( sbHeight >> 2 ) − 1 as inputs, and predSamples[ x$_L$ + xSb ][ y$_L$ + ySb ] as outputs.
    - Otherwise (sbBdofFlag is equal to FALSE), the weighted sample prediction process as specified in clause 8.5.6.5 is invoked with the luma coding subblock width sbWidth, the luma coding subblock height sbHeight and the sample arrays predSamplesL0$_L$ and predSamplesL1b$_L$, and the variables predFlagL0[ xSbIdx ][ ySbIdx ], predFlagL1[ xSbIdx ][ ySbIdx ], refIdxL0, refIdxL1, bcwIdx, and cIdx as inputs, and predSamples[ x$_L$ + xSb ][ y$_L$ + ySb ] as outputs.
  - Otherwise, if cIdx is equal to 1, the prediction samples inside the current chroma component Cb coding subblock, predSamples[ x$_C$ + xSb / 2 ][ y$_C$ + ySb / 2 ] with x$_C$ = 0..sbWidth / 2 − 1 and y$_C$ = 0..sbHeight / 2 − 1, are derived by invoking the weighted sample prediction process specified in clause 8.5.6.5 with nCbW set equal to sbWidth / 2, nCbH set equal to sbHeight / 2, the sample arrays pradSamplesL0$_{Cb}$ and predSamplesL1$_{Cb}$, and the variables predFlagL0[ xSbIdx ][ ySbIdx ], predFlagL1[ xSbIdx ][ ySbIdx ], refIdxL0, refIdxL1, bcwIdx, and cIdx as inputs.
  - Otherwise (cIdx is equal to 2), the prediction samples inside the current chroma component Cr coding subblock, predSamples[ x$_C$ + xSb / 2 ][ y$_C$ + ySb / 2 ] with x$_C$ = 0..sbWidth / 2 − 1 and y$_C$ = 0..sbHeight / 2 − 1, are derived by invoking the weighted sample prediction process specified in clause 8.5.6.5 with nCbW set equal to sbWidth / 2, nCbH set equal to sbHeight / 2, the sample arrays predSamplesL0$_{Cr}$ and predSamplesL1$_{Cr}$, and the variables predFlagL0[ xSbIdx ][ ySbIdx ], predFlagL1[ xSbIdx ][ ySbIdx ], refIdxL0, refIdxL1, bcwIdx, and cIdx as inputs.
- When cIdx is equal to 0, the following assignments are made for x = 0..sbWidth − 1 and y = 0..sbHeight − 1:
    MvL0[ xSb + x ][ ySb + y ] = mvL0[ xSbIdx ][ ySbIdx ]     (8-711)
    MvL1[ xSb + x ][ ySb + y ] = mvL1[ xSbIdx ][ ySbIdx ]     (8-712)
    MvDmvrL0[ xSb + x ][ ySb + y ] = refMvL0[ xSbIdx ][ ySbIdx ]     (8-713)
    MvDmvrL1[ xSb + x ][ ySb + y ] = refMvL1[ xSbIdx ][ ySbIdx ]     (8-714)
    RefIdxL0[ xSb + x ][ ySb + y ] = refIdxL0     (8-713)
    RefIdxL1[ xSb + x ][ ySb + y ] = refIdxL1     (8-716)
    PredFlagL0[ xSb + x ][ ySb + y ] = predFlagL0[ xSbIdx ][ ySbIdx ]     (8-717)
    PredFlagL1[ xSb + x ][ ySb + y ] = predFlagL1[ xSbIdx ][ ySbIdx ]     (8-718)
    BcwIdx[ xSb + x ][ ySb + y ] = bcwIdx     (8-719)
When ciip_flag[ xCb ][ yCb ] is equal to 1, the array predSamples of prediction samples is modified as follows:
- If cIdx is equal to 0, the following applies:
  - The general intra sample prediction process as specified in clause 8.4.5.2.5 is invoked with the location ( xTbCmp, yTbCmp ) set equal to ( xCb, yCb ), the intra prediction mode predModeIntra set equal to IntraPredModeY[ xCb ][ yCb ], the transform block width nTbW and height nTbH set equal to cbWidth and cbHeight the coding block width nCbW and height nCbH set equal to cbWidth and cbHeight, and the variable cIdx as inputs, and the output is assigned to the (cbWidth)×(cbHeight) array predSamplesIntra$_L$.
  - The weighted sample prediction process for combined merge and intra prediction as specified in clause 8.5.6.6 is invoked with the location ( xTbCmp, yTbCmp ) set equal to ( xCb, yCb ), the coding block width cbWidth, the coding block height cbHeight the sample arrays predSamplesInter and predSamplesIntra set equal to predSamples and predSamplesIntra$_L$, respectively, the intra prediction mode predModeIntra set equal to IntraPredModeY[ xCb ][ yCb ], and the colour component index cIdx as inputs, and the output is assigend to the (cbWidth)×(cbHeight) array predSamples.
- Otherwise, if cIdx is equal to 1, the following applies:
  - The general intra sample prediction process as specified in clause 8.4.5.2.5 is invoked with the location ( xTbCmp, yTbCmp ) set equal to ( xCb / 2, yCb / 2 ), the intra prediction mode predModeIntra set equal to IntraPredModeY[ xCb ][ yCb ] the transform block width nTbW TABLE 34-continued 1.1.2 Decoding process for inter blocks
1.1.2.1 General

- and height nTbH set equal to cbWidth / 2 and cbHeight / 2, the coding block width nCbW and height nCbH set equal to cbWidth / 2 and cbHeight / 2, and the variable cIdx as inputs, and the output is assigned to the (cbWidth / 2)×(cbHeight / 2) array predSamplesIntra$_{Cb}$.
- The weighted sample prediction process for combined merge and intra prediction as specified in clause 8.5.6.6 is invoked with the location ( xTbCmp, yTbCmp ) set equal to ( xCb, yCb ), the coding block width cbWidth / 2, the coding block height cbHeight / 2, the sample arrays predSamplesInter and predSamplesIntra sot equal to predSamples$_{Cb}$ and predSamplesIntra$_{Cb}$, respectively, the intra prediction mode predModeIntra set equal to IntraPredModeY[ xCb ][ yCb ], and the colour component index cIdx as inputs, and the output is assigned to the (cbWidth / 2)×(cbHeight / 2) array predSamples.
- Otherwise (cIdx is equal to 2), the following applies:
  - The general intra sample prediction process as specified in clause 8.4.5.2.5 is invoked with the location ( xTbCmp, yTbCmp ) set equal to ( xCb / 2, yCb / 2 ), the intra prediction mode predModeIntra set equal to IntraPredModeY[ xCb ][ yCb ], the transform block width nTbW and height nTbH set equal to cbWidth / 2 and cbHeight / 2, the coding block width nCbW and height nCbH set equal to cbWidth / 2 and cbHeight / 2, and the variable cIdx as inputs, and the output is assigned to the (cbWidth / 2)×(cbHeight / 2) array predSamplesIntra$_{Cr}$.
  - The weighted sample prediction process for combined merge and intra prediction as specified in clause 8.5.6.6 is invoked with the location ( xTbCmp, yTbCmp ) set equal to ( xCb, yCb ), the coding block width cbWidth / 2, the coding block height cbHeight / 2, the sample arrays predSamplesInter and predSamplesIntra set equal to predSamples$_{Cr}$ and predSamplesIntra$_{Cr}$, respectively, the intra prediction mode predModeIntra set equal to IntraPredModeY[ xCb ][ yCb ], and the colour component index cIdx as inputs, and the output is assigned to the (cbWidth / 2)×(cbHeight / 2) array predSamples.

Referring to Table 34, when the value of cu_transquant_bypass_flag is not 1, the value of the flag bdofFlag indicating whether or not BDOF is applied may be set to 1. Therefore, when the value of cu_transquant_bypass_flag is 1, BDOF may not be applicable to the current block.

In addition, an embodiment of this document proposes a method of not performing prediction refinement with optical flow (PROF) on the current block when lossless coding is applied. For example, whether or not the lossless coding is applied may be determined by a flag (e.g., cu_transquant_bypass_flag, etc.) regarding whether or not the lossless coding is applied, or by other method described above.

A method for improving sub-block based affine motion compensated prediction based on an optical flow concept is proposed.

After sub-block-based affine motion compensation is performed, the prediction sample may be improved by adding a difference derived by an optical flow equation, which may be referred to as prediction refinement with optical flow (PROF).

The decoding process according to the above-described embodiment may be as shown in the following tables.

TABLE 35

8.5.1 General decoding process for coding unite coded in inter prediction mode

Inputs to the process are:
- a luma location ( xCb, yCb ) specifying the top-left sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single or a dual tree is used and If a dual tree is used. it specifies whether the current tree corresponds to the luma or chroma components.

Output of this process is a modified reconstructed picture before in-loop filtering.
The derivation process for quantization parameters as specified in clause 8.7.1 is invoiced with the luma location ( xCb, yCb ), the width of the current coding block in luma samples cbWidth and the height of the current coding block in luma samples cbHeight, and the variable treeType as inputs.
The decoding process for coding units coded in inter prediction mode consists of the following ordered steps:
   3.       The variable dmvrFlag is set equal to 0.
   4.       The motion vector components and reference indices of the current coding unit are derived as follows:
- If MergeTriangleFlag[ xCb ][ yCb ], inter_affine_flag[ xCb ][ yCb ] and merge_subblock_flag[ xCb ][ yCb ] are all equal to 0, the following applies:
  - The derivation process for motion vector components and reference indices as specified in clausa 8.5.2.1 is invoked with the luma coding block location ( xCb, yCb ), the luma coding block width cbWidth and the luma coding block height cbHeight as inputs, and the luma motion vectors mvL0[ 0 ][ 0 ] and mvL1[ 0 ][ 0 ], the reference indices refIdxL0 and refIdxL1 and the prediction list utilization flags predFlagL0[ 0 ][ 0 ] and predFlagL1[ 0 ][ 0 ] and the bi-prediction weight index bcwIdx as outputs.
  - When all of the following conditions are true, dmvrFlag is set equal to 1:
    - sps_dmvr_enabled_flag is equal to 1
    - general_merge_flag[ xCb ][ yCb ] is equal to 1
    - both predFlagL0[ 0 ][ 0 ] and predFlagL1[ 0 ][ 0 ] are equal to 1
    - mmvd_merge_flag[ xCb ][ yCb ] is equal to 0

TABLE 35-continued

| 8.5.1 General decoding process for coding unite coded in inter prediction mode |

- DiffPicOrderCnt( currPic, RefPicList[ 0 ][ refIdxL0 ]) is equal to DiffPicOrderCnt( RefPicList[ 1 ][ refIdxL1 ], currPic )
- BcwIdx[ xCb ][ yCb ] is equal to 0
- Both luma_weight_l0_flag[ refIdxL0 ] and luma_weight_l1_flag[ refIdxL1 ] are equal to 0
- cbWidth is greater than or equal to 8
- cbHeight is greater than or equal to 8
- cbHeight*cbWidth is greater than or equal to 128
- If dmvrFlag is equal to 1, the following applies:
  - For X being 0 and 1, the reference picture consisting of an ordered two-dimensional array refPicLX$_L$ of luma samples and two ordered two-dimensional arrays refPicLX$_{Cb}$ and refPicLX$_{Cr}$ of chroma samples is derived by invoking the process specified in clause 8.5.6.2 with X and refIdxLX as inputs.
  - The number of luma coding subblocks in horizontal direction numSbX and in vertical direction numSbY, the subblock width sbWidth and the subblock height sbHeight are derived as follows:
    - numSbX = ( cbWidth > 16 ) ? ( cbWidth >> 4 ) : 1  (8-240)
    - numSbY = ( cbHeight > 16 ) ? ( cbHeight >> 4 ) : 1  (8-241)
    - sbWidth = ( cbWidth > 16 ) ? 16 : cbWidth  (8-242)
    - sbHeight = ( cbHeight > 16 ) ? 16 : cbHeight  (8-243)
  - For xSbIdx = 0..numSbX − 1 and ySbIdx = 0..numSbY − 1, the following applies:
    - The luma motion vectors mvLX[ xSbIdx ][ ySbIdx ] and the prediction list utilization flags predFlagLX[ xSbIdx ][ ySbIdx ] with X equal to 0 and 1, and the luma location ( xSb[xSbIdx][ySbIdx], ySb[xSbIdx][ySbIdx] ) specifying the top-left sample of the coding subblock relative to the top-left luma sample of the current picture are derived as follows:
      - mvLX[ xSbIdx ][ ySbIdx ] = mvLX[ 0 ][ 0 ]  (8-244)
      - predFlagLX[ xSbIdx ][ ySbIdx ] = predFlagLX[ 0 ][ 0 ]  (8-245)
      - xSb[ xSbIdx ][ ySbIdx ] = xCb + xSbIdx * sbWidth  (8-246)
      - ySb[ xSbIdx ][ ySbIdx ] = yCb + ySbIdx * sbHeight  (8-247)
    - The decoder side motion vector refinement process specified in clause 8.5.3.1 is invoked with xSb[ xSbIdx ][ ySbIdx ], ySb[ xSbIdx ][ ySbIdx ], sbWidth, sbHeight, the motion vectors mvLX[ xSbIdx ][ ySbIdx ] and the reference picture array refPicLX$_L$ as inputs and delta motion vectors dMvLX[ xSbIdx ][ ySbIdx ] as outputs with X equal to 0 and 1.
    - The derivation process for chroma motion vectors in clause 8.5.2.13 is invoked with mvLX[ xSbIdx ][ ySbIdx ] and refIdxLX as inputs, and mvCLX[ xSbIdx ][ ySbIdx ] as outputs with X equal to 0 and 1.
  - Otherwise (dmvrFlag is equal to 0), the following applies:
    - When treeType is equal to SINGLE-TREE and predFlagLX[ 0 ][0 ], with X being 0 or 1, is equal to 1, the derivation process for chroma motion vectors in clause 8.5.2.13 is invoked with mvLX[ 0 ][ 0 ] and refIdxLX as inputs, and mvCLX[ 0 ][ 0 ] as output
    - The number of luma coding subblocks in horizontal direction numSbX and in vertical direction numSbY are both set equal to 1.
- Otherwise, if MergeTriangleFlag[ xCb ][ yCb ] is equal to 1, inter_affine_flag[ xCb ][ yCb ] and merge_subblock_flag[ xCb ][ yCb ] are both equal to 0, the derivation process for triangle motion vector components and reference indices as specified in clause 8.5.4.1 is invoked with the luma coding block location ( xCb, yCb ), the luma coding block width cbWidth and the luma coding block height cbHeight as inputs, and the luma motion vectors mvA and mvB, the chroma motion vectors mvCA and mvCB, the reference indices refIdxA end refIdxB end the prediction list flags predListFlagA and predListFlagB as outputs.
- Otherwise (inter_affine_flag[ xCb ][ yCb ] or merge_subblock_flag[ xCb ][ yCb ] is equal to 1), the derivation process for subblock motion vector components and reference indices as specified in clause 8.5.5.1 is invoked with the luma coding block location ( xCb, yCb ), the luma coding block width cbWidth, the luma coding block height cbHeight as inputs. and the reference indices refIdxL0 and refIdxL1, the number of luma coding subblocks in horizontal direction numSbX and in vertical direction numSbY, the prediction list utilization flags predFlagLX[ xSbIdx ][ ySbIdx ], the luma motion vector array mvLX[ xSbIdx ][ ySbIdx ], and the chroma motion vector array mvCLX[ xSbIdx ][ ySbIdx ] with xSbIdx = 0..(cbWidth >> 2) − 1, and ySbIdx = 0..( cbHeight >> 2 ) − 1, and with X being 0 or 1, and-the bi-prediction weight index bcwIdx, the prediction refinement utility flag cbProfFlag, and motion vector difference array diffMv as outputs.

5. The arrays of luma and chroma motion vectors after decoder side motion vector refinement, refMvLX[ xSbIdx ][ ySbIdx ] and rwfMvCLX[ xSbIdx ][ ySbIdx ], with X being 0 and 1, are derived as follows for xSbIdx = 0..numSbX − 1, ySbIdx = 0..numSbY − 1:
   - If dmvrFlag is equal to 1, the derivation process for chroma motion vectors in clause 8.5.2.13 is invoked with refMvLX[ xSbIdx ][ ySbIdx ] and refIdxLX as inputs, and refMvCLX[ xSbIdx ][ ySbIdx ] as output and the input refMvLX[ xSbIdx ][ ySbIdx ] is derived as follows;
     - refMvLX[ xSbIdx ][ ySbIdx ] = mvLX[ xSbIdx ][ ySbIdx ] + dMvLX[ xSbIdx ][ ySbIdx ] (8-248)
     - refMvLX[ xSbIdx ][ ySbIdx ][ 0 ] = Clip3( $-2^{17}$, $2^{17} - 1$, refMvLX[ xSbIdx ][ ySbIdx ][ 0 ] ) (8-249)
     - refMvLX[ xSbIdx ][ ySbIdx ][ 1 ] = Clip3( $-2^{17}$, $2^{17} - 1$, refMvLX[ xSbIdx ][ ySbIdx ][ 1 ] ) (8-250)

TABLE 35-continued 8.5.1 General decoding process for coding unite coded in inter prediction mode

- Otherwise (dmvrFlag is equal to 0), the following applies:
  refMvLX[ xSbIdx ][ ySbIdx ] = mvLX[ xSbIdx ][ ySbIdx ]   (8-251)
  refMvCLX[ xSbIdx ][ ySbIdx ] = mvCLX[ xSbIdx ][ ySbIdx ]   (8-252)
  NOTE - The array refMvLX is stored in MvDmvrLX and used in the derivation process for collocated motion vectors in clause 8 5.2.12. The array of non-refine luma motion vectors MvLX is used in the spatial motion vector prediction and deblocking boundary strength derivation processes.

6. The prediction samples of the current coding unit are derived as follows:
    - If MergeTriangleFlag[ xCb ][ yCb ] is equal to 0, the prediction samples of the current coding unit are derived as follows:
        - The decoding process for inter blocks as specified in clause 8.5.6.1 is invoked with the luma coding block location ( xCb, yCb ), the luma coding block width cbWidth and the luma coding block height cbHeight the number of luma coding subblocks in horizontal direction numSbX and in vertical direction numSbY, the luma motion vectors mvL0[ xSbIdx ][ ySbIdx ] and mvL1[ xSbIdx ][ ySbIdx ], and the refined luma motion vectors refMvL0[ xSbIdx][ ySbIdx ] and refMvL1[ xSbIdx][ ySbIdx] with xSbIdx = 0..numSbX − 1, and ySbIdx = 0..numSbY − 1, the reference indices refIdxL0 and refIdxL1, the prediction list utilization flags predFlagL0[ xSbIdx ][ ySbIdx ] and predFlagL1[ xSbIdx ][ ySbIdx ], the bi-prediction weight index bcwIdx, and the variable cIdx set equal to 0, the prediction refinement utility flag cbProfFlag, and motion vector difference array diffMv as inputs, and the inter prediction samples (predSamples) that are an (cbWidth)×(cbHeight) array predSamples$_L$ of prediction luma samples as outputs.
        - The decoding process for inter blocks as specified in clause 8.5.6.1 is invoked with the luma coding block location ( xCb, yCb ), the luma coding block width cbWidth and the luma coding block height cbHeight the number of luma coding subblocks in horizontal direction numSbX and in vortical direction numSbY, the chroma motion vectors mvCL0[ xSbIdx ][ ySbIdx ] and mvCL1[ xSbIdx ][ ySbIdx ], and the refined chroma motion vectors refMvCL0[ xSbIdx ][ ySbIdx ] and refMvCL1[ xSbIdx ][ ySbIdx ] with xSbIdx = 0..numSbX − 1, and ySbIdx = 0..numSbY − 1, the reference indices refIdxL0 and refIdxL1, the prediction list utilization flags predFlagL0[ xSbIdx ][ ySbIdx ] and predFlagL1[ xSbIdx ][ ySbIdx ], the bi-prediction weight index bcwIdx, and the variable cIdx set equal to 1, the prediction refinement utility flag cbProfFlag, and motion vector difference array diffMv as inputs, and the inter prediction samples (predSamples) that are an (cbWidth / 2)×(cbHeight / 2) array predSample$_{Cb}$ of prediction chroma samples for the chroma components Cb as outputs.
        - The decoding process for inter blocks as specified in clause 8.5.6.1 is invoked with the luma coding block location ( xCb, yCb ), the luma coding block width cbWidth and the luma coding block height cbHeight, the number of luma coding subblocks in horizontal direction numSbX and in vertical direction numSbY, the chroma motion vectors mvCL0[ xSbIdx ][ ySbIdx ] and mvCL1[ xSbIdx ][ ySbIdx ], and the refined chroma motion vectors refMvCL0[ xSbIdx ][ ySbIdx ] and refMvCL1[ xSbIdx ][ ySbIdx ] with xSbIdx = 0..numSbX − 1, and ySbIdx = 0..numSbY − 1, the reference indices refIdxL0 and refIdxL1, the prediction list utilization flags predFlagL0[ xSbIdx ][ ySbIdx ] and predFlagL1[ xSbIdx ][ ySbIdx ], the bi-prediction weight index bcwIdx, and the variable cIdx set equal to 2, the prediction refinement utility flag cbProfFlag, and motion vector difference array diffMv as inputs, and the inter prediction samples (predSamples) that are an (cbWidth / 2)×(cbHeight / 2) array predSamples$_{Cr}$ of prediction chroma samples for the chroma components Cr as outputs
    - Otherwise (MergeTriangleFlag[ xCb ][ yCb ] is equal to 1), the decoding process for triangular inter blocks as specified in clause 8.5.7.1 is invoked with the luma coding block location ( xCb, yCb ), the luma coding block width cbWidth and the luma coding block height cbHeight, the luma motion vectors mvA and mvB, the chroma motion vectors mvCA and mvCB, the reference indices refIdxA and refIdxB, and the prediction list flags predListFlagA and predListFlagB as inputs, and the inter prediction samples (predSamples) that are an (cbWidth)×(cbHeight) array predSamples$_L$ of prediction luma samples and two (cbWidth / 2)×(cbHeight! 2) arrays predSamples$_{Cb}$ and predSample$_{Cr}$ of prediction chroma samples, one for each of the chroma components Cb and Cr, as outputs.

7. The variables NumSbX[ xCb ][ yCb ] and NumSbY[ xCb ][ yCb ] are set equal to numSbX and numSbY, respectively.

6. The residual samples of the current coding unit are derived as follows:
    - The decoding process for the residual signal of coding blocks coded in inter prediction mode as specified in clause 8.5.8 is invoked with the location ( xTb0, yTb0 ) set equal to the luma location ( xCb, yCb ), the width nTbW set equal to the luma coding block width cbWidth, the height nTbH set equal to the luma coding block height cbHeight and the variable cIdx set equal to 0 as inputs, and the array resSamples$_L$ as output.
    - The decoding process for the residual signal of coding blocks coded in inter prediction mode as specified in clause 8.5.8 is invoked with the location ( xTb0, yTb0 ) set equal to the chroma location ( xCb / 2, yCb / 2 ), the width nTbW set equal to the chroma coding block width cbWidth / 2, the height nTbH set equal to the chroma coding block height cbHeight / 2 and the variable cIdx set equal to 1 as inputs, and the array resSamples$_{Cb}$ as output
    - The decoding process for the residual signal of coding blocks coded in inter prediction mode as specified in clause 8.5.8 is invoked with the location ( xTb0, yTb0 ) set equal to the chroma location ( xCb / 2, yCb / 2 ), the width nTbW set equal to the chroma coding

TABLE 35-continued

8.5.1 General decoding process for coding unite coded in inter prediction mode block width cbWidth / 2, the height nTbH set equal to the chroma coding block height cbHeight / 2 and the variable cIdx set equal to 2 as inputs, and the array resSamples$_{Cr}$ as output.

9.    The reconstructed samples of the current coding unit are derived as follows:
- The picture reconstruction process for a colour component as specified in clause 8.7.5 is invoked with the block location ( xB, yB ) sot equal to ( xCb, yCb ), the block width bWidth set equal to cbWidth, the block height bHeight set equal to cbHeight the variable cIdx set equal to 0, the (cbWidth)×(cbHeight) array predSamples set equal to predSamples$_L$ and the (cbWidth)×(cbHeight) array resSamples set equal to resSamples$_L$ as inputs, and the output is a modified reconstructed picture before in-loop filtering.
- The picture reconstruction process for a colour component as specified in clause 8.7.5 is invoked with the block location ( xB, yB ) set equal to ( xCb / 2, yCb / 2 ), the block width bWidth set equal to cbWidth / 2, the block height bHeight set equal to cbHeight / 2, the variable cIdx set equal to 1, the (cbWidth / 2)×(cbHeight / 2) array predSamples set equal to predSamplas$_{Cb}$ and the (cbWidth / 2)×(cbHeight / 2) array resSamples set equal to resSamples$_{Cb}$ as inputs, and the output is a modified reconstructed picture before in-loop filtering.
- The picture reconstruction process for a colour component as specified in clause 8.7.5 is invoked with the block location ( xB, yB ) set equal to ( xCb / 2, yCb / 2 ), the block width bWidth set equal to cbWidth / 2, the block height bHeight set equal to cbHeight / 2, the variable cIdx set equal to 2, the (cbWidth / 2)×(cbHeight / 2) array predSamples set equal to predSamples$_{Cr}$ and the (cbWidth / 2)×(cbHeight / 2) array resSamples set equal to resSamples$_{Cr}$ as inputs, and the output is a modified reconstructed picture before in-loop filtering.

TABLE 36

8.5.5 Derivation process for subblock motion vector components and reference Indices
8.5.5.1 General Inputs to this process are:
- a luma location ( xCb, yCb ) of the top-left sample of the current luma coding block relative to the top-left luma sample of the cunent picture,
- a variable cbWidth specifying the width of the current coding block in luma samples,
- a variable cbHeight specifying the height of the current coding block in luma samples.

Outputs of this process are:
- the reference indices refIdxL0 and refIdxL1,
- the number of luma coding subblocks in horizontal direction numSbX and in vertical direction numSbY,
- the prediction list utilization flag arrays predFlagL0[ xSbIdx ][ ySbIdx ] and predFlagL1[ xSbIdx ][ ySbIdx ] with xSbIdx = 0..numSbX − 1, ySbIdx = 0 .. numSbX − 1,
- the luma subblock motion vector arrays in 1/16 fractional-sample accuracy mvL0[ xSbIdx ][ ySbIdx ] and mvL1[ xSbIdx ][ ySbIdx ] with xSbIdx = 0..numSbX − 1, ySbIdx = 0..numSbY − 1,
- the chroma subblock motion vector arrays in 1/32 fractional-sample accuracy mvCL0[ xSbIdx ][ ySbIdx ] and mvCL1[ xSbIdx ][ ySbIdx ] with xSbIdx = 0..numSbX − 1, ySbIdx = 0..numSbY − 1,
- the bi-prediction weight index bcwIdx.
- the prediction refinement utility flag cb.
- the prediction refinement utilization flag cbProfFlag.
- the motion vector difference array diffMv.

The variable cbProfFlag is initialized to be equal to zero.
For the derivation of the variables mvL0[ xSbIdx ][ ySbIdx ] mvL1[ xSbIdx ][ ySbIdx ], mvCL0[ xSbIdx ][ ySbIdx ] and mvCL1[ xSbIdx ][ ySbIdx ], refIdxL0, refIdxL1, numSbX, numSbY, predFlagL0[ xSbIdx ][ ySbIdx ] and predFlagL1[ xSbIdx ][ ySbIdx ] the following applies:
- If merge_subblock_flag[ xCb ][ yCb ] is equal to 1, the derivation process for motion vectors and reference indices in subblock merge mode as specified in 8.5.5.2 is invoked with the luma coding block location ( xCb, yCb ), the luma coding block width cbWidth and the luma coding block height cbHeight as inputs, the number of luma coding subblocks in horizontal direction numSbX and in vertical direction numSbY, the reference indices refIdxL0, refIdxL1, the prediction list utilization flag arrays predFlagL0[ xSbIdx ][ ySbIdx ] and predFlagL1[ xSbIdx ][ ySbIdx ], the luma subblock motion vector arrays mvLD[ xSbIdx ][ ySbIdx ] and mvL0[ xSbIdx ][ ySbIdx ] and the chroma subblock motion vector arrays mvCL0[ xSbIdx ][ ySbIdx ] and mvCL1[ xSbIdx ][ ySbIdx ], with xSbIdx = 0.. numSbX − 1, ySbIdx = 0 .. numSbY − 1, and the bi-prediction weight index bcwIdx as outputs.
- Otherwise (merge_subblock_flag[ xCb ][ yCb ] is equal to 0), for X being replaced by either 0 or 1 in the variables predFlagLX, cpMvLX, MvdCpLX, and refIdxLX, in PRED_LX, and in the syntax element ref_idx_lX, the following ordered steps apply:
  - For the derivation of the number of control point motion vectors numCpMv, the control point motion vectors cpMvLX[ cpIdx ] with cpIdx ranging from 0 to numCpMv − 1, refIdxLX, predFlagLX[ 0 ][ 0 ], the following applies:
    1. The number of control point motion vectors numCpMv is set equal to MotionModelIdc[ xCb ][ yCb ] + 1.

TABLE 36-continued 8.5.5 Derivation process for subblock motion vector components and reference Indices
8.5.5.1 General 2. The variables refIdxLX and predFlagLX are derived as follows:
   - If inter_pred_idc[ xCb ][ yCb ] is equal to PRED_LX or PRED_BI,
     refIdxLX = ref_idx_lX[ xCb ][ yCb ]  (8-457)
     predFlagLX[ 0 ][ 0 ] = 1  (8-458)
   - Otherwise, the variables refIdxLX and predFlagLX are specified by:
     refIdxLX = −1  (8-459)
     predFlagLX[ 0 ][ 0 ] = 0  (8-460)
3. The variable mvdCpLX[ cpIdx ] with cpIdx ranging from 0 to numCpMv − 1, is derived as follows:
     mvdCpLX[ cpIdx ][ 0 ] = MvdCpLX[ xCb ][ yCb ][ cpIdx ][ 0 ]  (8-461)
     mvdCpLX[ cpIdx ][ 1 ] = MvdCpLX[ xCb ][ yCb ][ cpIdx ][ 1 ]  (8-462)
4. Whan predFlagLX[ 0 ][ 0 ] is equal to 1, the derivation process for luma affine control point motion vector predictors as specified in clause 8.5.5.7 is invoked with the luma coding block location ( xCb, yCb ), and the variables cbWidth, cbHeight, refIdxLX, and the number of control point motion vectors numCpMv as inputs, and the output being mvpCpLX[ cpIdx ] with cpIdx ranging from 0 to numCpMv − 1.
5. When predFlagLX[ 0 ][ 0 ] is equal to 1, the luma motion vectors cpMvLX[ cpIdx ] with cpIdx ranging from 0 to NumCpMv − 1, are derived as follows:
     uLX[ cpIdx ][ 0 ] = ( mvpCpLX[ cpIdx ][ 0 ] + mvdCpLX[ cpIdx ][ 0 ] + $2^{18}$ ) % $2^{18}$  (8-463)
     cpMvLX[ cpIdx ][ 0 ] = (uLX[ cpIdx ][ 0 ] >= $2^{17}$ ) ? (uLX[ cpIdx ][ 0 ] − $2^{18}$) :
       uLX[ cpIdx ][ 0 ]  (8-464)
     uLX[ cpIdx ][ 1 ] = ( mvpCpLX[ cpIdx ][ 1 ] + mvdCpLX[ cpIdx ][ 1 ] + $2^{18}$ ) % $2^{18}$  (8-465)
     cpMvLX[ cpIdx ][ 1 ] = (uLX[ cpIdx ][ 1 ] >= $2^{17}$ ) ? (uLX[ cpIdx ][ 1 ] − $2^{18}$ ) :
       uLX[ cpIdx ][ 1 ]  (8-466)
- The variables numSbX and numSbY are derived as follows:
     numSbX = ( cbWidth >> 2 )  (8-467)
     numSbY = ( cbHeight >> 2 )  (8-468)
- For xSbIdx = 0..numSbX − 1, ySbIdx = 0..numSbY − 1, the following applies:
     predFlagLX[ xSbIdx ][ ySbIdx ] = predFlagLX[ 0 ][ 0 ]  (8-469)
- When predFlagLX[ 0 ][ 0 ] is equal to 1, the derivation process for motion vector arrays from affine control point motion vectors as specified in subclause 8.5.5.9 is invoked with the luma coding block location ( xCb, yCb ), the luma coding block width cbWidth, the luma prediction block height cbHeight, the number of control point motion vectors numCpMv, the control point motion vectors cpMvLX[ cpIdx ] with cpIdx being 0..2, the reference index refIdxLX and the number of luma coding subblocks in horizontal direction numSbX and in vertical direction numSbY as inputs, the luma motion vector array mvLX[ xSbIdx ][ ySbIdx ],and the chroma motion vector array mvCLX[ xSbIdx ][ ySbIdx ] with xSbIdx = 0..numSbX − 1, ySbIdx = 0 .. numSbY − 1, the prediction refinement utility flag cbProfFlag, and motion vector difference array diffMv as outputs.
- The bi-prediction weight index bcwIdx is set equal to bcw_idx[ xCb ][ yCb ].

TABLE 37

8.5.5.9 Derivation process for motion vector arrays from affine control point motion vectors Input to this process are:
- a luma location ( xCb, yCb ) of the top-left sample of the current luma coding block relative to the top-left luma sample of the current picture,
- two variables cbWidth and cbHeight specifying the width and the height of the luma coding block,
- the number of control point motion vectors numCpMv,
- the control point motion vectors cpMvLX[ cpIdx ], with cpIdx = 0..numCpMv − 1 and X being 0 or 1,
- the reference index refIdxLX and X being 0 or 1,
- the number of luma coding subblocks in horizontal direction numSbX and in vertical direction numSbY.
Outputs of this process are:
- the luma subblock motion vector array mvLX[ xSbIdx ][ ySbIdx ] with xSbIdx = 0..numSbX − 1, ySbIdx = 0 .. numSbY − 1 and X being 0 or 1,
- the chroma subblock motion vector array mvCLX[ xSbIdx ][ ySbIdx ] with xSbIdx = 0..numSbX − 1, ySbIdx = 0 .. numSbY − 1 and X being 0 or 1.
- the motion vector difference array diffMv.
The following assignments are made for x = xCb..xCb + cbWidth − 1 and
y = yCb..yCb + cbHeight − 1:
     CpMvLX[ x ][ y ][ 0 ] = cpMvLX[ 0 ]  (8-666)
     CpMvLX[ x ][ y ][ 1 ] = cpMvLX[ 1 ]  (8-667)
     CpMvLX[ x ][ y ][ 2 ] = cpMvLX[ 2 ]  (8-668)
The variables log2CbW and log2CbH are derived as follows:
     log2CbW = Log2( cbWidth )  (8-669)
     log2CbH = Log2( cbHeight )  (8-670)
The variables mvScaleHor, mvScaleVer, dHorX and dVerX are derived as follows:
     mvScaleHor = cpMvLX[ 0 ][ 0 ] << 7  (8-671)
     mvScaleVer = cpMvLX[ 0 ][ 1 ] << 7  (8-672)

TABLE 37-continued 8.5.5.9 Derivation process for motion vector arrays from affine control point motion vectors $\quad\quad$ dHorX = ( cpMvLX[ 1 ][ 0 ] − cpMvLX[ 0 ][ 0 ] ) << ( 7 − log2CbW ) $\quad\quad$ (8-673)
$\quad\quad$ dVerX = ( cpMvLX[ 1 ][ 1 ] − cpMvLX[ 0 ][ 1 ] ) << ( 7 − log2CbW ) $\quad\quad$ (8-674)
The variables dHorY and dVerY are derived as follows:
- If numCpMv is equal to 3, the following applies:
$\quad\quad$ dHorY = ( cpMvLX[ 2 ][ 0 ] − cpMvLX[ 0 ][ 0 ] ) << ( 7 − log2CbH ) $\quad\quad$ (8-675)
$\quad\quad$ dVerY = ( cpMvLX[ 2 ][ 1 ] − cpMvLX[ 0 ][ 1 ] ) << ( 7 − log2CbH ) $\quad\quad$ (8-676)
- Otherwise ( numCpMv is equal to 2), the following applies:
$\quad\quad$ dHorY = − dVerX $\quad\quad$ (8-677)
$\quad\quad$ dVerY = dHorX $\quad\quad$ (8-678)
The variable fallbackModeTriggered is set equal to 1 and modified as follows:
- The variables bxWX$_4$, bxHX$_4$, bxWX$_h$, bxHX$_h$, bxWX$_v$ and bxHX$_v$ are derived as follows:
$\quad\quad$ maxW$_4$ = Max( 0, Max( 4 * ( 2048 + dHorX ),
$\quad\quad\quad\quad$ Max( 4*dHorY, 4 * ( 2048 + dHorX ) + 4 * dHorY ) ) ) $\quad\quad$ (8-679)
$\quad\quad$ minW$_4$ = Min( 0, Min( 4 *( 2048 + dHorX ),
$\quad\quad\quad\quad$ Min( 4*dHorY, 4 * ( 2048 + dHorX ) + 4 * dHorY ) ) ) $\quad\quad$ (8-680)
$\quad\quad$ maxH$_4$ = Max( 0, Max( 4 * dVerX,
$\quad\quad\quad\quad$ Max( 4* ( 2048 + dVerY ), 4 * dVerX + 4 * (2048 + dVerY ) ) ) ) $\quad\quad$ (8-681)
$\quad\quad$ minH$_4$ * Min( 0, Min( 4 * dVerX,
$\quad\quad\quad\quad$ Min( 4* ( 2048 + dVerY ), 4 * dVerX + 4 * ( 2048 + dVerY ) ) ) ) $\quad\quad$ (8-682)
$\quad\quad$ bxWX$_4$ = ( ( maxW$_4$ − minW$_4$ ) >> 11 ) + 9 $\quad\quad$ (8-683)
$\quad\quad$ bxHX$_4$ = ( ( maxH$_4$ − minH$_4$ ) >> 11 ) + 9 $\quad\quad$ (8-684)
$\quad\quad$ bxWX$_4$ = ( ( Max( 0, 4 * ( 2048 + dHorX ) ) − Min( 0, 4 * ( 2048 + dHorX ) ) ) >> 11 ) + 9 (8-685)
$\quad\quad$ bxHX$_4$ = ( ( Max( 0, 4 * dVorX ) − Min( 0, 4 * dVetX ) ) >> 11 ) + 9 $\quad\quad$ (8-686)
$\quad\quad$ bxWX$_4$ = ( ( Max( 0, 4 * dHorY ) − Min( 0, 4 * dHorY ) ) >> 11 ) + 9 $\quad\quad$ (8-687)
$\quad\quad$ bxHX$_4$ = ( ( Max( 0, 4 * ( 2048 + dVerY ) ) − Min( 0, 4 * ( 2048 + dVerY ) ) ) >> 11 ) +9 $\quad\quad$ (8-688)
- If inter_pred_idc[ xCb ][ yCb ] is equal to PRED_BI and bxWX$_4$ * bxHX$_4$ is less than or equal to
$\quad$ 225, fallbackModeTriggered is set equal to 0,
- Otherwise, if both bxWX$_h$ * bxHX$_h$ is less than or equal to 165 and bxWX$_v$ * bxHX$_v$ is less than or
$\quad$ equal to 165, fallbackModeTriggered is set equal to 0.
For xSbIdx = 0..numSbX − 1 and ySbIdx = 0..numSbY − 1, the following applies:
- The variables xPosCb and yPosCb are derived as follows
$\quad$ - If fallbackModeTriggered is equal to 1, the following applies:
$\quad\quad\quad$ xPosCb = ( cbWidth >> 1 ) $\quad\quad$ (8-689)
$\quad\quad\quad$ yPosCb = ( cbHeight >> 1 ) $\quad\quad$ (8-690)
$\quad$ - Otherwise (fallbackModeTriggered is equal to 0), the following applies:
$\quad\quad\quad$ xPosCb = 2 + ( xSbIdx << 2 ) $\quad\quad$ (8-691)
$\quad\quad\quad$ yPosCb = 2 + ( ySbIdx << 2 ) $\quad\quad$ (8-692)
- The luma motion vector mvLX[ xSbIdx ][ ySbIdx ] is derived as follows:
$\quad\quad$ mvLX[ xSbIdx ][ ySbIdx ][ 0 ] = ( mvScaleHor + dHorX * xPosCb + dHorY * yPosCb ) $\quad\quad$ (8-693)
$\quad\quad$ mvLX[ xSbIdx ][ ySbIdx ][ 1 ] = ( mvScaleVer + dVerX * xPosCb + dVerY * yPosCb ) $\quad\quad$ (8-694)
- The rounding process for motion vectors as specified in clause 8.5.2.14 is invoked with mvX set
$\quad$ equal to mvLX[ xSbIdx ][ ySbIdx ], rightshift set equal to 7, and leftShift set equal to 0 as inputs
$\quad$ and the rounded mvLX[ xSbIdx ][ ySbIdx ] as output.
- The motion vectors mvLX[ xSbIdx ][ ySbIdx ] are dipped as follows:
$\quad\quad$ mvLX[ xSbIdx ][ ySbIdx ][ 0 ] = Clip3( −2$^{17}$, 2$^{17}$ − 1, mvLX[ xSbIdx ][ ySMdx ][ 0 ] ) $\quad\quad$ (8-695)
$\quad\quad$ mvLX[ xSbIdx ][ ySbIdx ][ 1 ] = Clip3( −2$^{17}$, 2$^{17}$ − 1, mvLX[ xSbIdx ][ ySbIdx ][ 1 ] ) $\quad\quad$ (8-696)
For xSbIdx = 0..numSbX − 1 and ySbIdx = 0..numSbV − 1, the following applies:
- The average luma motion vector mvAvgLX is derived as follows:
$\quad\quad$ mvAvgLX = mvLX[ ( xSbIdx >> 1 << 1) ][ (ySbIdx >>1<< 1) ] + $\quad\quad$ (8-697)
$\quad\quad\quad$ mvLX[ ( xSbIdx >> 1 << 1 ) + 1 ][ (ySbIdx >>1<<1) + 1 ]
$\quad\quad$ mvAvgLX[ 0 ] = ( mvAvgLX[ 0 ] + 1 − ( mvAvgLX[ 0 ] >= 0 ) ) >> 1 $\quad\quad$ (8-698)
$\quad\quad$ mvAvgLX[ 1 ] = ( mvAvgLX[ 1 ] + 1 − ( mvAvgLX[ 1 ] >= 0 ) ) >> 1 $\quad\quad$ (8-699)
- The derivation process for chroma motion vectors in clause 8.5.2.13 is invoked with mvAvgLX
$\quad$ and refIdxLX as inputs, and the chroma motion vector mvCLX[ xSbIdx ][ ySbIdx ] as output.
$\quad$ [Ed. (BB): This way four 2×2 chroma subblocks (4×4 chroma block) share the same motion
$\quad$ vector which is derived from the average of two 4×4 luma subblock motion vectors. In the
$\quad$ decoding process motion compensation is still performed on 2×2 chroma blocks which is
$\quad$ however a motion compensation on a chroma 4×4 block because all chroma MVs inside a
$\quad$ 4×4 chroma block are the same. I would prefer an editorial change that makes it more clear
$\quad$ that affine chroma MC is performed on 4×4 chroma blocks.]
- The variable cbProfFlag is derived as follows:
$\quad$ - If one or more of the following conditions are true, cbPrafFlag is set equal to FALSE.
$\quad\quad$ - affine_prof_enabled_flag is equal to 1.
$\quad\quad$ - fallbackModeTriggered is equal to 1.
$\quad\quad$ - cpMvLX[ 1 ][ 0 ] is equal to cpMvLX[ 0 ][ 0 ] and cpMvLX[ 1 ][ 1 ] is equal to
$\quad\quad\quad$ cpMvLX[ 0 ][ 1 ] and cpMvLX[ 2 ][ 0 ] is equal to cpMvLX[ 0 ][ 0 ] and
$\quad\quad\quad$ cpMvLX[ 2 ][ 1 ] is equal to cpMvLX[ 0 ][ 1 ].
$\quad\quad$ - cu_transquant_bypass_flag is equal to 1
$\quad$ - Otherwise, cbProfFlag set equal to TRUE.
If cbProfFlag is 1, the motion vector difference array diffMv is derived as follows:
- The variables sbWidth and sbHeight are derived as follows:
$\quad\quad$ sbWidth = cbWidth/numSbX
$\quad\quad$ sbHeight = cbHeight/numSbY
- The variable shift1 is set to equal to Max (6, bitDepth − 6).
- The variable dmvLimit is set to equal to 1 << shift1.
- The variable posOffsetX and posOffsetY is derrived as follows:
$\quad\quad$ posOffsetX = 6 * dHorX + 6 * dVerX
$\quad\quad$ posOffsetY = 6 * dHorY + 6 * dVerY

TABLE 37-continued 8.5.5.9 Derivation process for motion vector arrays from affine control point motion vectors

- For x = 0..sbWidth − 1 and y = 0..sbHeight − 1, the following applies:
    - The following applies:
        diffMv[ x ][ y ][ 0 ] = x * ( dHorX << 2 ) + y * ( dVerX << 2 ) − posOffsetX
        diffMv[ x ][ y ][ 1 ] = x * ( dHorY << 2 ) + y * ( dVerY << 2 ) − posOffsetY
    - For i = 0..1, the following applieis:
        - The rounding process for motion vectors as specified in clause 8.5.2.14 is invoked
          with mvX set equal to diffMv[ x ][ y ][ i ], rightShift set equal to 7, and leftShift set
          equal to 0 as inputs and the rounded diffMv as output.
        - diffMv[ x ][ y ][ i ] is clipped as followings:
          diffMv[ x ][ y ][ i ] = Clip3( −dmvLimit, dmvLimit − 1, diffMv[ x ][ y ][ i ])

TABLE 38

8.5.6 Decoding process for inter blocks
8.5.6.1 General

This process is invoked when decoding a coding unit coded in inter prediction mode.
Inputs to this process are:
- a luma location ( xCb, yCb ) specifying the top-left sample of the current coding block relative
  to the top-left luma sample of the current picture,
  a variable cbWidth specifying the width of the current coding block in luma samples,
- a variable cbHeight specifying the height of the current coding block in luma samples,
- variables numSbX and numSbY specifying the number of luma coding subblocks in horizontal
  and vertical direction,
- the motion vectors mvL0[ xSbIdx ][ ySbIdx ] and mvL1[ xSbIdx ][ ySbIdx ] with
  xSbIdx = 0 .. numSbX − 1, and ySbIdx = 0 .. numSbY − 1,
- the refined motion vectors refMvL0[ xSbIdx ][ ySbIdx ] and refMvL1[ xSbIdx ][ ySbIdx ] with
  xSbIdx = 0 .. numSbX − 1, and ySbIdx = 0 .. numSbY − 1,
- the reference indices refIdxL0 and refIdxL1,
- the prediction list utilization flags predFlagL0[ xSbIdx ][ ySbIdx ] and
  predFlagL1[ xSbIdx ][ ySbIdx ] with xSbIdx = 0 .. numSbX − 1, and ySbIdx = 0 .. numSbY − 1,
- the bi-prediction weight index bcwIdx.
- a variable cIdx specifying the colour component index of the current block.
- the prediction refinement utilization flag cbProfFlag.
- a motion vector difference array diffMv.
Outputs of this process are:
- an array predSamples of prediction samples.
Let predSamplesL0$_L$, predSamplesL1$_L$ and predSamplesIntra$_L$ be (cbWidth)×(cbHeight) arrays of
predicted luma sample values and, predSamplesL0$_{Cb}$, predSamplesL1$_{Cb}$, predSamplesL0$_{Cr}$, and
predSamplesL1$_{Cr}$, predSamplesIntra$_{Cb}$, and predSamplestIntra$_{Cr}$ be (cbWidth / 2)×(cbHeight / 2) arrays
of predicted chroma sample values.
- The variable currPic specifies the current picture and the variable bdofFlag is derived as follows:
    - If all of the following conditions are true, bdofFlag is set equal to TRUE.
        - sps_bdof_enabled_flag is equal to 1.
        - predFlagL0[ xSbIdx ][ ySbIdx ] and predFlagL1[ xSbIdx ][ ySbIdx ] are both equal to 1.
        - DiffPicOrderCnt( currPic, RefPicList[ 0 ][ refIdxL0 ] ) *
          DiffPicOrderCnt( currPic, RefPicList[ 1 ][ refIdxL1 ] ) is less than 0.
        - MotionModelIdc[ xCb ][ yCb ] is equal to 0.
        - merge_subblock_flag[ xCb ][ yCb ] is equal to 0.
        - sym_mvd_flag[ xCb ][ yCb ] is equal to 0.
        - BcwIdx[ xCb ][ yCb ] is equal to 0.
        - luma_weight_l0_flag[ refIdxL0 ] and luma_weight_l1_flag[ refIdxL1 ] are both equal to 0.
        - cbHeight is greater than or equal to 8
        - cIdx is equal to 0.
    - Otherwise, bdofFlag is set equal to FALSE.
- If numSbY is equal to 1 and numSbX is equal to 1 the following applies:
    - When bdofFlag is equal to TRUE, the variables numSbY, numSbX are modified as follows:
        numSbX = ( cbWidth > 16 ) ? ( cbWidth >> 4 ) : 1                      (8-700)
        numSbY = ( cbHeight > 16 ) ? ( cbHeight >> 4 ) : 1                    (8-701)
    - For X = 0..1, xSbIdx = 0..numSbX − 1 and ySbIdx = 0..numSbY − 1, the following applies:
        - predFlagLX[ xSbIdx ][ ySbIdx ] is set equal to predFlagLX[ 0 ][ 0 ].
        - refMvLX[ xSbIdx ][ ySbIdx ] Is set equal to refMvLX[ 0 ][ 0 ].
        - mvLX[ xSbIdx ][ ySbIdx ] is set equal to mvLX[ 0 ][ 0 ].
The width and the height of the current coding subblock sbWidth, sbHeight in luma samples are
derived as follows:
    sbWidth = cbWidth / numSbX                                                (8-702)
    sbHeight = cbHeight / numSbY                                              (8-703)
For each coding subblock at subblock index ( xSbIdx, ySbIdx ) with xSbIdx = 0 .. numSbX − 1, and
ySbIdx = 0 .. numSbY − 1, the following applies:
- The luma location ( xSb, ySb ) specifying the top-left sample of the current coding subblock
  relative to the top-left luma sample of the current picture is derived as follows:
    ( xSb, ySb ) = ( xCb + xSbIdx * sbWidth, yCb + ySbIdx * sbHeight )        (8-704)

TABLE 38-continued 8.5.6 Decoding process for inter blocks
8.5.6.1 General

- For X being each of 0 and 1, when predFlagLX[ xSbIdx ][ ySbIdx ] is equal to 1, the following applies:
  - The reference picture consisting of an ordered two-dimensional array refPicLX$_L$ of luma samples and two ordered two-dimensional arrays refPicLX$_{Cb}$ and refPicLX$_{Cr}$ of chroma samples is derived by invoking the process specified in clause 8.5.6.2 with X and refIdxLX as inputs.
  - The motion vector offset mvOffset is set equal to refMvLX[ xSbIdx ][ xSbIdx ] − mvLX[ xSbIdx ][ ySbIdx ].
  - When one or more of the following conditions is true, mvOffset[ 0 ] is set equal to 0:
    - xSb is not equal to xCb and mvOffset[ 0 ] is less than 0
    - ( xSb + sbWidth ) is not equal to ( xCb + cbWidth ) and mvOffset[ 0 ] is greater than 0
  - When one or more of the following conditions is true, mvOffset[ 1 ] is set equal to 0:
    - ySb is not equal to yCb and mvOffset[ 1 ] is less than 0
    - ( ySb + sbHeight ) is not equal to ( yCb + cbHeight ) and mvOffset[ 1 ] is greater than 0
  - If cIdx is equal to 0, the following applies:
    - The array predSamplesLX$_L$ is derived by invoking the fractional sample interpolation process specified in clause 8.5.6.3 with the luma location ( xSb, ySb ), the coding subblock width sbWidth, the coding subblock height sbHeight in luma samples, the luma motion vector offset mvOffset, the refined luma motion vector refMvLX[ xSbIdx ][ xSbIdx ] the reference array refPicLX$_L$, bdofFlag, and cIdx as inputs.
    - If cbProfFlag is equal to 1, prediction refinement with optical flow process specified in clause 8.5.6.7 is invoked with sbWidth, sbHeight, predSamplesLX$_L$ and motion vector difference array diffMv as inputs and refined predSamplesLX$_L$ as outputs.
  - Otherwise if cIdx is equal to 1, the following applies:
    - The array predSamplesLX$_{Cb}$ is derived by invoking the fractional sample interpolation process specified in clause 8.5.6.3 with the luma location ( xSb, ySb ), the coding subblock width sbWidth / 2, the coding subblock height SbHeight / 2, the chroma motion vector offset mvOffset, the refined chroma motion vector refMvLX[ xSbIdx ][ xSbIdx ], the reference array refPicLX$_{Cb}$, bdofFlag, and cIdx as inputs.
  - Otherwise (cIdx is equal to 2), the following applies:
    - The array predSamplasLX$_{Cr}$ is derived by invoking the fractional sample interpolation process specified in clause 8.5.6.3 with the luma location ( xSb, ySb ), the coding subblock width sbWidth / 2, the coding subblock height sbHeight / 2, the chroma motion vector offset mvOffset, the refined chroma motion vector refMvLX[ xSbIdx ][ xSbIdx ], the reference array refPicLX$_{Cr}$, bdofFlag, and cIdx as inputs.
  If bdofFlag is equal to TRUE, the following applies:
  - The variable shift is set equal to Max( 2, 14 − BitDepth$_y$ ).
  - The variables sbDiffThres, bdofBlkDiffThres, and bdofSumDiff are derived as follows:

sbDiffThres = ( 1 << ( BitDepth$_y$ − 8 + shift ) ) * sbWidth*sbHeight     (8-705)

bdofBlkDiffThres = 1 << ( BitDepth$_y$ − 3 + shift )     (8-706)

sbSumDiff = 0     (8-707)
  - For xIdx = 0..(sbWidth >> 2 ) − 1 and yIdx = 0..( sbHeight >> 2 ) − 1, the variables bdofBlkSumDiff and the bidirectional optical flow utilization flag bdofUtilizationFlag[ xIdx ][ yIdx ] are derived as follows:

bdofBlkSumDiff = $\Sigma_{i=0}^{3} \Sigma_{j=0}^{3}$ Abs( predSamplesL0$_L$[ ( xId x << 2 ) + 1 + i ][ ( yIdx << 2 ) + 1 + j ] − predSamplesL1$_L$[ ( xIdx << 2 ) + 1 + i ][ ( yIdx << 2 ) + 1 + j] )     (8-708)

bdofUtilizationFlag[ xIdx ][ yIdx ] = bdofBlkSumDiff >= bdofBlkDiffThres     (8-709)

sbSumDiff += bdofBlkSumDiff     (8-710)
  - The variable sbBdofFlag is derived as follows:
    - If sbSumDiff is less than sbDiffThres, sbBdofFlag is set equal to FALSE.
    - Otherwise, sbBdofFlag set equal to TRUE.
- The array predSamples of prediction samples Is derived as follows:
  - If cIdx is equal to 0, the prediction samples inside the current luma coding subblock, predSamples[ x$_L$ + xSb ][ y$_L$ + ySb ] with x$_L$ = 0..sbWidth − 1 and y$_L$ = 0..sbHeight − 1, are derived as follows:
    - If sbBdofFlag is equal to TRUE, the bidirectional optical flow sample prediction process as specified in clause 8.5.6.4 is invoked with nCbW set equal to the luma coding subblock width sbWidth, nCbH set equal to the luma coding subblock height sbHeight and the sample arrays predSamplesL0$_L$ and predSamplesL1$_L$, and the variables predFlagL0[ xSbIdx ][ ySbIdx ], predFlagL1[ xSbIdx ][ ySbIdx ], refIdxL0, refIdxL1 and bdofUtilizationFlag[ xIdx ][ yIdx ]     with     xIdx = 0..( sbWidth >> 2 ) − 1, yIdx = 0..( sbHeight >> 2 ) − 1 as inputs, and predSamples[ x$_L$ + xSb ][ y$_L$ + ySb ] as outputs.
    - Otherwise (sbBdofFlag is equal to FALSE), the weighted sample prediction process as specified in clause 8.5.6.5 is invoked with the luma coding subblock width sbWidth the luma coding subblock height sbHeight and the sample arrays predSamplesL0$_L$ and predSamplesL1$_L$, and the variables predFlagL0[ xSbIdx ][ ySbIdx ], predFlagL1[ xSbIdx ][ ySbIdx ], refIdxL0, refIdxL1, bcwIdx, and cIdx as inputs, and predSamples[ x$_L$ + xSb ][ y$_L$ + ySb ] as outputs.
  - Otherwise, if cIdx is equal to 1, the prediction samples inside the current chroma component Cb coding subblock, predSamples[ x$_C$ + xSb / 2 ][ y$_C$ + ySb / 2 ] with x$_C$ = 0..sbWidth / 2 − 1 and y$_c$ = 0..sbHeight / 2 − 1, are derived by invoking the weighted sample prediction process specified in clause 8.5.6.5 with nCbW set equal to sbWidth / 2, nCbH set equal to sbHeight / 2, the sample arrays predSamplesL0$_{Cb}$ and predSamplesL1$_{Cb}$, and the variables

TABLE 38-continued

8.5.6 Decoding process for inter blocks
8.5.6.1 General predFlagL0[ xSbIdx ][ ySbIdx ], predFlagL1[ xSbIdx ][ ySbIdx ], refIdxL0, refIdxL1, bcwIdx, and cIdx as inputs.

- Otherwise (cIdx is equal to 2), the prediction samples inside the current chroma component Cr coding subblock, predSamples[ $x_C$ + xSb / 2 ][ $y_C$ + ySb / 2 ] with $x_C$ = 0..sbWidth / 2 − 1 and $y_C$ = 0..sbHeight / 2 − 1, are derived by invoking the weighted sample prediction process specified in clause 8.5.6.5 with nCbW set equal to sbWidth / 2, nCbH set equal to sbHeight / 2, the sample arrays predSamplesL0$_{Cr}$ and predSamplesL1$_{Cr}$, and the variables predFlagL0[ xSbIdx ][ ySbIdx ], predFlagL1[ xSbIdx ][ ySbIdx ], refIdxL0, refIdxL1, bcwIdx, and cIdx as inputs.

- When cIdx is equal to 0, the following assignments are made for x = 0..sbWidth − 1 and y = 0..sbHeight − 1:

MvL0[ xSb + x ][ ySb + y ] = mvL0[ xSbIdx ][ ySbIdx ]     (8-711)
    MvL1[ xSb + x ][ ySb+ y ] = mvL1[ xSbIdx ][ ySbIdx ]     (8-712)
    MvDmvrL0[ xSb + x ][ ySb + y ] = refMvL0[ xSbIdx ][ ySbIdx ]     (8-713)
    MvDmvrL1[ xSb + x ][ ySb + y ] = refMvL1[ xSbIdx ][ ySbIdx ]     (8-714)
    RefIdxL0[ xSb + x ][ ySb + y ] = refIdxL0     (8-715)
    RefIdxL1[ xSb + x ][ ySb + y ] = refIdxL1     (8-715)
    PredFlagL0[ xSb + x ][ ySb + y ] = predFlagL0[ xSbIdx ][ ySbIdx ]     (8-717)
    PredFlagL1[ xSb + x ][ ySb + y ] = predFlagL1[ xSbIdx ][ ySbIdx ]     (8-718)
    BcwIdx[ xSb + x ][ ySb + y ] = bcwIdx     (8-719)

When clip_flag[ xCb ][ yCb ] is equal to 1, the array predSamples of prediction samples is modifed as follows:
- If cIdx is equal to 0, the following applies:
    - The general intra sample prediction process as specified in clause 8.4.5.2.5 is invoked with the location ( xTbCmp, yTbCmp ) set equal to ( xCb, yCb ), the intra prediction mode predModeIntra set equal to IntraPredModeY[ xCb ][ yCb ], the transform block width nTbW and height nTbH set equal to cbWidth and cbHeight, the coding block width nCbW and height nCbH set equal to cbWidth and cbHeight and the variable cIdx as inputs, and the output is assigned to the (cbWidth)×(cbHeight) array predSamplesIntra$_L$.
    - The weighted sample prediction process for combined merge and intra prediction as specified in clause 8.5.6.6 is invoked with the location ( xTbCmp, yTbCmp ) set equal to ( xCb, yCb ), the coding block width cbWidth, the coding block height cbHeight, the sample arrays predSamplesInter and predSamplesIntra set equal to predSamples and predSamplesIntra$_L$, respectively, the intra prediction mode predModeIntra set equal to IntraPredModeY[ xCb ][ yCb ], and the colour component index cIdx as inputs, and the output is assigend to the (cbWidth)×(cbHeight) array predSamples.
- Otherwise, if cIdx is equal to 1, the following applies:
    - The general intra sample prediction process as specified in clause 8.4.5.2.5 is invoked with the location ( xTbCmp, yTbCmp ) set equal to ( xCb / 2, yCb / 2 ), the intra prediction mode predModeIntra set equal to IntraPredModeY[ xCb ][ yCb ] the transform block width nTbW and height nTbH set equal to cbWidth / 2 and cbHeight / 2, the coding block width nCbW and height nCbH set equal to cbWidth / 2 and cbHeight / 2 and the variable cIdx as inputs, and the output is assigned to the (cbWidth / 2)×(cbHeight / 2) array predSamplesIntra$_{Cb}$.
    - The weighted sample prediction process for combined merge and intra prediction as specified in clause 8.5.6.6 is invoked with the location ( xTbCmp, yTbCmp ) set equal to ( xCb, yCb ), the coding block width cbWidth / 2, the coding block height cbHeight / 2, the sample arrays predSamplesInter and predSamplesIntra set equal to predSamples$_{Cb}$ and predSamplesIntra$_{Cb}$, respectively, the intra prediction mode predModeIntra set equal to IntraPredModeY[ xCb ][ yCb ], and the colour component index cIdx as inputs, and the output is assigend to the (cbWidth / 2)×(cbHeight / 2) array predSamples.
- Otherwise (cIdx is equal to 2), the following applies:
    - The general intra sample prediction process as specified in clause 8.4.5.2.5 is invoked with the location ( xTbCmp, yTbCmp ) set equal to ( xCb / 2, yCb / 2 ), the intra prediction mode predModeIntra set equal to IntraPredModeY[ xCb ][ yCb ] the transform block width nTbW and height nTbH set equal to cbWidth / 2 and cbHeight / 2, the coding block width nCbW and height nCbH set equal to cbWidth / 2 and cbHeight / 2, and the variable cIdx as inputs, and the output is assigned to the (cbWidth / 2)×(cbHeight / 2) array predSamplesIntra$_{Cr}$.

The weighted sample prediction process for combined merge and intra prediction as specified in clause 8.5.6.6 is invoked with the location ( xTbCmp, yTbCmp ) set equal to ( xCb, yCb ), the coding block width cbWidth / 2, the coding block height cbHeight / 2, the sample arrays predSamplesInter and predSamplesIntra set equal to predSamples$_{Cr}$ and predSamplesIntra$_{Cr}$, respectively, the intra prediction mode predModeIntra sot equal to IntraPredModeY[ xCb ][ yCb ] and the colour component index cIdx as inputs, and the output is assigend to the (cbWidth / 2)×(cbHeight / 2) array predSamples.

TABLE 39

8.5.6.3 Fractional sample interpolation process
8.5.6.3.1 General

Inputs to this process are:
- a luma location ( xSb, ySb ) specifying the top-left sample of the current coding subblock relative to the top-left luma sample of the current picture,
- a variable sbWidth specifying the width of the current coding subblock, TABLE 39-continued 8.5.6.3 Fractional sample interpolation process
8.5.6.3.1 General

- a variable sbHeight specifying the height of the current coding subblock,
- a motion vector offset mvOffset,
- a refined motion vector refMvLX,
- the selected reference picture sample array refPicLX,
- the bidirectional optical flow flag bdofFlag,
- a variable cIdx specifying the colour component index of the current block.

Outputs of this process are:
- an (sbWidth + borderExtension)×(sbHeight + borderExtension) array predSamplesLX of prediction sample values.

The prediction block border extension borderExtension is derived as follows:

borderExtension = ( bdofFlag || inter_affine_flag[xSb][ySb] ) ? 2 : 0    (8-720)

- If cIdx is equal to 0, the following applies:
  - Let ( xIntL, yIntL ) be a luma location given in full-sample units and ( xFracL, yFracL ) be an offset given in 1/16-sample units. These variables are used only in this clause for specifying fractional-sample locations inside the reference sample arrays refPicLX.
  - For each luma sample location
    ( $x_L$ = 0..sbWidth − 1 +borderExtension, $y_L$ = 0..sbHeight − 1 +borderExtension) inside the prediction luma sample array predSamplesLX, the corresponding prediction luma sample value predSamplesLX[ $x_L$ ][ $y_L$ ] is derived as follows:
    - The variables xInt$_L$, yInt$_L$, xFrac$_L$, and yFrac$_L$ are derived as follows:

xInt$_L$ = xSb + ( refMvLX[ 0 ] >> 4 ) + $x_L$    (8-721)
      yInt$_L$ = ySb + ( refMvLX[ 1 ] >> 4 ) + $y_L$    (8-722)
      xFrac$_L$ = refMvLX[ 0 ] & 15    (8-723)
      yFrac$_L$ = refMvLX[ 1 ] & 15    (8-724)

- If bdofFlag is equal to TRUE and one or more of the following conditions are true, the prediction luma sample value predSamplesLX[ $x_L$ ][ $y_L$ ] is derived by invoking the luma integer sample fetching process as specified in clause 8.5.6.3.3 with ( xInt$_L$, yInt$_L$ ) and refPicLX as inputs:
    - $x_L$ is equal to 0.
    - $x_L$ is equal to sbWidth + 1.
    - $y_L$ is equal to 0.
    - $y_L$ is equal to sbHeight + 1.
  - Otherwise, if inter_affine_flag[ xSb ][ ySb ] is equal to TRUE and one or more of the following conditions are true, the prediction luma sample value predSamplesLX[ $x_L$ ][ $y_L$ ] is derived by invoking the luma integer sample fetching process as specified in clause 8.5.6.3.3 with ( xIntRounded$_L$, yIntRounded$_L$ ) and refPicLX as inputs.
    - $x_L$ is equal to 0.
    - $x_L$ is equal to sbWidth + 1.
    - $y_L$ is equal to 0.
    - $y_L$ is equal to sbHeight + 1.

xIntRounded$_L$ and yIntRounded$_L$ are derived as following:
      xIntRounded$_L$ = xInt$_L$ + ( xFrac$_L$ >> 3 )
      yIntRounded$_L$ = yInt$_L$ + ( yFrac$_L$ >> 3 )

- Otherwise, the following applies:
    - The motion vector mvLX is set equal to ( refMvLX − mvOffset ).
    - The list padVal[ dir ] is derived as follows for dir = 0..1:
      - The variable disp is derived as follows:
        disp = ( refMvLX[ dir ] >> 4) − ( mvLX[ dir ] >> 4) + ( dir = = 0 ? $x_L$ : $y_L$) (8-725)
      - If disp is less than 0, padVal[ dir ] is set equal to disp.
      - Otherwise, if disp is greater than ( dir = = 0 ? sbWidth : sbHeight ) − 1, padVal[ dir ] is set equal to disp − ( ( dir = = 0 ? sbWidth : sbHeight ) − 1).
      - Otherwise, padVal[ dir ] is set equal to 0.
    - The prediction luma sample value predSamplesLX[ xL ][ yL ] is derived by invoking the luma sample 8-tap interpolation filtering process as specified in clause 8.5.6.3.2 with ( xIntL, yIntL ), ( xFracL, yFracL ), refPicLX, sbWidth, sbHeight, ( xSb, ySb ) and padVal as inputs.

- Otherwise (cIdx is not equal to 0), the following applies:
  - Let ( xIntC, yIntC ) be a chroma location given in full-sample units and ( xFracC, yFracC ) be an offset given in 1/32 sample units. These variables are used only in this clause for specifying general fractional-sample locations inside the reference sample arrays refPicLX.
  - For each chroma sample location ( xC = 0..sbWidth − 1, yC = 0.. sbHeight − 1 ) inside the prediction chroma sample arrays predSamplesLX, the corresponding prediction chroma sample value predSamplesLX[ xC ][ yC ] is derived as follows:
    - The variables xInt$_C$, yInt$_C$, xFrac$_C$ and yFrac$_C$ are derived as follows: [Ed. (SL): Shall we make it consistent: /2 or /SubWidthC and /SubHeightC?]

xInt$_C$ = ( xSb / SubWidthC ) + ( mvLX[ 0 ] >> 5 ) + $x_C$    (8-726)
      yInt$_C$ = ( ySb / SubHeightC ) + ( mvLX[ 1 ] >> 5 ) + $y_C$    (8-727)
      xFrac$_C$ = mvLX[ 0 ] & 31    (8-728)
      yFrac$_C$ = mvLX[ 1 ] & 31    (8-729)

- The motion vector mvLX is set equal to ( refMvLX − mvOffset ).
  - The list padVal[ dir ] is derived as follows for dir = 0..1:
    - The variable disp is derived as follows:
      disp = ( refMvLX[ dir ] >> 4) − ( mvLX[ dir ] >> 4) + (dir = = 0 ? $x_C$ : $y_C$)    (8-730)
    - If disp is less than 0, padVal[ dir ] is set equal to disp.
    - Otherwise, if disp is greater than
      ( dir = = 0 ? sbWidth / SubWidthC : sbHeight / SubHeightC ) − 1, padVal[ dir ] is set equal to disp − ( ( dir = = 0 ? sbWidth / SubWidthC : sbHeight / SubHeightC ) − 1).

TABLE 39-continued

8.5.6.3 Fractional sample interpolation process
8.5.6.3.1 General

- Otherwise, padVal[ dir ] is set equal to 0.
  The prediction sample value predSamplesLX[ xC ][ yC ] is derived by invoking the
  process specified in clause 8.5.6.3.4 with ( xIntC, yIntC ), ( xFracC, yFracC ), refPicLX, and
  padVal as inputs.

TABLE 40

8.5.6.7 Prediction refinement with optical flow process

Inputs to this process are:
- two variables sbWidth and sbHeight specifying the width and the height of the current subblock,
- one (sbWidth + borderExtension) × (sbHeight + borderExtension) prediction sample arrays.
  predSamples
- one (sbWidth × sbHeight) motion vector difference array, diffMv
Output of this process is the (sbWidth)×(sbHeight) array pbSamples of prediction sample values.
Variables bitDepth and shift1 are derived as follows:
- The variable shift1 is set equal to Max( 6, bitDepth − 6 ).
- The variable dILimit is set equal to 1 << ( 14 − 1 ).
For x =0.. sbWidth − 1, y =0.. sbHeight − 1, the following ordered steps apply:
  - The variables gradientH[ x ][ y ] and gradientV[ x ][ y ] are derived as follows:
    gradientH[ x ][ y ] = ( predSamples[ x + 2 ][ y ] − predSamples[ x ][ y ] ) >> shift1
    gradientV[ x ][ y ] = ( predSamples[ x ][ y + 2 ] − predSamples[ x ][ y ] ) >> shift1
  - The variable dI is derived as follows:
    dI = gradientH[ x ][ y ] * diffMv[ x ][ y ][ 0 ] + gradientV[ x ][ y ] * diffMv[ x ][ y ][ 1 ]
  - Prediction sample value at location ( x, y ) in the subblock is derived as follows:
    pbSamples[ x ][ y ] = predSamples[ x + 1 ][ y + 1 ] + Clip3( −dILimit, dILimit − 1, ( dI + 1 ) >> 1 ) )

Referring to Tables 35 to 40, when cu_transquant_bypass_flag is 1, the value of the flag cbProfFlag indicating whether or not PROF is applied may be set to 0. Accordingly, when cu_transquant_bypass_flag is 1, PROF may not be applicable to the current block.

Figure 11:
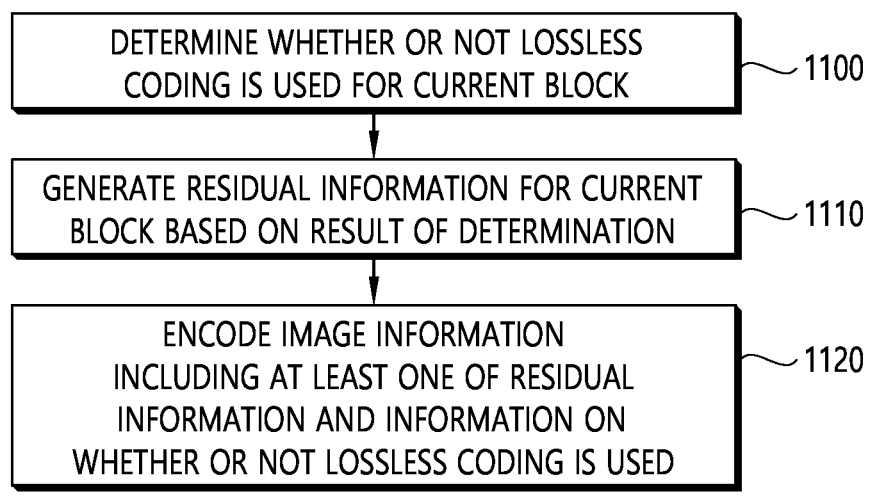
FIGS. 11 and 12 schematically represent an example of a video/image encoding method and associated components according to the embodiment(s) of this document.
Figure 12:
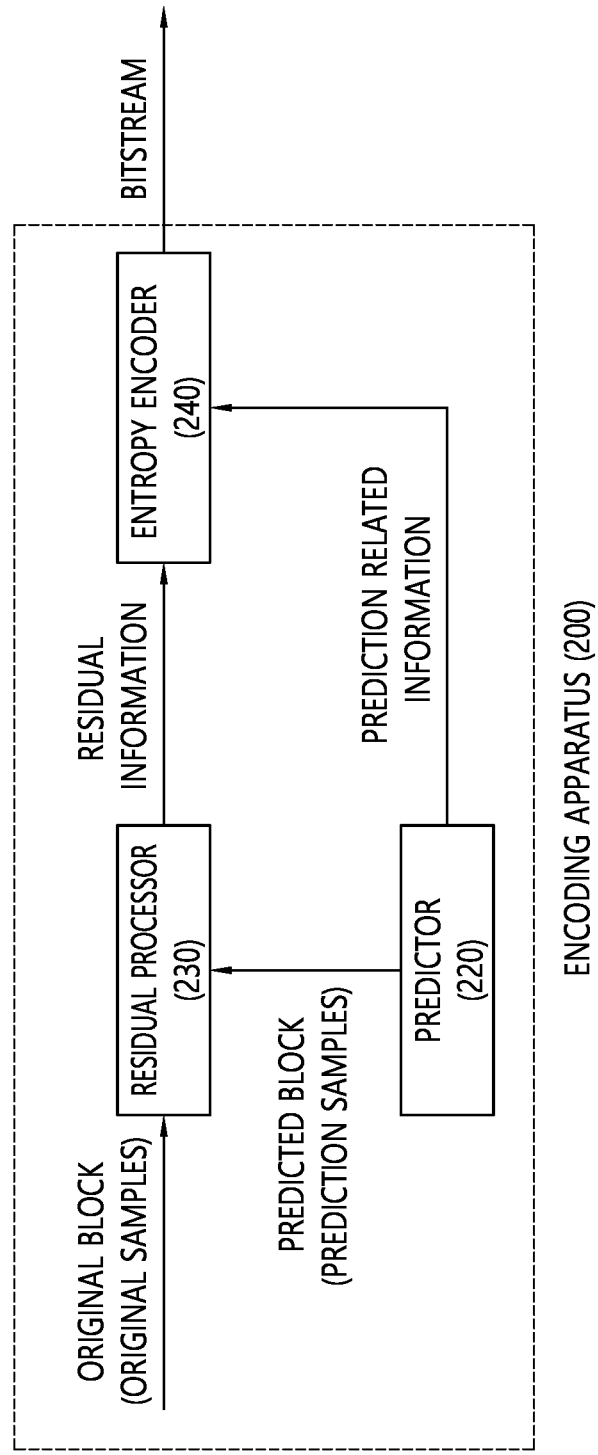

FIGS. 11 and 12 schematically represent an example of a video/image encoding method and associated components according to the embodiment(s) of this document.

The method disclosed in FIG. 11 may be performed by the encoding apparatus disclosed in FIG. 2 or 12. Specifically, for example, S1100 to S1110 of FIG. 11 may be performed by the residual processor 230 of the encoding apparatus 200 of FIG. 12, and S1120 of FIG. 11 may be performed by the entropy encoder 240 of the encoding apparatus 200 of FIG. 12. In addition, although not shown, the process of deriving a prediction sample may be performed by the predictor 220 of the encoding apparatus 200; the process of generating a reconstructed sample and a reconstructed picture for the current block based on the residual sample and the prediction sample for the current block may be performed by the adder 250 of the encoding apparatus 200; and the process of encoding the prediction information for the current block may be performed by an entropy encoder of the encoding apparatus. The method disclosed in FIG. 11 may include the embodiments described above in this document.

Referring to FIG. 11, the encoding apparatus may determine whether or not lossless coding is used for the current block (S1100). In the lossless coding, processing that may cause information loss in an image coding system may be modified and/or bypassed. For example, at least one of (inverse) transform and/or (de)quantization, which are coding techniques that cause information loss, may not be applied. Alternatively, lossless coding may mean coding to which at least one of (inverse) transform nor (de)quantization is not applied when coding residual information.

That is, the encoding apparatus may determine whether or not (inverse) transform and/or (de)quantization is applied to the current block. The encoding apparatus may determine whether or not (inverse) transform and/or (de)quantization is applied to the residual sample of the current block.

The encoding apparatus may generate residual information for the current block based on the determination result (S1110). For example, the encoding apparatus may determine whether to perform inter prediction or intra prediction on a current block, and may determine specific inter prediction mode or specific intra prediction mode based on RD cost. According to the determined mode, the encoding apparatus may derive a prediction sample for the current block, and may derive the residual sample through the subtraction of the original sample and the prediction sample with respect to the current block. The encoding apparatus may generate residual information based on the derived residual sample.

For example, the encoding apparatus may determine whether or not lossless coding is used for the current block.

For example, the encoding apparatus may determine that lossless coding is used for the current block. That is, when (inverse) transform and/or (de)quantization is not applied to the residual sample, the encoding apparatus may derive the derived residual sample as the residual coefficient. In this case, for example, the encoding apparatus may generate a flag indicating that lossless coding is used for the current block.

Additionally, the encoding apparatus may determine that lossless coding is not used for the current block That is, when (inverse) transform and/or (de)quantization is applied to the residual sample, the encoding apparatus may perform (inverse) transform and/or (de)quantization on the residual sample, and derive the residual coefficient. In this case, for example, the encoding apparatus may generate a flag indicating that lossless coding is not used for the current block.

That is, the transform and quantization may not be applied to the residual samples based on the determination that the lossless coding is used, while the transform or quantization may be applied to the residual samples based on the determination that the lossless coding is not used.

For example, whether or not the lossless coding is used may be determined based on a flag indicating whether or not the lossless coding is used. A flag indicating whether or not the lossless coding is used may be signaled through a coding unit (CU) syntax. For example, the syntax element cu_transquant_bypass_flag may indicate whether or not lossless coding is used for the current block.

For example, the encoding apparatus may further generate a BDPCM flag indicating whether or not Block-based Delta Pulse Code Modulation (BDPCM) is applied to the current block, and derive residual coefficients for the current block based on the BDPCM flag and residual samples of the current block. At this time, when the value of the flag indicating whether or not the lossless coding is used is 1, the values of the residual coefficients are derived as values of the residual samples, while, when the value of the flag indicating whether or not the lossless coding is used is 0, values derived by dequantizing the residual coefficients may be derived as values of the residual samples.

The encoding apparatus may encode image information including at least one of residual information and information on whether or not lossless coding is used (S1120). For example, image information including at least one of residual information and information on whether or not lossless coding is used may be output in a bitstream by the encoding apparatus.

Additionally, for example, the image information may further include an upper flag indicating whether or not there is the flag indicating whether or not the lossless coding is used.

When the upper flag is 1, there may be a flag received through the CU syntax and indicating whether or not the lossless coding is used, while, when the upper flag is 0, there may not be a flag received through the CU syntax and indicating whether or not the lossless coding is used. For example, the upper flag may be signaled through a sequence parameter set (SPS), a picture parameter set (PPS), or general constraint information.

Meanwhile, the image information may include prediction information for the current block. The prediction information may include information on an inter prediction mode or an intra prediction mode performed on the current block. The encoding apparatus may generate and encode prediction information for the current block.

Meanwhile, the bitstream may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

Figure 13:
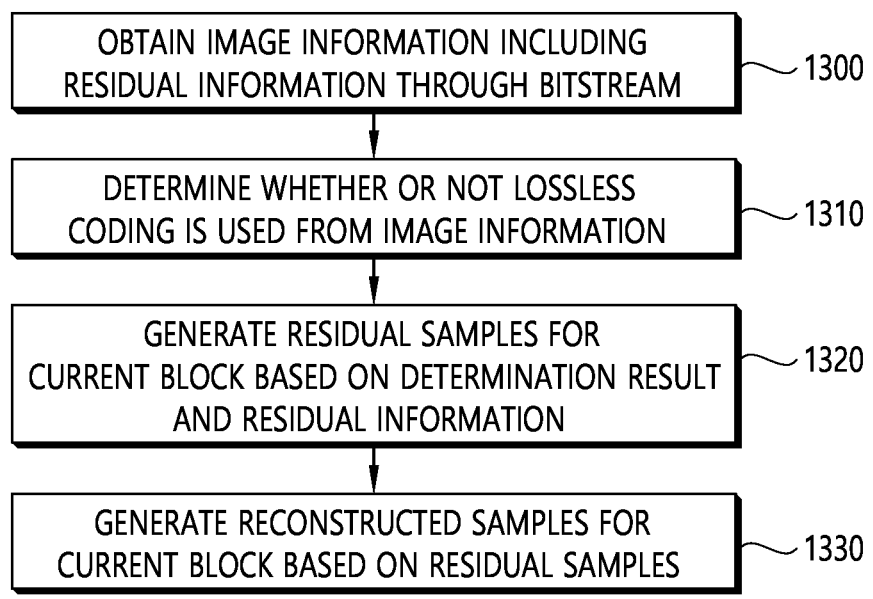
FIGS. 13 and 14 schematically represent an example of an image/video decoding method and associated components according to the embodiment(s) of this document.
Figure 14:
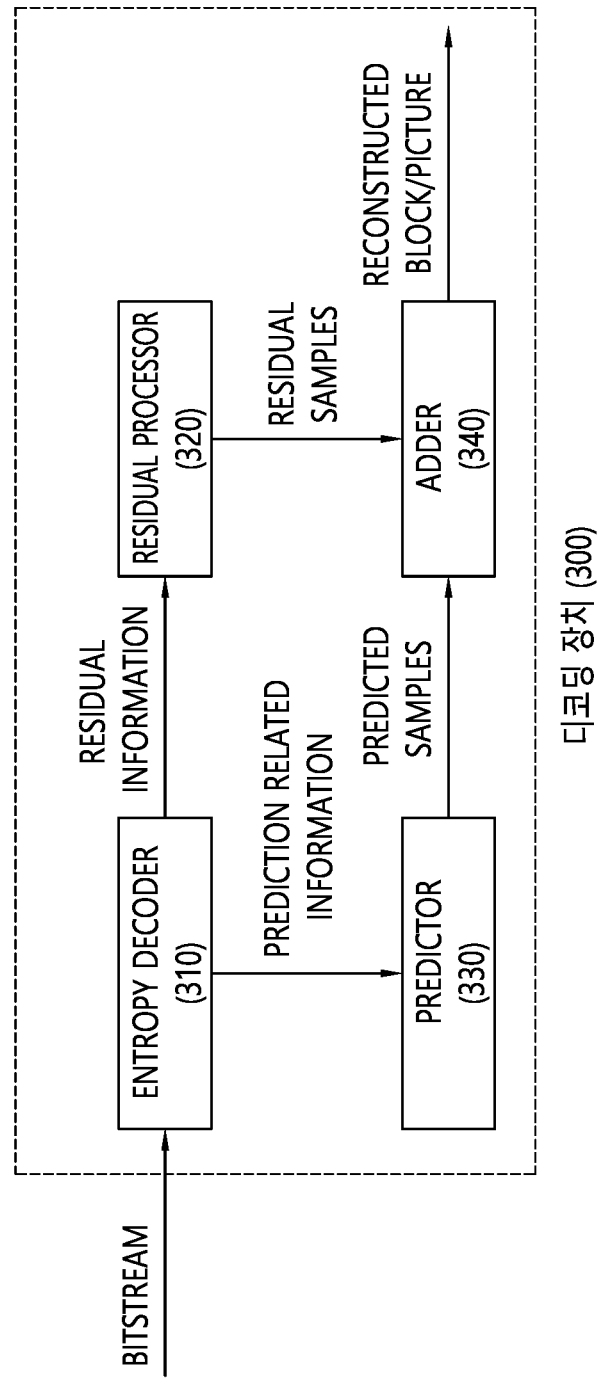

FIGS. 13 and 14 schematically represent an example of a video/image decoding method and associated components according to the embodiment(s) of this document.

The method disclosed in FIG. 13 may be performed by the decoding apparatus disclosed in FIG. 3 or 14. Specifically, for example, S1300 to S1310 of FIG. 13 may be performed by the entropy decoder 310 of the decoding apparatus 300 in FIG. 14, and S1320 of FIG. 13 may be performed by the residual processor 320 of the decoding apparatus 300 in FIG. 14. Additionally, S1330 of FIG. 13 may be performed by the adder 340 of the decoding apparatus 300 in FIG. 14. In addition, although not shown, the process of receiving prediction information for the current block may be performed by an entropy decoder of the decoding apparatus, and the process of deriving the prediction sample of the current block may be performed by the predictor of the decoding apparatus.

Referring to FIG. 13, the decoding apparatus may receive image information including residual information through a bitstream (S1300). For example, the image information may be referred to as video information. The image information may include various information according to the above-described embodiment(s) of this document. For example, the image information may include at least a part of prediction related information or residual information.

The decoding apparatus may determine whether or not lossless coding is used from the image information (S1310). For example, it may be determined whether or not to apply inverse transform and dequantization to residual coefficients for the current block based on the determination result.

The decoding apparatus may generate residual samples for the current block based on the determination result and the residual information (S1320). For example, the decoding apparatus may derive residual coefficients of the current block based on the residual information, and may derive residual samples for the current block based on the residual coefficient.

For example, inverse transform and dequantization may not be applied to the residual coefficients, based on the determination that the lossless coding is used. Alternatively, inverse transform or dequantization may be applied to the residual coefficients based on the determination that the lossless coding is not used.

For example, whether or not the lossless coding is used may be determined based on a flag indicating whether or not the lossless coding is used. Additionally, a flag indicating whether or not the lossless coding is used may be received through a coding unit (CU) syntax.

For example, the decoding apparatus may obtain a BDPCM flag indicating whether or not Block-based Delta Pulse Code Modulation (BDPCM) is applied to the current block, and may perform BDPCM based on the BDPCM flag, so that it may derive residual coefficients for the current block. For example, the decoding apparatus may generate the residual samples based on the derived residual coefficients. At this time, based on the determination that the lossless coding is used, the values of the residual coefficients may be derived as the values of the residual samples. Additionally, based on the determination that the lossless coding is not used, values derived by dequantizing the residual coefficients may be derived as values of the residual samples.

Meanwhile, the image information received by the decoding apparatus may further include an upper flag indicating whether or not there is a flag indicating whether or not the lossless coding is used. When the upper flag is 1, there may be a flag received through the CU syntax and indicating whether or not the lossless coding is used, while, when the upper flag is 0, there may not be a flag received through the CU syntax and indicating whether or not the lossless coding is used. Additionally, the upper flag may be received through a sequence parameter set (SPS), a picture parameter set (PPS), or general constraint information.

The decoding apparatus may generate reconstructed samples for the current block based on the residual samples (S1330). The decoding apparatus may generate a reconstructed block or a reconstructed picture based on the residual sample. For example, the decoding apparatus may derive a prediction sample by performing an inter prediction mode or an intra prediction mode for the current block based on prediction information received through a bitstream, and may generate the reconstructed picture through addition of the prediction sample and the residual sample.

Specifically, for example, the image information may include prediction information for the current block. The prediction information may include information on an inter prediction mode or an intra prediction mode performed on the current block.

For example, the decoding apparatus may perform inter prediction or intra prediction on the current block based on the prediction information received through the bitstream, and may derive a prediction sample of the current block. For example, the decoding apparatus may derive a prediction mode applied to the current block based on the prediction information. For example, when inter prediction is applied to the current block, the decoding apparatus may derive motion information of the current block based on the prediction information, and may derive the prediction sample of the current block based on the motion information. Additionally, for example, when intra prediction is applied to the current block, the decoding apparatus may derive a reference sample based on neighboring samples of the current block, and may derive the prediction sample of the current block based on the reference sample and the intra prediction mode of the current block. The decoding apparatus may generate the reconstructed picture through addition of the prediction sample and the residual sample.

For example, the decoding apparatus may obtain image information including all or a part of the above-described information (or syntax elements) by decoding the bitstream or encoded information. In addition, the bitstream or encoded information may be stored in a computer-readable storage medium, and may cause the above-described decoding method to be performed.

In the above-described embodiment, the methods are described based on the flowchart having a series of steps or blocks. The embodiment is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of embodiments of the present disclosure.

The foregoing methods according to this document may be implemented in a software form, and the encoding apparatus and/or decoding apparatus according to this document may be included in an apparatus for performing image processing of, for example, a TV, a computer, a smartphone, a set-top box, and a display device.

When the embodiments in this document are implemented in software, the above-described method may be implemented as a module (process, function, etc.) that performs the above-described function. The modules may be stored in a memory, and may be executed by a processor. The memory may be inside or outside the processor, and may be connected to the processor in various well-known means. The processor may include an application-specific integrated circuit (ASIC), a different chipset, a logic circuit, and/or a data processor. The memory may include a read-only memory (ROM), a random access memory (RAM), a flash memory, a memory card, a storage medium, and/or another storage device. That is, the embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the embodiments) of the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle user equipment (including autonomous vehicle), an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the embodiment(s) of the present disclosure is applied may be produced in the form of a program that is to be executed by a computer and may be stored in a computer-readable recording medium. Multimedia data having a data structure according to the embodiment(s) of the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiment(s) of the present disclosure may be implemented with a computer program product according to program codes, and the program codes may be performed in a computer by the embodiment(s) of the present disclosure. The program codes may be stored on a carrier which is readable by a computer.

Figure 15:
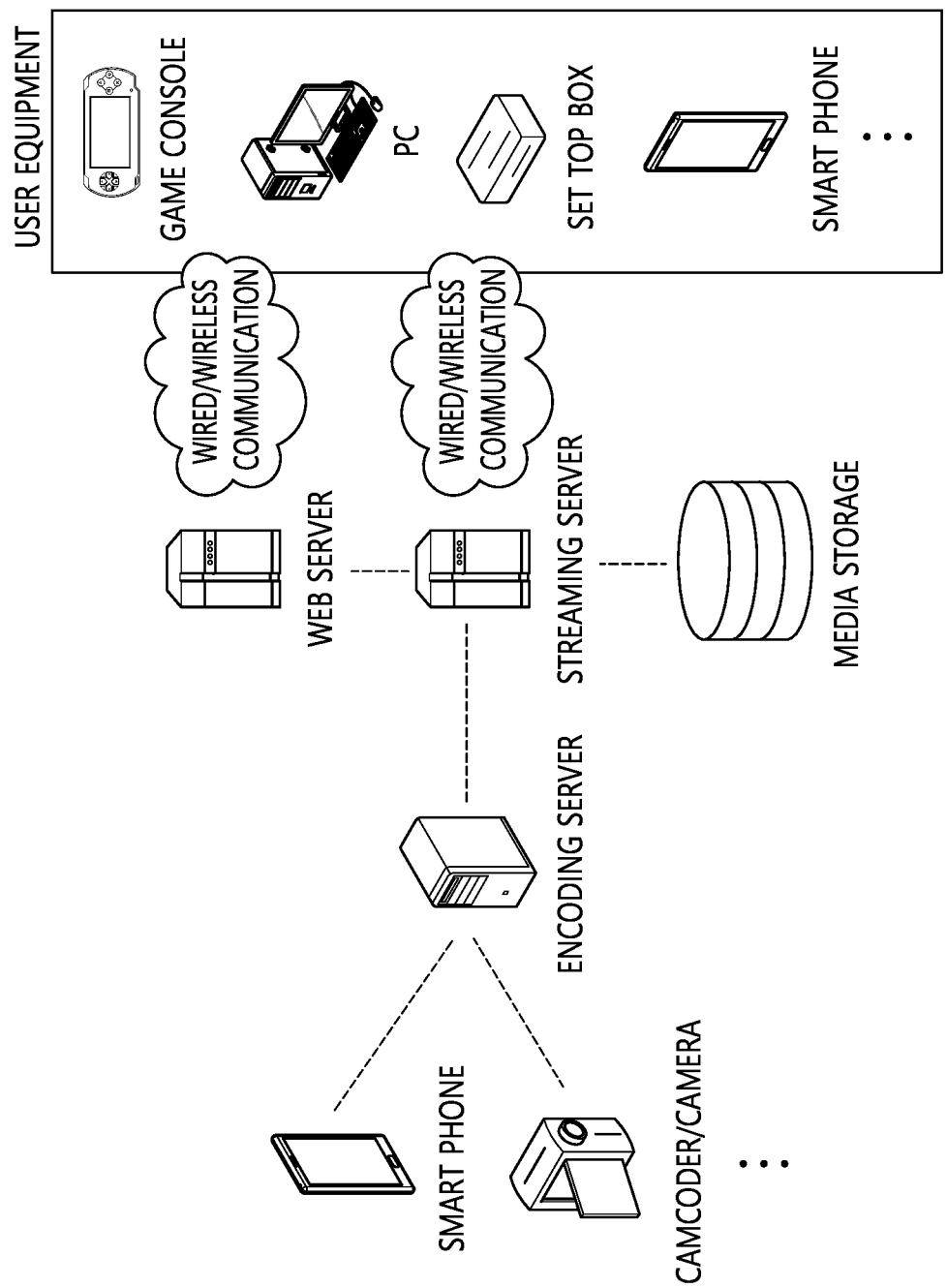
FIG. 15 represents an example of a content streaming system to which embodiments disclosed in this document may be applied.

FIG. 15 represents an example of a content streaming system to which embodiments disclosed in this document may be applied.

Referring to FIG. 15, the content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like.

Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:
    obtaining image information including residual information and prediction information through a bitstream;
    determining whether or not lossless coding is used from the image information;
    generating prediction samples for a current block based on a result of the determination and the prediction information;
    generating residual samples for the current block based on the result of the determination and the residual information; and
    generating reconstructed samples for the current block based on the prediction samples and the residual samples,
    wherein based on the determination that the lossless coding is used for the current block, an Intra Sub-Partitions (ISP), a luma dependent chroma residual scaling, a luma mapping with chroma scaling (LMCS), a Decoder-side motion vector refinement (DMVR), a Bi-directional optical flow (BDOF), and a prediction refinement with optical flow (PROF) are not applied to the current block.

2. The method of claim 1, further comprising deriving residual coefficients for the current block,
    wherein inverse transform and dequantization are not applied to the residual coefficients, based on the determination that the lossless coding is used,
    wherein the inverse transform or the dequantization is applied to the residual coefficients based on the determination that the lossless coding is not used, and
    wherein the residual samples are generated based on the residual coefficients.

3. The method of claim 1,
    wherein whether or not the lossless coding is used is determined based on a flag indicating whether or not the lossless coding is used, and
    wherein the flag indicating whether or not the lossless coding is used is obtained through a coding unit (CU) syntax.

4. The method of claim 3,
    wherein the image information further includes an upper flag indicating whether or not there is the flag indicating whether or not the lossless coding is used,
    wherein in case of that the upper flag is 1, there is the flag indicating whether or not the lossless coding is used,
    wherein in case of that the upper flag is 0, there is no flag indicating whether or not the lossless coding is used, and
    wherein the upper flag is obtained through a sequence parameter set (SPS) or a picture parameter set (PPS).

5. The method of claim 1, further comprising:
    obtaining a Block-based Delta Pulse Code Modulation (BDPCM) flag indicating whether or not BDPCM is applied to the current block;
    performing the BDPCM on the current block based on the BDPCM flag, and deriving residual coefficients for the current block; and
    generating the residual samples based on the residual coefficients.

6. The method of claim 5,
    wherein based on the determination that the lossless coding is used, values of the residual coefficients are derived as values of the residual samples; and
    wherein based on the determination that the lossless coding is not used, values derived by dequantizing the residual coefficients are derived as the values of the residual samples.

7. The method of claim 1,
    wherein based on the determination that the lossless coding is used, adaptive loop filter (ALF) procedure is not performed on the reconstructed samples.

8. An image encoding method performed by an encoding apparatus, the method comprising:
    determining whether or not lossless coding is used for a current block;
    generating prediction information on the current block based on a result of the determination;
    generating residual information on the current block based on the result of the determination; and
    encoding image information including at least one of the prediction information, the residual information and information on whether or not the lossless coding is used,
    wherein based on the determination that the lossless coding is used for the current block, an Intra Sub-Partitions (ISP), a luma dependent chroma residual scaling, a luma mapping with chroma scaling (LMCS), a Decoder-side motion vector refinement (DMVR), a Bi-directional optical flow (BDOF), and a prediction refinement with optical flow (PROF) are not applied to the current block.

9. The method of claim 8, wherein in the generating the residual information,
transform and quantization are not applied to residual samples of the current block based on the determination that the lossless coding is used, and
the transform or the quantization is applied to the residual samples based on the determination that the lossless coding is not used.

10. The method of claim 8,
wherein whether or not the lossless coding is used is determined based on a flag indicating whether or not the lossless coding is used, and
wherein the flag indicating whether or not the lossless coding is used is signaled through a coding unit (CU) syntax.

11. The method of claim 10, wherein:
wherein the image information further includes an upper flag indicating whether or not there is the flag indicating whether or not the lossless coding is used,
wherein in case of that the upper flag is 1, there is the flag indicating whether or not the lossless coding is used,
wherein in case of that the upper flag is 0, there is no flag indicating whether or not the lossless coding is used, and
wherein the upper flag is signaled through a sequence parameter set (SPS) or a picture parameter set (PPS).

12. The method of claim 8, further comprising:
generating a Block-based Delta Pulse Code Modulation (BDPCM) flag indicating whether or not BDPCM is applied to the current block; and
deriving residual coefficients for the current block based on the BDPCM flag and residual samples of the current block.

13. The method of claim 12,
wherein based on the determination that the lossless coding is used, values of the residual coefficients are derived as values of the residual samples; and
wherein based on the determination that the lossless coding is not used, values derived by dequantizing the residual coefficients are derived as the values of the residual samples.

14. The method of claim 8,
wherein based on the determination that the lossless coding is used, adaptive loop filter (ALF) procedure is not performed on reconstructed samples.

15. A transmission method of data for an image, the method comprising:
obtaining a bitstream for the image, the bitstream is generated based on determining whether or not lossless coding is used for a current block, generating prediction information on the current block based on a result of the determination, generating residual information on the current block based on the result of the determination, and encoding image information including at least one of the prediction information, the residual information and information on whether or not the lossless coding is used; and
transmitting the data comprising the bitstream for the image,
wherein based on the determination that the lossless coding is used for the current block, an Intra Sub-Partitions (ISP), a luma dependent chroma residual scaling, a luma mapping with chroma scaling (LMCS), a Decoder-side motion vector refinement (DMVR), a Bi-directional optical flow (BDOF), and a prediction refinement with optical flow (PROF) are not applied to the current block.

* * * * *